(12) United States Patent
Kim et al.

(10) Patent No.: US 12,231,755 B2
(45) Date of Patent: Feb. 18, 2025

(54) CAMERA DEVICE

(71) Applicant: LG INNOTEK CO., LTD., Seoul (KR)

(72) Inventors: Jung Cheol Kim, Seoul (KR); Tae Bong Park, Seoul (KR); Hyeon Jun Jang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 241 days.

(21) Appl. No.: 17/760,348

(22) PCT Filed: Feb. 5, 2021

(86) PCT No.: PCT/KR2021/001591
§ 371 (c)(1),
(2) Date: Aug. 8, 2022

(87) PCT Pub. No.: WO2021/158082
PCT Pub. Date: Aug. 12, 2021

(65) Prior Publication Data
US 2023/0064006 A1 Mar. 2, 2023

(30) Foreign Application Priority Data

Feb. 6, 2020 (KR) .................. 10-2020-0014404
Jun. 16, 2020 (KR) .................. 10-2020-0073120

(51) Int. Cl.
*H04N 23/55* (2023.01)
*G02B 3/12* (2006.01)
*G03B 17/12* (2021.01)

(52) U.S. Cl.
CPC .............. *H04N 23/55* (2023.01); *G02B 3/12* (2013.01); *G03B 17/12* (2013.01)

(58) Field of Classification Search
CPC . H04N 23/55; G02B 3/12; G02B 7/08; G02B 27/646; G02B 3/14; G03B 17/12;
(Continued)

(56) References Cited

U.S. PATENT DOCUMENTS

2008/0007804 A1* 1/2008 Min .................. H04N 1/486
358/512
2015/0116591 A1* 4/2015 Han .................. H04N 23/54
348/374
(Continued)

FOREIGN PATENT DOCUMENTS

EP 3 495 867 A1 6/2019
JP 2017-3956 A 1/2017
(Continued)

OTHER PUBLICATIONS

International Search Report dated May 28, 2021 in International Application No. PCT/KR2021/001591.
(Continued)

*Primary Examiner* — Ahmed A Berhan
(74) *Attorney, Agent, or Firm* — Saliwanchik, Lloyd & Eisenschenk

(57) ABSTRACT

One embodiment comprises: a housing; a bobbin arranged in the housing; a lens barrel coupled to the bobbin; a coil arranged in the bobbin; a magnet which is arranged in the housing so as to face the coil and which moves the bobbin in the optical axis direction by means of interaction with the coil; a liquid lens arranged on the lens barrel; and a pressurizing unit which is arranged between the upper surface of the bobbin and the liquid lens and which pressurizes the liquid lens by means of the movement of the bobbin.

20 Claims, 36 Drawing Sheets

(58) Field of Classification Search
CPC .... G03B 2205/0069; G03B 2205/0084; G03B 3/10; G03B 30/00
See application file for complete search history.

(56) References Cited

U.S. PATENT DOCUMENTS

| | | | |
|---|---|---|---|
| 2016/0344912 A1* | 11/2016 | Baik | H04N 23/55 |
| 2017/0054883 A1* | 2/2017 | Sharma | H04N 23/66 |
| 2019/0222752 A1* | 7/2019 | Burstein | H04N 5/2224 |
| 2019/0227253 A1 | 7/2019 | Fan et al. | |
| 2019/0313007 A1* | 10/2019 | Kim | G03B 13/20 |
| 2020/0124839 A1* | 4/2020 | Aschwanden | G03B 5/00 |
| 2020/0137270 A1* | 4/2020 | Dawson | H04N 25/48 |
| 2020/0301116 A1* | 9/2020 | Aschwanden | G02B 3/14 |
| 2020/0341289 A1* | 10/2020 | Minamisawa | G02B 27/646 |
| 2020/0404181 A1* | 12/2020 | Lee | G03B 30/00 |
| 2021/0191067 A1* | 6/2021 | Hu | H04N 23/681 |
| 2021/0239999 A1* | 8/2021 | Son | G02B 27/646 |
| 2022/0201167 A1* | 6/2022 | Chen | G03B 17/17 |
| 2023/0134656 A1* | 5/2023 | Smolka | G02B 15/06 359/665 |

FOREIGN PATENT DOCUMENTS

| | | |
|---|---|---|
| KR | 10-2018-0123376 A | 11/2018 |
| KR | 10-2018-0137277 A | 12/2018 |
| KR | 10-2019-0101904 A | 9/2019 |
| KR | 10-2019-0139574 A | 12/2019 |
| WO | 2018/234573 A1 | 12/2018 |
| WO | WO-2019235888 A1 * 12/2019 ......... G02B 13/0065 |

OTHER PUBLICATIONS

Supplementary European Search Report dated Mar. 1, 2024 in European Application No. 21751148.4.

* cited by examiner

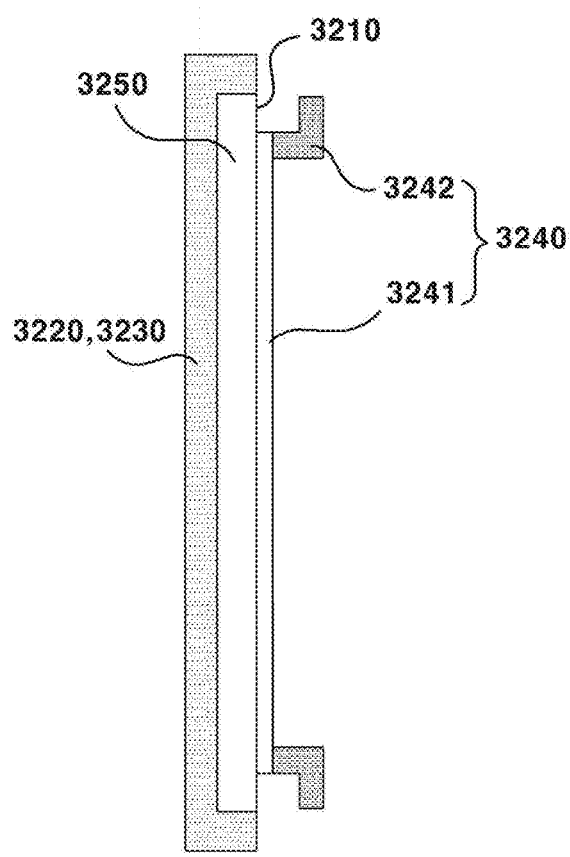
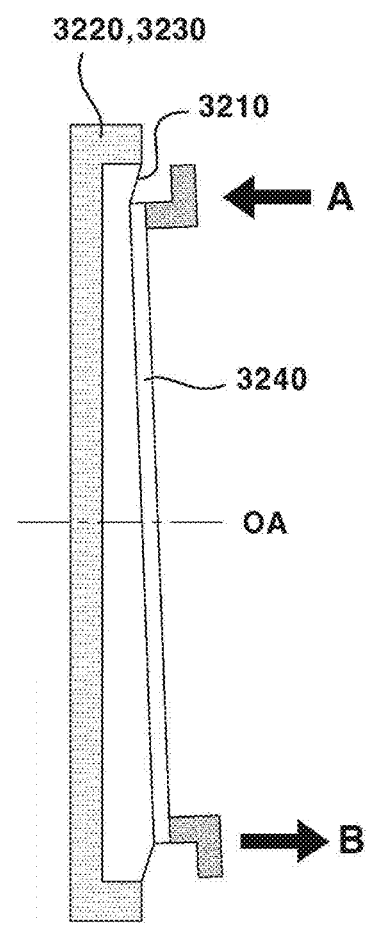

FIG. 41
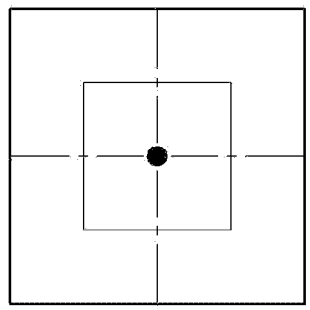
(a)
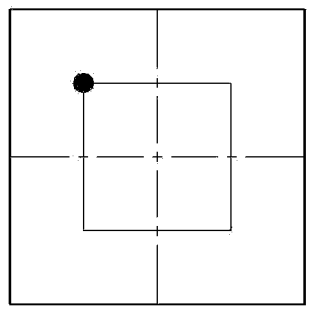  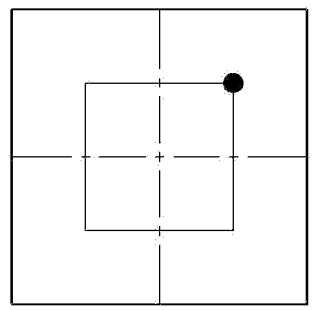
(b) (c)
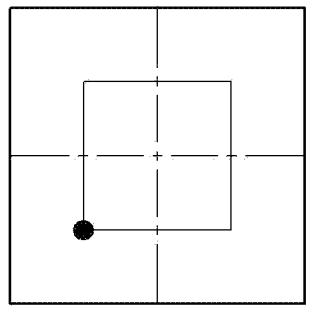  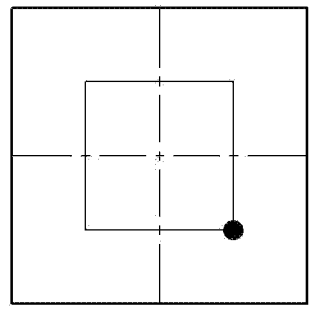
(e) (d)

CAMERA DEVICE

CROSS-REFERENCE TO RELATED APPLICATIONS

This application is the U.S. national stage application of International Patent Application No. PCT/KR2021/001591, filed Feb. 5, 2021, which claims the benefit under 35 U.S.C. § 119 of Korean Application Nos. 10-2020-0014404, filed Feb. 6, 2020; and 10-2020-0073120, filed Jun. 16, 2020; the disclosures of each of which are incorporated herein by reference in their entirety.

TECHNICAL FIELD

The present embodiment relates to a camera device.

BACKGROUND ART

Since it is difficult to apply a voice coil motor (VCM) technology used in an existing general camera module to a camera module for ultra-small size and low power consumption, research related thereto has been actively conducted.

In the case of a camera module being mounted on a small electronic product such as a smartphone, the camera module may frequently receive impacts during use, and the camera module may be slightly shaken depending on the user's hand-shake while photographing. In consideration of this point, recently, a technique for additionally installing a hand-shake prevention means to a camera module has been developed.

Meanwhile, 3D contents are being applied in many fields, such as education, manufacturing, and autonomous driving, as well as games and culture. In order to acquire 3D contents, depth map is required. Depth information is information indicating a distance in space, and indicates perspective information of another point with respect to one point of a 2D image.

As a method of acquiring depth information, a time of flight (ToF) method has been attracting attention recently. According to the TOF method, the distance to the object is calculated by measuring the flight time, that is, the time the light is emitted and reflected. The biggest advantage of the ToF method is that it provides distance information in 3D space quickly in real time. In addition, the user can obtain accurate distance information without applying a separate algorithm or hardware correction. In addition, accurate depth information can be obtained by measuring a very close subject or even measuring a moving subject.

However, in the case of the current ToF method, there is a problem in that information that can be obtained per frame, that is, the resolution is low.

In order to increase the resolution, the number of pixels of the sensor may be increased, but in this case, there is a problem in that the volume and manufacturing cost of the camera device are greatly increased.

DETAILED DESCRIPTION OF THE INVENTION

Technical Subject

A first embodiment of the present invention provides a lens module capable of increasing the size of a convex lens of a first lens part and capable of finely adjusting the focal length, and a camera module and optical device comprising the same.

The technical problem to be solved in the first embodiment of the present invention is not limited to the technical problem mentioned above, and another technical problem not mentioned will be clearly understood by those of ordinary skill in the art to which the present invention belongs from the following description.

A second embodiment of the present invention is intended to provide a camera device capable of increasing resolution by being used in the ToF method.

In more detail, it is intended to provide a camera device that can be used in a super resolution (SR) technique.

Technical Solution

A lens module according to a first embodiment of the present invention comprises: a housing; a bobbin disposed in the housing; a lens barrel coupled to the bobbin; a coil disposed in the bobbin; a magnet which is disposed in the housing so as to face the coil and which moves the bobbin in the optical axis direction by means of interaction with the coil; a liquid lens disposed on the lens barrel; and a pressing portion which is disposed between the upper surface of the bobbin and the liquid lens and which pressurizes the liquid lens by means of the movement of the bobbin.

The pressing portion may be disposed between an upper surface of the bobbin and the liquid lens.

The pressing portion may be spaced apart from the lens barrel.

The distance between the pressing portion and an inner surface of the housing in a horizontal direction perpendicular to the optical axis may be smaller than the distance between an outer side surface of the lens barrel and an inner side surface of the housing in the horizontal direction.

The liquid lens may comprise a receptor, a liquid being accommodated in the receptor, and a membrane for sealing the fluid within the receptor, and the pressing portion may be configured to contact the membrane.

The distance between the optical axis and the pressing portion in a direction perpendicular to the optical axis may be larger than the distance between the optical axis and the outer side surface of the lens barrel in a direction perpendicular to the optical axis.

The pressing portion may be disposed outside the lens barrel.

The lens module comprises an upper elastic member coupled to the bobbin and the housing, a coupling portion coupled to the upper elastic member is formed on an upper surface of the bobbin, an upper surface of the pressing portion may be located closer to the liquid lens than an upper surface of the coupling portion.

The lens module may comprise an upper plate and a side plate being extended from the upper plate, a cover member for accommodating the housing is comprised, and the receptor may be coupled to an inner surface of the upper plate of the cover member.

Or the lens module may comprise: a cover member comprising an upper plate and a side plate being extended from the upper plate to accommodate the housing; and a holder being disposed between the cover member and the housing and accommodating the receptor.

The pressing portion may be a protruded portion formed integrally with the bobbin and being protruding from an upper surface of the bobbin.

The pressing portion may be a pressing frame formed separately from the bobbin, an upper surface of the pressing frame is in contact with the liquid lens, and a lower surface of the pressing frame may be in contact with an upper surface of the bobbin.

The pressing portion may be disposed in the lens barrel.

A camera device according to a second embodiment of the present invention comprises: a holder comprising an upper plate and a side plate being extended from the upper plate; a liquid lens being disposed on the upper plate of the holder; a magnet being coupled to the liquid lens; a substrate being disposed on the side plate of the holder; and a coil coupled to the substrate and facing the magnet, wherein the liquid lens comprises a transparent and elastically extendable membrane, a body forming a cavity with the membrane, a liquid being disposed in the cavity, and a lens forming member that is in contact with the membrane and adjusts the curvature of the membrane, wherein the side plate of the holder comprises a first side plate and a second side plate being disposed opposite to the first side plate, wherein the substrate comprises a first substrate being disposed on the first side plate of the holder and a second substrate being disposed on the second side plate of the holder, and wherein the coil may comprise a first coil and a second coil being disposed on the first substrate, and a third coil and a fourth coil being disposed on the second substrate.

The magnet comprises: a first magnet disposed on the lens forming member and facing the first coil; a second magnet disposed on the lens forming member and facing the second coil; a third magnet disposed on the lens forming member and facing the third coil; and a fourth magnet disposed on the lens forming member and facing the fourth coil, wherein the first and second magnets are disposed on one side of the lens forming member, and wherein the third and fourth magnets may be disposed on the other side of the lens forming member.

The outer side surface of the first magnet and the outer side surface of the second magnet may face the same direction, and the outer side surface of the third magnet and the outer side surface of the fourth magnet may face the same direction.

The outer side surface of the first magnet and the outer side surface of the second magnet are disposed on the same plane, and the outer side surface of the third magnet and the outer side surface of the fourth magnet may be disposed on the same plane.

The holder comprises a first hole formed in the first side plate and a second hole formed in the second side plate, wherein the first coil and the second coil are disposed in the first hole of the holder, and wherein the third coil and the fourth coil may be disposed in the second hole of the holder.

The upper portion of the first magnet has an N-pole polarity, the lower portion of the first magnet has an S-pole polarity, the upper portion of the second magnet has an S-pole polarity, and the lower portion of the second magnet may have an N-pole polarity.

The lens forming member comprises a yoke, and the magnet may be disposed on the yoke and disposed between the yoke and the coil.

The lens forming member comprises a window for pressing the membrane and a frame coupled to the window, wherein the magnet may be disposed on the frame.

The frame comprises a body portion comprising a hole and coupled to the window and a leg portion being extended outwardly from the body portion, wherein the leg portion may comprise a first leg portion and a second leg portion being extended from one side surface of the body portion in a first direction and being spaced apart from each other, and a third leg portion and a fourth leg portion being extended from the other side surface of the body portion in a second direction opposite to the first direction and being spaced apart from each other.

Each of the first to fourth leg portions may comprise a hole being formed at a position corresponding to a portion of the magnet.

The holder may comprise a protrusion being protruded from an outer surface of the side plate of the holder, and the substrate may comprise a hole into which the protrusion of the holder is inserted.

The camera device comprises: a printed circuit board; a sensor disposed on the printed circuit board; a base disposed on the printed circuit board; a lens coupled to the base; and a filter disposed on the base and disposed between the lens and the sensor, wherein the liquid lens may be disposed at a position corresponding to the lens.

The base may be directly coupled to an upper surface of the printed circuit board, and the base may be integrally formed so that a space between the sensor and the filter may be sealed by the base.

The board comprises a terminal disposed at a lower end portion, and the terminal of the board may be coupled to the printed circuit board.

An optical device according to a second embodiment of the present invention comprises a light emitting module; and a camera device, wherein the camera device may receive the light irradiated from the light emitting module.

A camera device according to a second embodiment of the present invention comprises: a holder comprising an upper plate and a side plate being extended from the upper plate; a liquid lens being disposed on the upper plate of the holder; a magnet being coupled to the liquid lens; a substrate being disposed on the side plate of the holder; and a coil being coupled to the substrate and facing the magnet, wherein the liquid lens comprises a membrane transparent and elastically extensible, a body forming a cavity with the membrane, a liquid being disposed in the cavity, and a lens forming member being in contact with the membrane to control the curvature of the membrane, wherein the side plate of the holder comprises a first side plate and a second side plate being disposed opposite to the first side plate, and wherein the coil may comprise a first coil and a second coil being disposed on the first side plate of the holder, and a third coil and a fourth coil being disposed on the second side plate of the holder.

A camera device according to a second embodiment of the present invention comprises: a liquid lens; a magnet coupled to the liquid lens; and a coil facing the magnet, wherein the liquid lens comprises a membrane transparent and elastically extensible, a body forming a cavity with the membrane therebetween, a liquid being disposed in the cavity, and a lens forming member being in contact with the membrane to control the curvature of the membrane, wherein the curvature of the membrane is controlled by the interaction between the coil and the magnet so that the liquid lens acquires an image moved to a distance of 0.25 times the pixel size in a first direction, acquires an image moved by a distance of 0.25 times the pixel size in a second direction perpendicular to the first direction, acquires an image moved by a distance of 0.25 times the pixel size in a third direction opposite to the first direction, and may acquire an image moved by a distance of 0.25 times the pixel size in a fourth direction opposite to the second direction.

The first to fourth directions may be diagonal directions of the pixel.

A camera device according to a second embodiment of the present invention comprises: a liquid lens; a magnet being coupled to the liquid lens; and a coil facing the magnet, wherein the liquid lens comprises a membrane transparent and elastically extensible, a body forming a cavity with the membrane therebetween, a liquid being disposed in the cavity, and a lens forming member being in contact with the membrane to control the curvature of the membrane, wherein the curvature of the membrane is controlled by the interaction between the coil and the magnet, so that the liquid lens acquires an image moved to a distance of 0.5 times the pixel size in a first direction, acquires an image moved by a distance of 0.5 times the pixel size in a second direction perpendicular to the first direction, acquires an image moved by a distance of 0.5 times the pixel size in a third direction opposite to the first direction, acquires an image moved by a distance of 0.5 times the pixel size in a fourth direction opposite to the second direction, and the first to fourth directions may be directions directing toward four lateral sides of the pixel.

Advantageous Effects

In a first embodiment of the present invention, since the pressing frame is located outside the lens barrel, the size of the convex lens of the first lens part in a direction perpendicular to the optical axis can be increased.

In addition, in a first embodiment of the present invention, since the focal length of the second lens part is adjusted by the lens driving device, and at the same time, the focal length of the first lens part is adjusted by pressing the protruded portion of the bobbin, the focal length of the lens module can be finely adjusted.

In addition, the effects obtainable in a first embodiment of the present invention are not limited to the above mentioned effects, and other effects not mentioned can be understood clearly to those of ordinary skill in the art from the description below.

Through a second embodiment of the present invention, depth information can be acquired with high resolution even without significantly increasing the number of pixels of the sensor.

In addition, a high-resolution image can be obtained from a plurality of low-resolution images obtained by the camera device according to a second embodiment of the present invention through the SR technique.

BRIEF DESCRIPTION OF DRAWINGS

FIG. 2b is an exploded perspective view of the lens driving device in FIG. 2a.

FIG. 8a is a cross-sectional view of a lens module in the AB direction in FIG. 2a.

FIG. 8b is a cross-sectional view of a lens module in the CD direction in FIG. 2a.

FIG. 11 shows a modified embodiment of the bobbin in FIG. 4a.

FIG. 39 is a conceptual diagram for explaining the concept of driving a liquid lens according to a second embodiment of the present invention.

FIG. 41 is a conceptual diagram conceptually sequentially illustrating a plurality of images acquired for a super resolution (SR) technique in a camera device according to a second embodiment of the present invention.

BEST MODE

Figure 1:
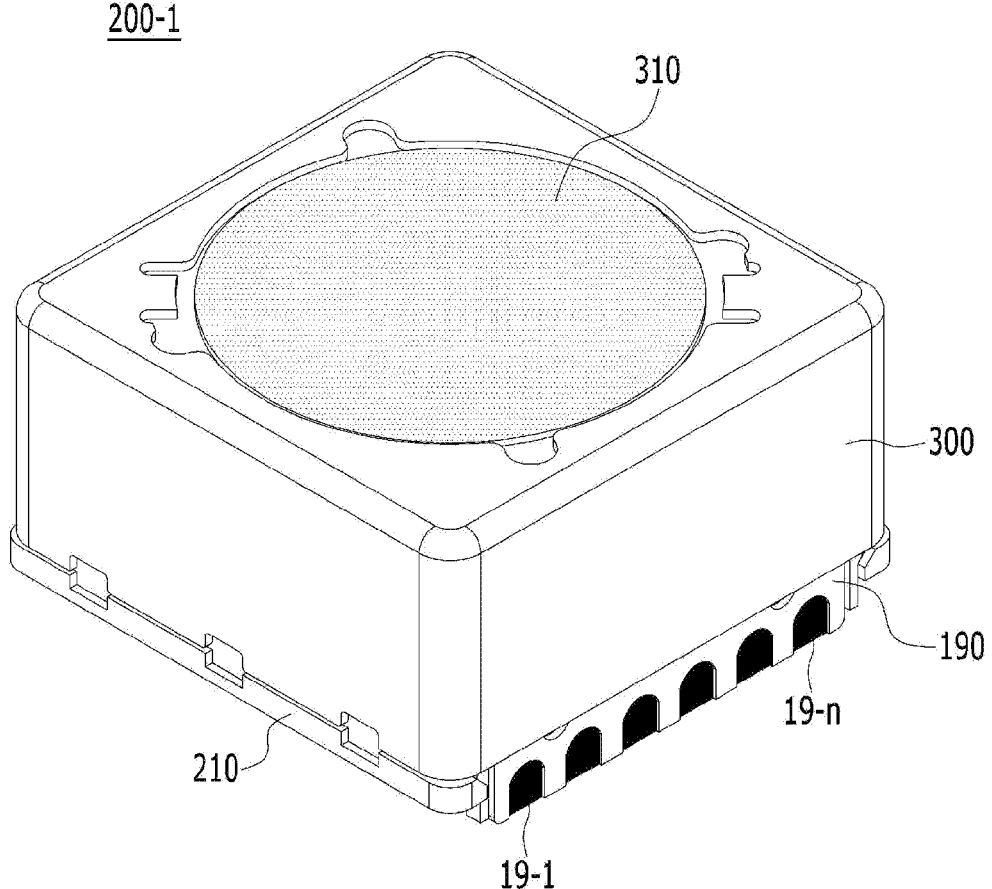
FIG. 1 is a schematic perspective view of a lens module according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

For convenience of description, the lens driving device according to the embodiment is described using a Cartesian coordinate system (x, y, z), but may be described using other coordinate systems, and the embodiment is not limited thereto. In each drawing, the x-axis and the y-axis refer to directions perpendicular to the z-axis, which is the optical axis direction; the z-axis direction, which is the optical axis OA direction, is referred to as a 'first direction'; the x-axis direction is referred to as a 'second direction'; and the y-axis direction may be referred to as a 'third direction'.

The lens module according to the embodiment may perform an 'auto-focusing function'. Here, the auto-focusing function refers to automatically forming the image of the subject on a surface of the image sensor.

Figure 2A:
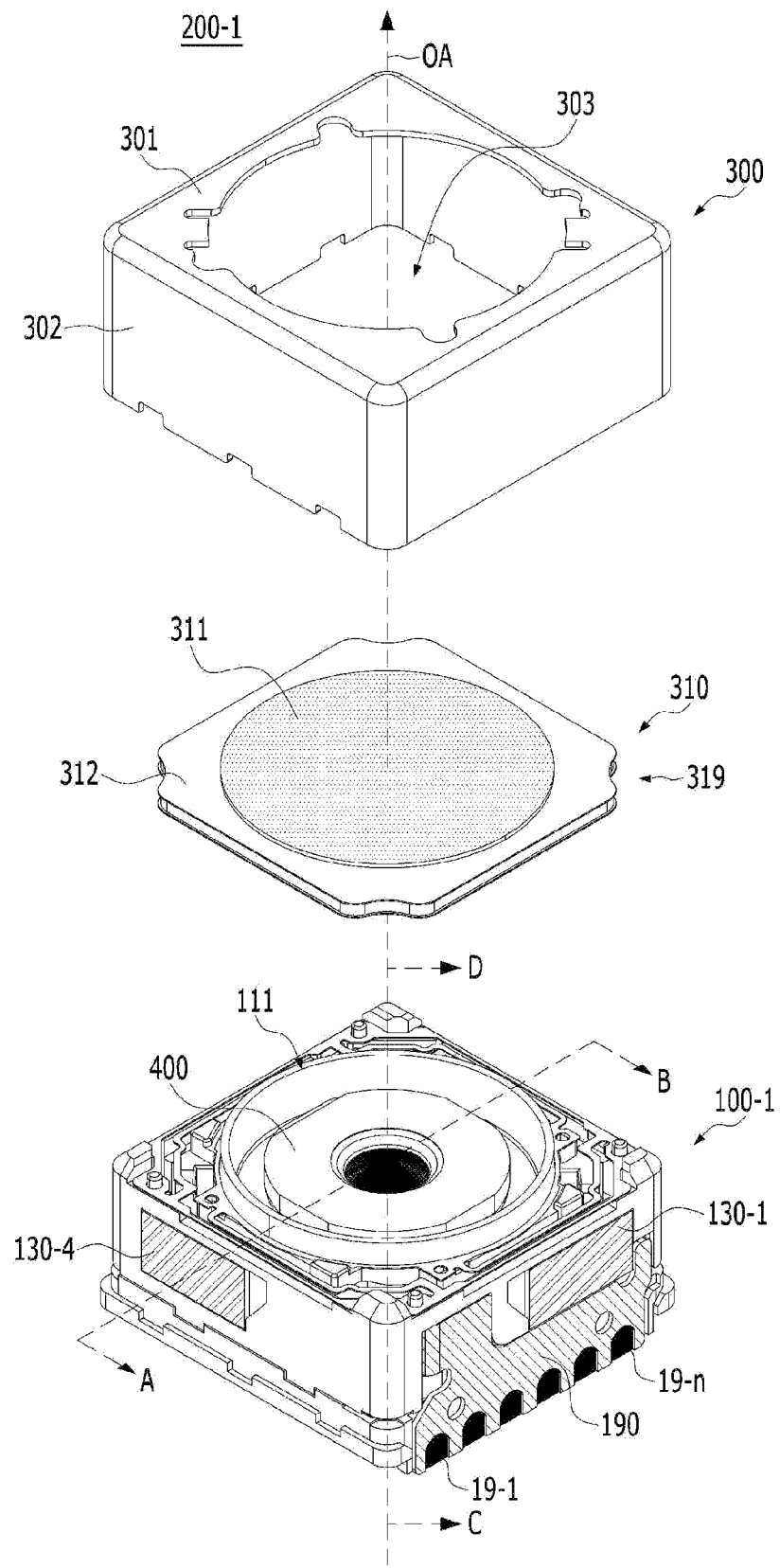
FIG. 2a is an exploded perspective view of the lens module in FIG. 1.
Figure 2B:
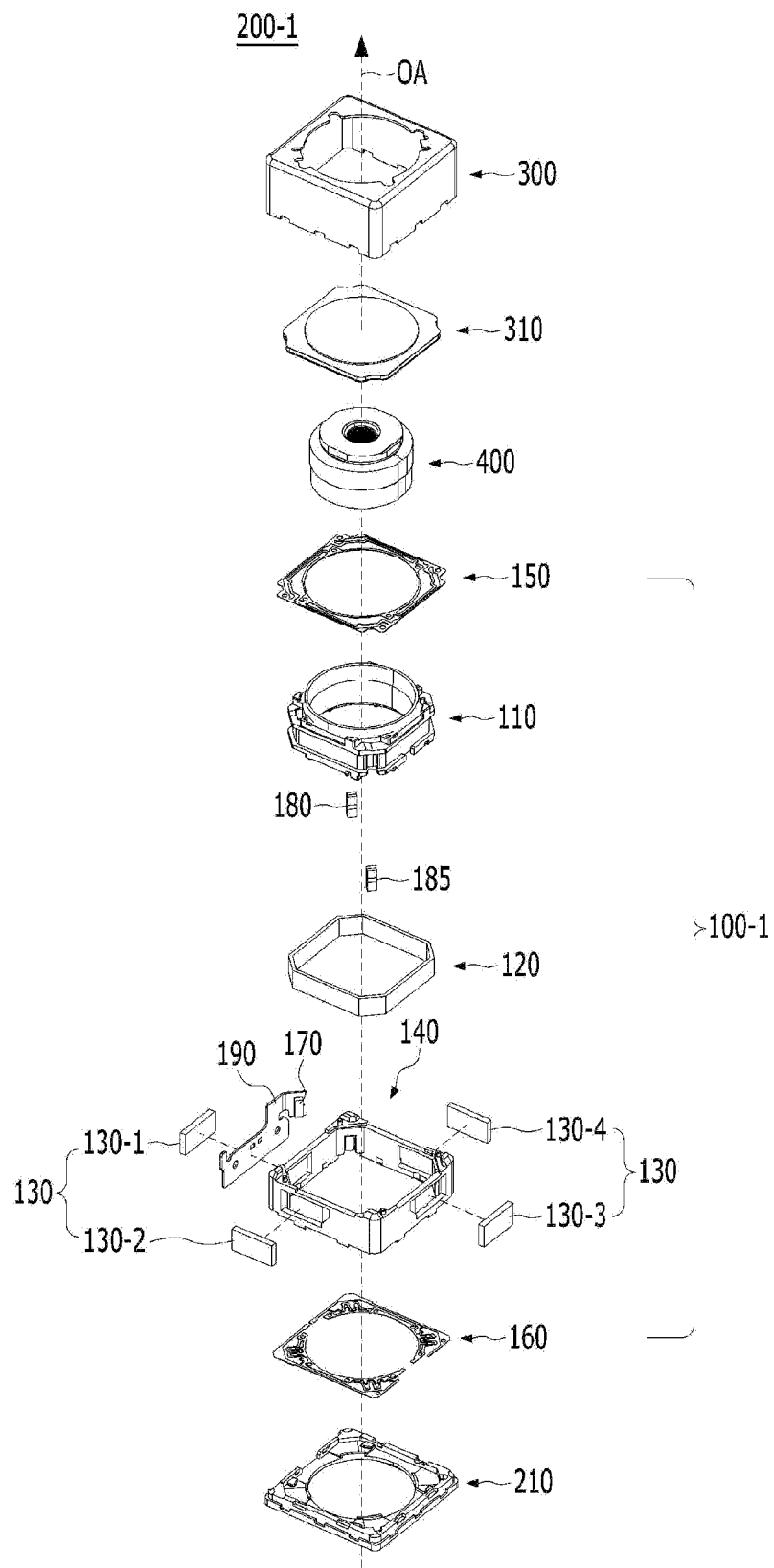
Figure 3A:
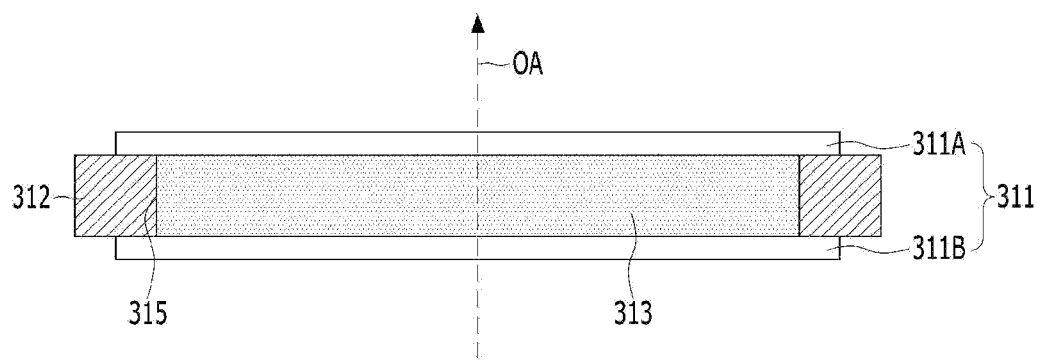
FIG. 3a is a cross-sectional view of a first lens part according to a first embodiment of the present invention.
Figure 3B:
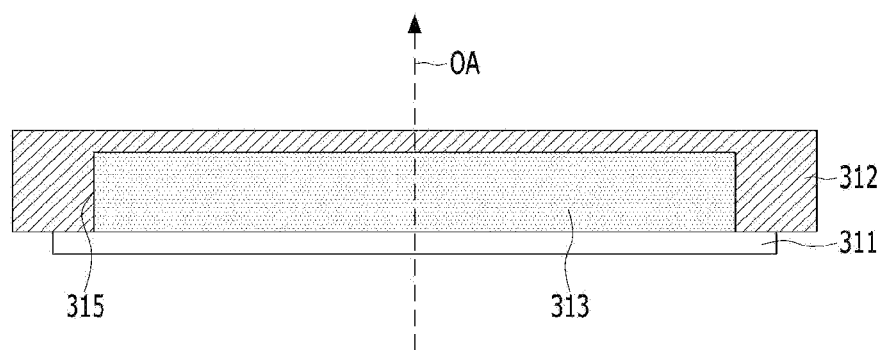
FIG. 3b is a cross-sectional view of a first lens part according to another exemplary embodiment.
Figure 4A:
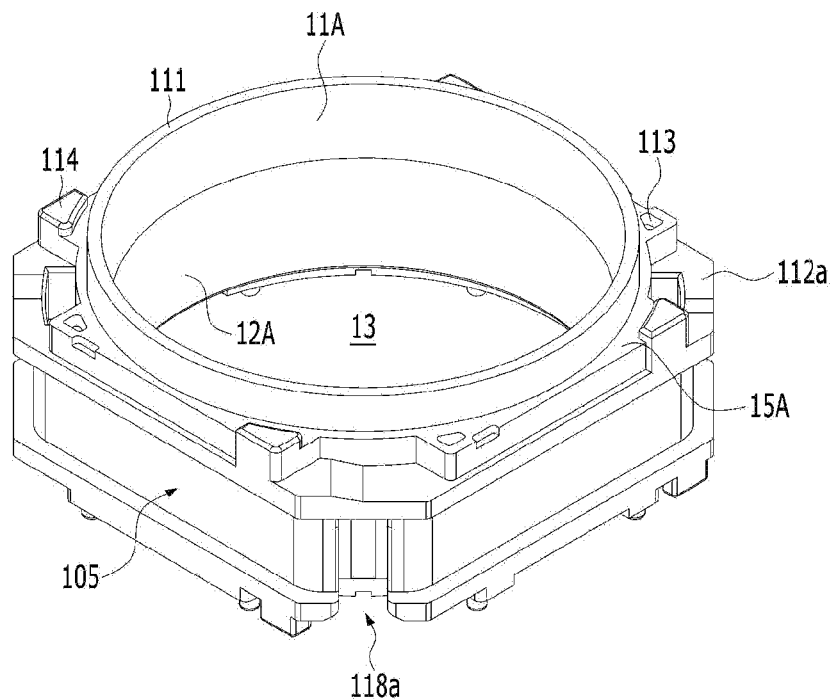
FIG. 4a is a perspective view of a bobbin.
Figure 4B:
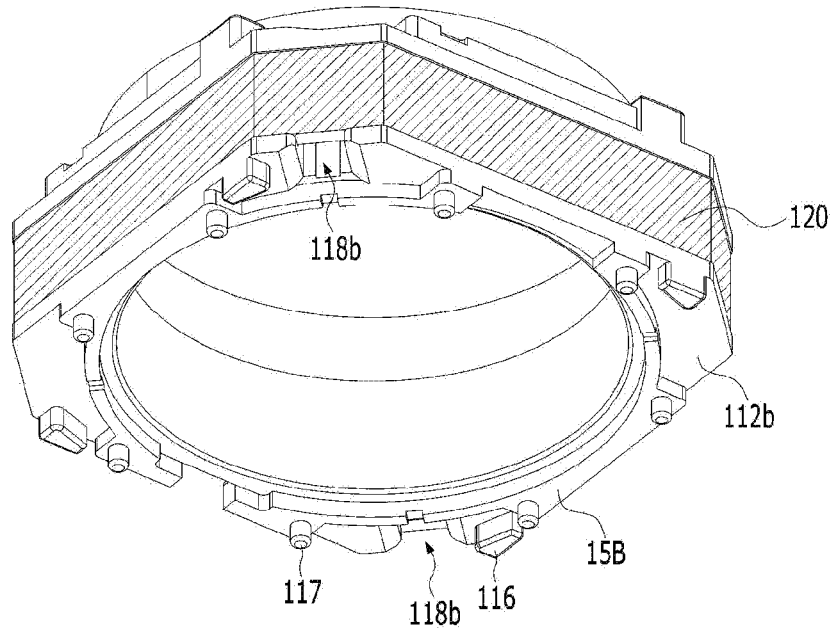
FIG. 4b is a perspective view of a bobbin and a coil.
Figure 5A:
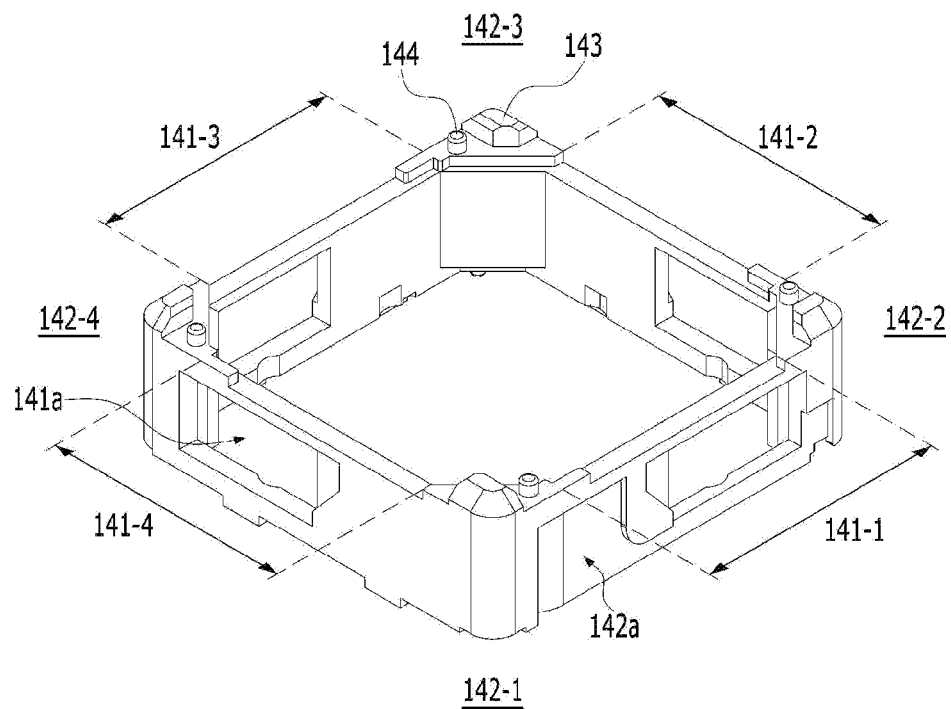
FIG. 5a is a perspective view of a housing.
Figure 5B:
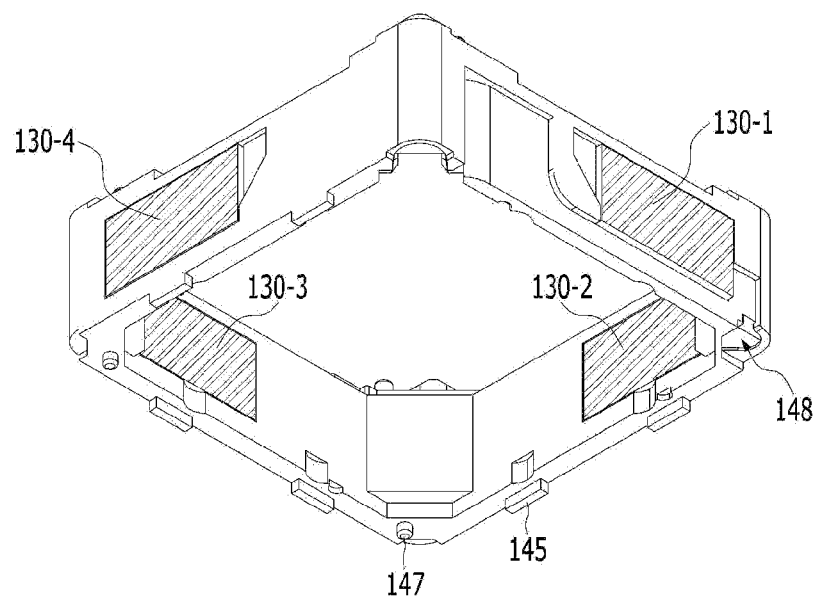
FIG. 5b is a perspective view of a housing and a magnet.
Figure 6:
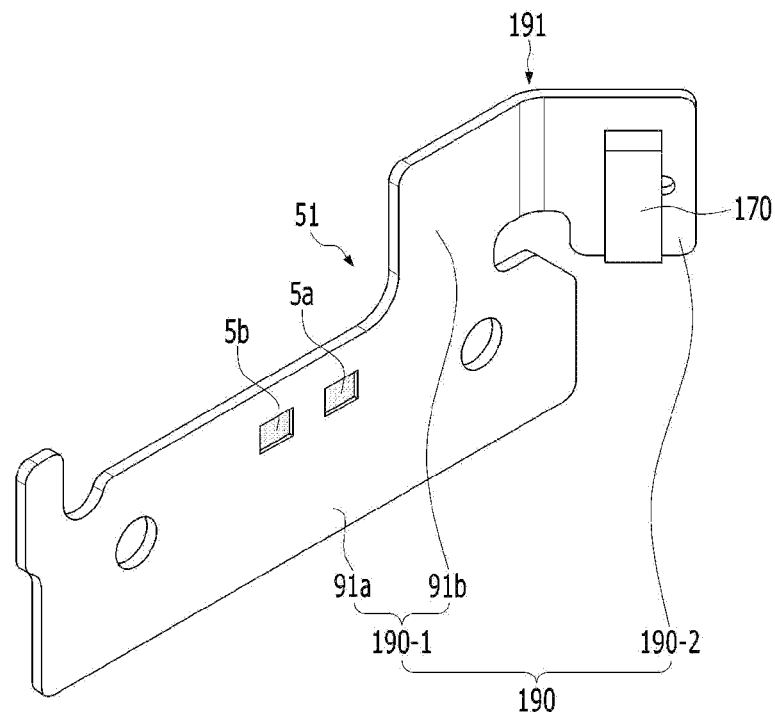
FIG. 6 is a perspective view of a circuit board and a position sensor.
Figure 7:
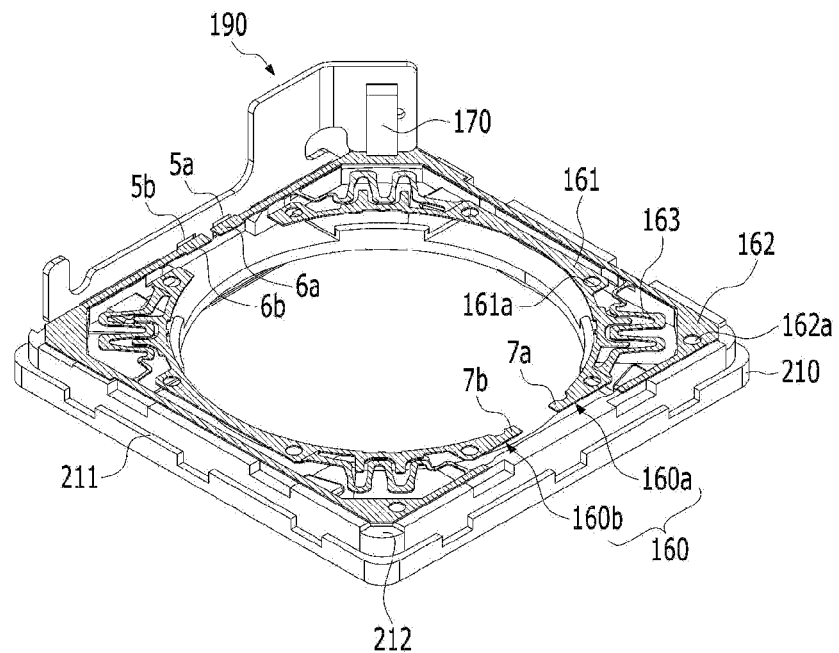
FIG. 7 shows a base, a lower elastic member, a circuit board, and a position sensor.
Figure 8A:
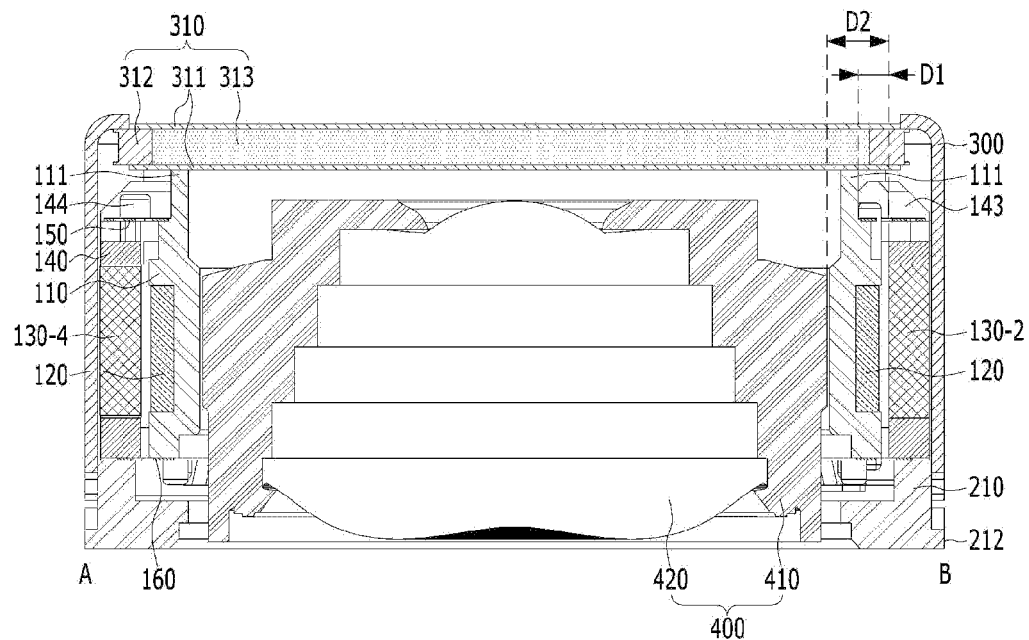
Figure 8B:
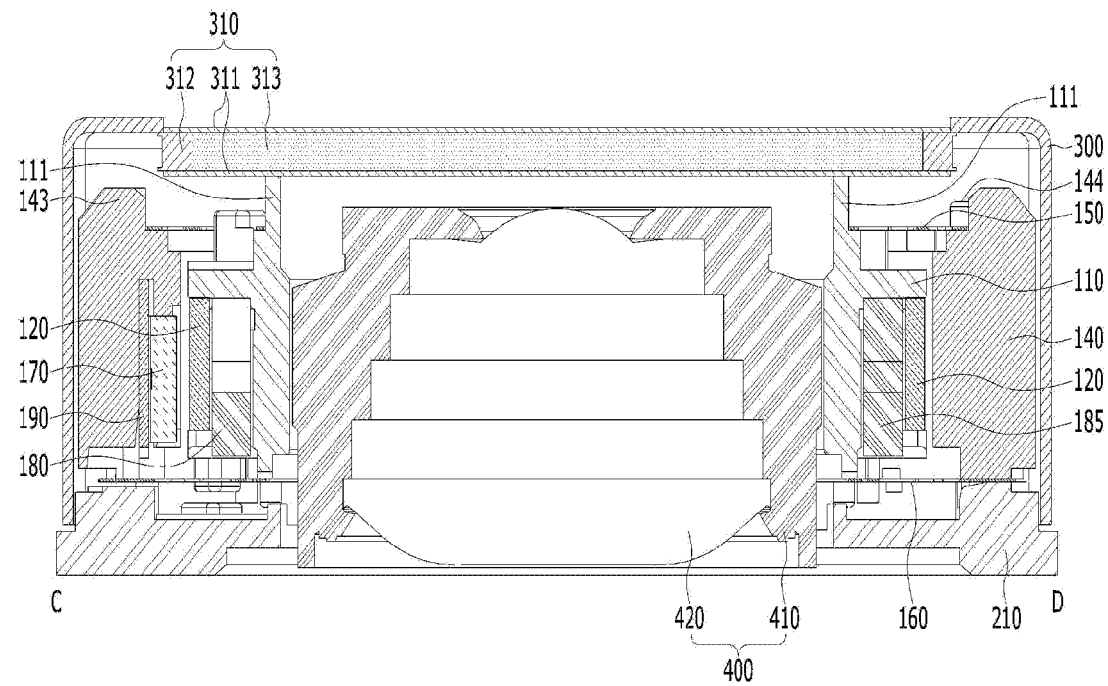
Figure 9:
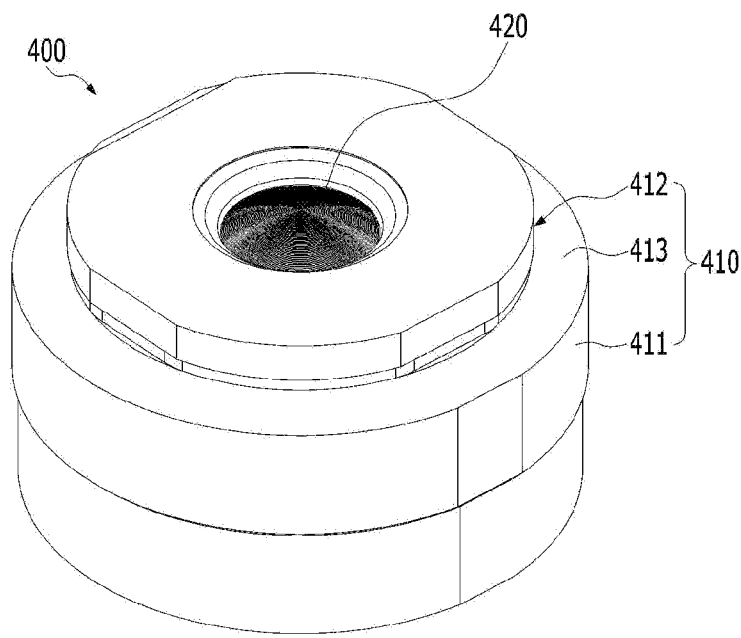
FIG. 9 is a perspective view of a lens barrel and a lens.
Figure 10:
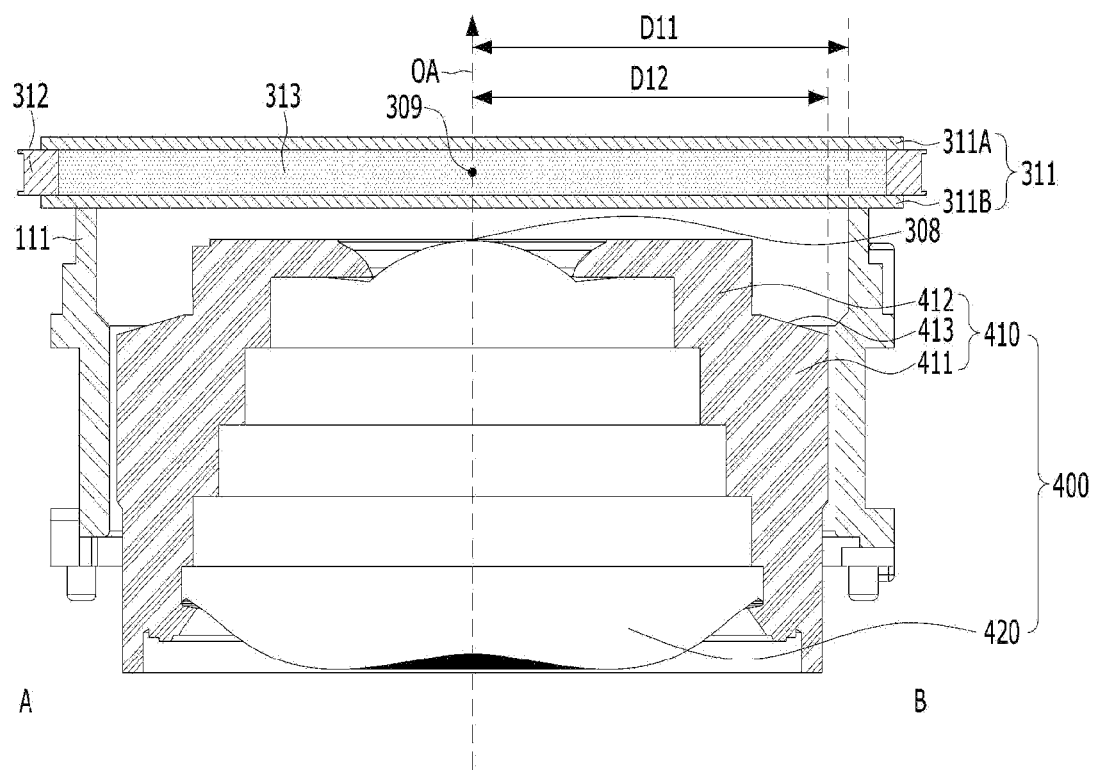
FIG. 10 is a cross-sectional view of a first lens part, a second lens part, and a bobbin.

FIG. 1 is a schematic perspective view of a lens module 200-1 according to a first embodiment of the present invention; FIG. 2a is an exploded perspective view of a lens module 200-1 in FIG. 1; FIG. 2b is an exploded perspective view of a lens driving device 100-1 in FIG. 2a; FIG. 3a is a cross-sectional view of a first lens part 310 according to a first embodiment of the present invention; FIG. 3b is a cross-sectional view of a first lens part 310 according to another embodiment; FIG. 4a is a perspective view of a bobbin; FIG. 4b is a perspective view of a bobbin and a coil; FIG. 5a is a perspective view of a housing; FIG. 5b is a perspective view of a housing and a magnet; FIG. 6 is a perspective view of the circuit board 190 and the position sensor 170; FIG. 7 shows a base 210, a lower elastic member 160, the circuit board 190, and the position sensor 170; FIG. 8a is a cross-sectional view of the lens module 200-1 in the AB direction in FIG. 2a; FIG. 8b is a cross-sectional view of the lens module 200-1 in the CD direction in FIG. 2a; FIG. 9 is a perspective view of the lens barrel 400 and the lens 420; and FIG. 10 is a cross-sectional view of the first lens part 310, the second lens part 400, and the bobbin 110.

Referring to FIGS. 1 to 10, the lens module 200-1 may comprise a first lens part 310, a second lens part 400, and a lens driving device 100-1.

Hereinafter, the lens module may be expressed by replacing it with a "camera module", and "lens driving device" may be called alternatively as a lens driver, a voice coil motor (VCM), an actuator, or a lens moving device, and the like.

Hereinafter, the term "coil" may be expressed by replacing it with a coil unit or a coil body, and the term "elastic member" may be expressed by replacing it with an elastic unit or a spring.

In addition, in the following description, the term "terminal" may be expressed by replacing it with a pad, an electrode, a conductive layer, or a bonding part.

The lens module 200-1 may perform an auto-focusing function by a lens driving device coupled to the first lens part 310 and the second lens part 400.

For example, the first lens part 310 may comprise a liquid lens. For example, the curvature of the liquid lens of the first lens part 310 may be changed by the pressing portion, and thus the focal length of the lens module 200-1 may be adjusted.

For example, the first lens part 310 may be a liquid lens or a variable focus lens.

For example, the first lens part 310 may comprise a liquid 313, a receptor 312, and a membrane 311. For example, liquid may be a fluid.

The liquid 313 may be transparent, non-volatile, and chemically stable. In addition, the liquid 313 may have a low viscosity and thus have excellent mobility.

The liquid 313 may be a material capable of transmitting light.

For example, the liquid 313 may be silicone oil or liquid silicone. In addition, the liquid 313 may comprise, but is not limited to, transparent hydrocarbon-based oil, ester oil, ether-based oil, perfluoropolyether oil, and the like.

The receptor 312 serves to accommodate the liquid 313. The receptor 312 may be expressed by replacing it with a "container", an "accommodating part", or a "support part".

When viewed from above, the shape of the receptor 312 may be a polygonal (e.g., quadrangular) shape, but is not limited thereto, and may have a circular or elliptical shape in another embodiment.

For example, a groove part 319 may be provided at a corner of the receptor 312. The groove part 319 may be a shape being recessed from the side surface of the corner of the receptor 312.

For example, liquid 313 may be disposed or accommodated inside the receptor 312. For example, the receptor 312 may comprise an accommodating part 315 for accommodating the liquid 313. For example, the accommodating part 315 may be a cavity, a recess, a hole, or a hollow.

The receptor 312 may be supported by the cover member 300. For example, the receptor 312 may be coupled with the cover member 300.

For example, the upper surface of the receptor 312 may be coupled or fixed to the inner surface of the upper plate of the cover member 300. For example, the upper surface of the receptor 312 may be coupled or fixed to the inner surface of the upper plate 301 of the cover member 300 by an adhesive. Or, the receptor 312 may comprise a first coupling portion, and the cover member 300 may comprise a second coupling portion being coupled to the first coupling portion of the receptor 312.

In another embodiment, at least a portion of the upper surface of the receptor 212 and/or the membrane 311 may be coupled, attached, or fixed to the inner surface of the upper plate 301 of the cover member 300.

Since the receptor 312 is located on a path through which light passes, it may be implemented with a material having light transmittance, but is not limited thereto.

The accommodating part 315 may have a circular shape when viewed from above, but the embodiment is not limited thereto. According to another embodiment, the accommodating part 315 may have an elliptical or polygonal shape. In this way, if the liquid 313 can be accommodated in the cavity of the receptor 312, the embodiment can be implemented in various shapes of the cavity.

The membrane 311 serves to confine the liquid 313 inside the accommodating part 315 of the receptor 312. The membrane 311 may be expressed by replacing it with a thin film or a fluidized membrane. For example, the membrane 311 may seal the liquid 313 inside the receptor 312.

Referring to FIG. 3a, for example, the membrane 311 may have a shape surrounding the liquid 313 located inside the accommodating part 315, but is not limited thereto.

For example, the accommodating part 315 may have a hole or hollow shape, and the membrane 311 may be located at the upper side and the lower side of the liquid 313, but is not limited thereto. That is, the membrane 311 may comprise a first membrane 311A disposed on an upper surface of the receptor 312 and a second membrane 311B disposed on a lower surface of the receptor 312, and the liquid 313 may be positioned between the first layer 311A and the second layer 311B. At this time, the lower surface of the receptor 312 may be a surface facing the bobbin 110 in the optical axis OA direction, and the upper surface of the receptor 312 may be a surface located on the opposite side of the lower surface of the receptor 312.

Referring to FIG. 3b, for example, the membrane 311 may serve to confine the liquid 313 together with the receptor 312 inside the accommodating part 315. The accommodating part 315 may be in the form of a groove, the liquid 313 may be disposed inside the groove, and the membrane 311 may seal the opening of the groove. For example, the membrane 311 in FIG. 3b may be disposed on a lower surface of the receptor 312.

Since the membrane 311 is disposed on a path through which light passes, it may have light transmittance.

When viewed from above, the membrane 311 may have a circular shape, but the embodiment is not limited thereto. According to another embodiment, when viewed from above, the membrane 311 may have an elliptical shape or a polygonal shape. In this way, as long as the liquid 313 can be confined with the receptor 312, the membrane 311 can be implemented in various shapes.

The membrane 311 may comprise a material having elasticity so that the shape can be deformed by being pressed by the pressing portion.

To this end, the membrane 311 may be a transparent elastic optical membrane. Specifically, the membrane 311 may have high elastic properties and may be chemically stabilized.

For example, the membrane 311 may be made of a material such as polymer, glass, or plastic.

For example, the membrane 311 may be made of a polydimethyl siloxane (PDMS) elastomer, a poly methyl phenyl siloxane (PMPS) elastomer, a fluorosilicone elastomer, and a poly ether elastomer, or propylene oxide elastomer, or polyester elastomer.

In order to confine the liquid 313 together with the receptor 312, the planar area (or diameter) of the membrane 311 may be larger than the planar area (or diameter) of the accommodating part 315. The driving force transmitted from the pressing portion to the membrane 311 may be applied to the liquid 313 and simultaneously applied to the receptor 312 and dispersed.

The lens driving device 100-1 may comprise a pressing portion for applying a driving force to the membrane 311 of the first lens part 310.

The lens driving device 100-1 may move the second lens part 400 in the optical axis direction.

The lens driving device 100-1 may comprise a bobbin 110, a coil 120, and a magnet 130 being coupled to the second lens part 400. Due to the interaction between the coil 120 and the magnet 130, the bobbin 110 may be moved in the optical axis direction. At this time, the bobbin 110 may be a pressing portion for pressing the membrane 311 by transmitting a driving force to the membrane 311 of the first lens part 310.

The lens driving device 100-1 may further comprise at least one among a housing 140, an upper elastic member 150, a lower elastic member 160, a cover member 300, and a base 210.

In addition, the lens driving device 100-1 may further comprise a position sensor 170 and a sensing magnet 180.

In addition, the lens driving device 100-1 may further comprise a circuit board 190 electrically connected to the position sensor 170. In addition, the lens driving device 100-1 may further comprise a balancing magnet 185.

The cover member 300 may be coupled to the base 210, and may form an accommodation space together with the base 210. For example, the cover member 300 may accommodate the bobbin 110 and the lens barrel 400 disposed inside the housing 140.

The cover member 300 has an open lower portion, and may be in the form of a box comprising an upper plate 301 and a side plate 302, and the lower portion of the cover member 300 can be coupled to the upper portion of the base 210 and the upper portion of the cover member 300. The shape of the upper plate 301 of the cover member 300 may be a polygon, for example, a square or an octagon. The side plate of the cover member 300 may correspond to or face the side portion 141 of the housing 140, and both may be disposed parallel to each other.

In the upper plate 301, the cover member 300 may comprise an opening 303 for exposing the second lens part 400 coupled to the bobbin 110 to external light. The material of the cover member 300 may be a non-magnetic material such as SUS in order to inhibit sticking to the magnet 130, but is not limited thereto. In another embodiment, the cover member 300 may be formed of a magnetic material to function as a yoke to increase electromagnetic force due to the interaction between the coil 120 and the magnet 130.

Referring to FIGS. 4*a* and 4*b*, the bobbin 110 may be equipped with a second lens part 400, disposed in the housing 140, and moved in the optical axis OA direction. The bobbin 110 may be expressed by replacing it with a "lens holder" or a "lens accommodating part".

The bobbin 110 may have an opening 13 through which the second lens part 400 is mounted.

For example, the opening 13 may be a through hole penetrating the bobbin 110 in the optical axis OA direction, and the opening 13 may have a circular shape, an elliptical shape, or a polygonal shape, but is not limited thereto.

The bobbin 110 may comprise at least one first coupling portion 113 being formed on an upper surface 14A and being coupled to and fixed to the hole 151*a* of the inner frame 151 of the upper elastic member 150.

The bobbin 110 may comprise at least one second coupling portion 117 being formed on a lower surface 15B and being coupled to and fixed to the hole 161*a* of the inner frame 161 of the lower elastic member 160.

For example, the first coupling portion 113 has a groove shape, and the second coupling portion 117 has a protrusion shape, but is not limited thereto. In another embodiment, each of the first coupling portion and the second coupling portion may be a groove, a protrusion, or a planar shape.

The bobbin 110 may comprise a first escape groove 112*a* provided in an area of the upper surface 15A corresponding to or aligned with the first frame connection part 153 of the upper elastic member 150. The first escape groove 112*a* may be a shape being recessed from the upper surface 15A of the bobbin 110.

In addition, the bobbin 110 may comprise a second escape groove 112*b* provided in an area of the lower surface corresponding to or aligned with the second frame connection portion 163 of the lower elastic member 160. The second escape groove 112*b* may be a shape being recessed from the lower surface 15B of the bobbin 110.

When the bobbin 110 moves in a first direction by the first escape groove 112*a* and the second escape groove 112*b* of the bobbin 110, spatial interference among the first frame connection part 153, the second frame connection part 163, and the bobbin 110 can be eliminated, and accordingly, the first frame connection part 153 and the second frame connection part 163 may be elastically deformed more easily.

In another embodiment, each of the first frame connection part and the second frame connection part and the bobbin are designed not to interfere with each other, so that the first escape groove and/or the second escape groove of the bobbin may not be provided.

The bobbin 110 may comprise a first stopper 114 being protruded from the upper surface toward the upper side direction. For example, since the height of the protruded portion 111, which will be described later, is higher than the height of the first stopper 114, the first stopper 114 may be omitted in another embodiment.

In addition, the bobbin 110 may comprise a second stopper 116 being protruded from the lower surface towards the lower side direction. The first stopper 114 and the second stopper 116 of the bobbin 110 may play the role of inhibiting the upper surface or lower surface of the bobbin 110 from direct collision with the inner wall of the cover member 300, the lower surface of the receptor 312, or the upper surface of the base 210, even if the bobbin 110 moves beyond a prescribed range due to an external impact, and the like when the bobbin 110 moves in a first direction for autofocusing.

The bobbin 110 may comprise at least one groove 105 for disposing the coil 120 on a side surface or an outer side surface.

The coil 120 may be directly wound or wound in the groove 105 of the bobbin 110 so that the coil 120 is disposed or seated in the groove 105 of the bobbin 110, or rotates clockwise or counterclockwise with respect to the optical axis OA.

The shape and number of grooves 105 of the bobbin 110 may correspond to the shape and number of coils being disposed on the outer side surface of the bobbin 110. In another embodiment, the bobbin 110 may not have a groove for seating the coil, and the coil may be directly wound or wound on the outer side surface of the bobbin 110 without a groove to be fixed.

The bobbin 110 may comprise first side portions and second side portions.

In another embodiment, the first side portions of the bobbin 110 may be expressed as "first side surfaces" and the second side portions may be expressed as "second side surfaces". The first side portions of the bobbin 110 may correspond to or face the magnet 130. Each of the second side portions of the bobbin 110 may be disposed between two adjacent first side portions. For example, the groove 105 of the bobbin 110 may be provided to have a ring shape in the first side portions and the second side portions of the bobbin 110, but is not limited thereto.

The coil 120 may be a driving coil being disposed on the outer side surface of the bobbin 110 and electromagnetically interacting with the magnet 130 being disposed on the housing 140.

For example, the coil 120 may be disposed or wound inside the groove 105 of the bobbin 110.

A driving signal (e.g., a driving current or voltage) may be applied to the coil 120 to generate electromagnetic force by interaction with the magnet 130. The driving signal applied to the coil 120 may be a DC signal and/or an AC signal.

The AF movable unit may move in the first direction, for example, in the upward direction (+Z-axis direction) or the downward direction (−Z-axis direction) by the electromagnetic force due to the interaction between the coil 120 and the magnet 130.

The lens driving device may be capable of both unidirectional driving and bidirectional driving for autofocusing. Here, the unidirectional driving refers to moving the AF movable unit in one direction, for example, the upward direction (e.g., +Z axis direction), based on the initial position of the AF movable unit, and bidirectional driving refers to moving the AF movable unit in both directions (e.g., upward or downward direction) based on the initial position of the AF movable unit.

By controlling the strength and/or polarity (e.g., the direction in which current flows) of the driving signal applied to the coil 120, and by adjusting the strength and/or direction of the electromagnetic force by the interaction between the coil 120 and the magnet 130, it is possible to control the movement of the AF movable unit in a first direction, thereby performing an auto-focusing function.

AF movable unit may comprise a bobbin 110 elastically supported by the upper elastic member 150 and the lower elastic member 160, and components mounted on the bobbin 110 to move together with the bobbin 110. For example, the AF movable unit may comprise a bobbin 110, a coil 120, and/or a second lens part 400 mounted on the bobbin 110.

For example, the coil 120 may be disposed on the bobbin 110 to have a closed loop shape. For example, the coil 120 may have a closed loop shape wound in a clockwise or counterclockwise direction about an optical axis, and may be wound or disposed on the outer side surface of the bobbin 110.

In another embodiment, the coil 120 may be implemented in the form of a coil ring wound or disposed in a clockwise or counterclockwise direction about an axis perpendicular to the optical axis, and the number of coil rings may be the same as the number of magnets 130, but is not limited thereto.

The coil 120 may be electrically connected to at least one of the upper elastic member 150 or the lower elastic member 160, and may be electrically connected to the circuit board 190 through the upper elastic member 150 or/and the lower elastic member 160. For example, by solder or conductive adhesive, the coil 120 is coupled to two among the upper springs of the upper elastic member 150, or it can be coupled to two among the lower springs of the lower elastic member, but is not limited thereto.

For example, the coil 120 disposed on the bobbin 110 may be overlapped with the magnet 130 in a direction perpendicular to the optical axis.

The sensing magnet 180 is disposed on the bobbin 110. For example, a seating groove 118a for accommodating or disposing the sensing magnet 180 may be formed on the bobbin 110. The balancing magnet 185 may be disposed on the bobbin 110. For example, the bobbin 110 may have a seating groove 118b in which the balancing magnet 185 is accommodated or disposed.

Each of the sensing magnet 180 and the balancing magnet 185 may be a unipolar magnetized magnet or a bipolar magnetized magnet.

Due to the interaction between the first coil 120 and the first magnet 130, the sensing magnet 180 may move together with the bobbin 110 in the optical axis direction OA, the first position sensor 170 may detect the strength of the magnetic field of the sensing magnet 180 moving in the optical axis direction, and an output signal according to the detected result may be outputted. For example, the control unit 830 of the camera module or the control unit 780 of the terminal may detect displacement of the bobbin 110 in the optical axis direction based on the output signal outputted by the first position sensor 170.

By disposing the balancing magnet 180 on the bobbin 110 to face each other in a direction perpendicular to the sensing magnet 180 and the optical axis, the effect of the magnetic field of the sensing magnet 180 can be canceled, and the weight balance of the AF movable unit can be adjusted, and thus an accurate AF operation can be performed.

In another embodiment, the position sensor 170 may be disposed on the bobbin 110, and the sensing magnet and the balancing magnet are disposed in the housing 140 in response to the position sensor 170 or may be disposed on the cover member 300 in response to the position sensor 170.

The housing 140 accommodates the bobbin 110, in which the coil 120 is disposed, inside thereof.

Referring to FIGS. 5a to 5b, the housing 140 may be in the shape of a column having an opening as a whole, and may comprise a side portion and a corner portion.

The housing 140 may comprise an opening to accommodate the bobbin 110, and the opening may be in the form of a through hole penetrating the housing 140 in the optical axis direction.

The side portions 141 of the housing 140 may correspond to the first side portions 110b-1 of the bobbin 110, and the second side portions 142 of the housing 140 may correspond to the second side portions 110b-2 of the bobbin 110, but is not limited thereto.

In the side portions 141-1 to 141-4 of the housing 140, magnets 130 (130-1 to 130-4) may be disposed or installed, and in any one (e.g., 142-1) among the corner portions 142-1 to 142-4 of the housing 140, a position sensor 170 may be disposed, but is not limited thereto.

In another embodiment, the magnet may be disposed on the corner portions of the housing, and the position sensor may be disposed on any one among the side portions of the housing.

The housing 140 may comprise a magnet seating part 141a provided in the side portions 141-1 to 141-4 to support or accommodate the magnets 130-1 to 130-4.

For example, the magnet seating part 141a may be in the form of a hole penetrating through the side portions 141-1 to 141-4 of the housing 140, but is not limited thereto, and may be in the form of a groove in another embodiment.

Each of the side portions 141-1 to 141-4 of the housing 140 may be disposed parallel to any corresponding one among the side plates of the cover member 300.

In addition, in order to inhibit the upper surface of the housing 140 from directly colliding with the inner surface of the cover member 300 or the lower surface of the receptor 312, a stopper 143 may be provided on an upper surface of the housing 140.

At least one first coupling portion 144 for coupling with the hole 152a of the first outer frame 152 of the upper elastic member 150 may be provided on an upper surface of the housing 140. In addition, at least one second coupling portion 147 for coupling with the hole 162a of the second outer frame 162 of the lower elastic member 160 may be provided on a lower surface of the housing 140.

For example, each of the first coupling portion 144 and the second coupling portion 147 may have a protrusion shape, but is not limited thereto, and may have a groove or planar shape in another embodiment.

In order to inhibit the lower surface or the bottom of the housing 140 from being collided with the base 210, which will be described later, the housing 140 may comprise at least one stopper 145 being protruded from a lower surface.

A guide groove 148 facing the groove part 212 of the base 210 may be provided on a lower portion or lower surface of the corner portions 142-1 to 142-4 of the housing 140.

For example, the guide groove 148 of the housing 140 and the groove part 212 of the base 210 may be coupled to each other by an adhesive member, and the housing 140 may be coupled to the base 210.

The magnet 130 may be disposed in the housing 140.

For example, at the initial position of the bobbin 110, the magnet 130 may be disposed in the housing 140 so that at least a portion is overlapped with the coil 120 in a direction perpendicular to the optical axis OA.

For example, the initial position of the bobbin 110 is the initial position of the AF movable unit (e.g., bobbin) in a state where power or a driving signal and a sensing signal are not applied to the coil 120, and may be a position where the AF movable unit is placed as the upper elastic member 150 and the lower elastic member 160 are elastically deformed only by the weight of the AF movable unit.

In addition to this, the initial position of the bobbin 110 may be a position where the AF movable unit is placed when gravity acts in the direction from the bobbin 110 to the base 210, or vice versa, when gravity acts in the direction from the base 210 to the bobbin 110. The AF movable unit may comprise a bobbin 110 and components mounted on the bobbin 110, for example, a coil 120.

The shape of the magnet 130 may be a rectangular parallelepiped shape with a shape corresponding to the side portions 141-1 to 141-4 of the housing 140, but is not limited thereto, and the surface facing the coil 120 may be formed to correspond to or coincide with the curvature of the corresponding surface of the coil 120.

The magnet 130 may be a unipolar magnetized magnet disposed such that a first surface facing the coil 120 is an N pole and a second surface opposite to the first surface is an S pole, but is not limited thereto, and an N pole and S poles may be opposite. In another embodiment, the magnet 140 may be a bipolar magnetized magnet.

For example, the magnet 130 may be a bipolar magnetized magnet divided into two in a direction perpendicular to the optical axis. For example, the magnet 130 may comprise a first magnet part, a second magnet part, and a non-magnetic partition wall disposed between the first magnet part and the second magnet part.

For example, the first magnet part may be located on an upper portion, the second magnet part may be located on a lower portion, and the first magnet part and the second magnet part may be spaced apart from each other, but is not limited thereto.

The non-magnetic partition wall is a portion having substantially no magnetism and may comprise a section having little polarity, and may be filled with air or made of a non-magnetic material.

In the embodiment, the number of magnets 130 is four, but is not limited thereto, and the number of magnets 130 may be at least two or more, and the surface of the magnet 130 facing the coil 120 may be formed in a flat surface, but is not limited thereto and may be formed in a curved surface.

The magnet 130 may be disposed on at least two or more on the side portions of the housing 140 facing each other, and may be disposed to face each other.

For example, magnets 130-1 to 130-4 may be disposed on the side portions 141-1 to 141-4 of the housing 140. Two pairs of magnets 130-1 to 130-4 facing each other to be crossed may be disposed on the side portions 141-1 to 141-4 of the housing 140. At this time, a plane of each of the magnets 130-1 to 130-4 may have a substantially rectangular shape, or unlike this, a triangular shape or a rhombus shape.

In the embodiment illustrated in FIGS. 5a to 5b, the magnets 130-1 to 130-4 are disposed in the housing 140, but is not limited thereto. In another embodiment, the housing 140 may be omitted, and the magnets 130-1 to 130-4 and the position sensor 170 may be disposed on the cover member 300.

In another embodiment, the housing 140 is not omitted, and the magnets 130-1 to 130-4 and the position sensor 170 may be disposed in the cover member 300.

When the magnets and the position sensor are disposed in the cover member, the magnets may be disposed on side plates of the cover member 300, the position sensor may be disposed in the corner portion of the cover member 300, and at this time, the corner portion of the cover member may be positioned between the side plates of the cover member 300.

In another embodiment, the magnet may be disposed on the bobbin 110, and the coil may be disposed in the housing.

Referring to FIG. 6, the position sensor 170 may be disposed, fixed, or coupled to the housing 140. The circuit board 190 may be disposed in the housing 140 and may be electrically connected to the position sensor 170. For example, the position sensor 170 may be disposed or mounted on the circuit board 190 disposed in the housing 140.

For example, a groove 142a for mounting or disposing the circuit board 190 may be provided in one side portion (e.g., 141-1) of the housing 140, but is not limited thereto. The circuit board 190 may be coupled to the housing 140 by an adhesive or the like.

The circuit board 190 may comprise a body 190-1, and an extended portion 190-2 being connected to the body 190-1.

The body 190-1 may be provided with a plurality of terminals 19-1 to 19-$n$ (natural numbers, where n>1) for being electrically connected to the outside. For example, the plurality of terminals 19-1 to 19-$n$ may be disposed in a line at a lower end of the outer side surface of the body 190-1.

The body 190-1 may be disposed on an outer side surface of any one side portion (e.g., 142-2) of the housing 140 adjacent to the first corner portion 142-1 of the housing 140. The body 190-1 may comprise a lower portion 91a provided with terminals 19-1 to 19-$n$, and an upper part 91b being protruded from the lower part 91a toward the upper side. In the lower part 91a of the body 190-1, a groove or opening 51 may be provided for exposing the magnet 130-2 disposed on any one side portion of the housing 140.

In the lower part 91a of the body 190-1, coupling portions 5a and 5b for connection with the outer frame 162 of the lower side springs 160a and 160b may be provided.

The upper portion 91b of the body 190-1 may be connected to one side region of the upper surface of the lower portion 91a of the body 190-1, and may be connected to the extended portion 190-2.

The extended portion 190-2 may be disposed on the first corner portion 142-1, and one end (e.g., the body 190-1) being disposed on the side portion (e.g., 142-2) of the housing 140, and it can be bent from one end of the upper portion 91b of the body 190-1. For example, a bent portion 191 may be formed between the upper portion 91b of the body 190-1 and the extended portion 190-2.

On a first surface of the extended portion 190-2 of the circuit board 190, pads for electrically connecting to the position sensor 170 may be provided, and the pads of the circuit board 190 may be electrically connected with any corresponding one among the plurality of terminals 19-1 to 19-$n$ through the wires or circuit patterns provided on the circuit board 190. The plurality of terminals 19-1 to 19-$n$ may comprise terminals being electrically connected to the position sensor 170.

The position sensor 170 may be disposed on the first surface or the inner side surface of the extended portion 190-2 of the circuit board 190. Here, the first surface of the extended portion 190-2 mounted on the housing 140 may be an inner side surface of the housing 140 or a surface facing the outer side surface of the bobbin 110.

The position sensor 170 may be disposed at any one (e.g., 142-1) among the corner portions of the housing 140, and the position of the bobbin 110 may be detected through the magnetic field generated by the sensing magnet 180.

The position sensor 170 may detect the strength of the magnetic field generated from the sensing magnet 180 mounted on the bobbin 110 according to the movement of the bobbin 110, and an output signal (e.g., an output voltage) according to the detected result may be outputted.

The position sensor 170 may be implemented in the form of a driver comprising a Hall sensor, or may be implemented as a single position detection sensor such as a Hall sensor. The position sensor 170 may comprise four terminals (e.g., two input terminals and two output terminals) and may be electrically connected to the circuit board 190.

For example, a driving signal inputted to any terminals of the circuit board 190 may be provided to the position sensor 170, and an output of the position sensor 170 may be outputted through other terminals of the circuit board 190.

Referring to FIG. 7, the upper elastic member 150 and the lower elastic member 160 are coupled to the bobbin 110 and the housing 140, and support the bobbin 110.

For example, the upper elastic member 150 may be coupled with an upper portion, an upper surface, or an upper end of the bobbin 110 and an upper portion, an upper surface, or an upper end of the housing 140; and the lower elastic member 160 may be coupled with a lower portion, a lower surface, or a lower end of the bobbin 110 and a lower portion, a lower surface, or a lower end of the housing 140.

At least one of the upper elastic member 150 or the lower elastic member 160 may be divided or separated into two or more. In another embodiment, the upper elastic member 150 or the lower elastic member 160 may not be separated or divided.

The upper elastic member 150 and the lower elastic member 160 may be implemented as leaf springs, but are not limited thereto, and may be implemented as coil springs, suspension wires, and the like.

The upper elastic member 150 may comprise: a first inner frame 151 being coupled with an upper portion, an upper surface, or an upper end of the bobbin 110; a first outer frame 152 being coupled with an upper portion, an upper surface, or an upper end of the housing 140; and a first frame connection part 153 connecting the first inner frame 151 and the first outer frame 152.

In the first inner frame 151 of the upper elastic member 150, a hole 151a being coupled to the first coupling portion 113 of the bobbin 110 may be provided; and in the first outer frame 152, a hole 152a being coupled with the first coupling portion 144 of the housing 140 may be provided.

The lower elastic member 160 may comprise a first lower spring 160a and a second lower spring 160b being spaced apart from each other.

Each of the first and second lower springs 160a and 160b may comprise: a second inner frame 161 being coupled with a lower portion, a lower surface, or a lower end of the bobbin 110; a second outer frame 162 being coupled with a lower portion, a lower surface, or a lower end of the housing 140; and a second frame connection part 163 connecting the second inner frame 161 and the second outer frame 162.

In addition, in the second inner frame 161 of each of the first and second lower springs 160a and 160b, a hole 161a for coupling with the second coupling portion 117 of the bobbin 110 may be provided by soldering or a conductive adhesive member. In the second outer frame 162 of each of the first and second lower springs 160a and 160b, a hole 162a for coupling with the second coupling portion 147 of the housing 140 may be provided.

At one end of the second inner frame 161 of the first lower spring, a first bonding part 7a for coupling to one end of the coil 120 by soldering or a conductive adhesive may be provided; and at one end of the second inner frame 161 of the second lower spring 160b, a second bonding part 7b for coupling to the other end of the coil 120 by soldering or a conductive adhesive may be provided.

At one end of the second outer frame 161 of the first lower spring 160a, a third bonding part 6a for coupling to the first coupling portion 5a of the circuit board 190 by soldering or a conductive adhesive may be provided. At one end of the second outer frame 161 of the second lower spring 160b, a fourth bonding part 6b for coupling to the second coupling portion 5b of the circuit board 190 by soldering or a conductive adhesive may be provided.

The third bonding part 6a and the fourth bonding part 6b may be electrically connected to corresponding two terminals among the plurality of terminals 19-1 to 19-n of the circuit board 190.

A driving signal may be provided to the coil 120 by the circuit board 190 and the first and second lower springs 160a and 160b.

Each of the first frame connection part 153 and the second frame connection part 163 of the upper elastic member 150 and the lower elastic member 160 is formed to be bent or curved at least once or more so that a pattern having a predetermined shape can be formed.

The bobbin 110 may be flexibly (or elastically) supported by the rising and/or lowering operation in the first direction through position change and micro-deformation of the first and second frame connection parts 153 and 163.

In order to absorb and buffer the vibration of the bobbin 110, the lens driving device 100-1 may further comprise a first damper (not shown) disposed between the upper elastic member 150 and the housing 140. For example, a first damper (not shown) may be disposed in a space between the first frame connection part 153 of the upper elastic member 150 and the housing 140.

In addition, for example, the lens driving device 100 may be further provided with a second damper (not shown) disposed between the housing 140 and the second frame connection portion 163 of each of the first and second lower springs 160a and 160b.

In addition, for example, a damper (not shown) may be further disposed between the inner side surface of the housing 140 and the outer circumferential surface of the bobbin 110.

The base 210 may have an opening of the bobbin 110 and/or an opening corresponding to the opening of the housing 140, and it may have a shape that matches or corresponds to the cover member 300, for example, a rectangular shape.

The base 210 may be provided with a step 211 at the lower end of the side surface so that an adhesive can be applied thereto when the cover member 300 is being attached and fixed. At this time, the step 211 may guide the cover member 300 being coupled to the upper side, and may face the lower end of the side plate of the cover member 300.

The base 210 may be disposed below the bobbin 110 and/or the housing 140.

For example, the base 210 may be disposed below the lower elastic member 160.

A coupling portion 212 corresponding to the guide groove 148 of the housing 140 may be provided at an edge of an upper surface of the base 210. The coupling portion of the base 210 may be in the form of a groove, but is not limited thereto, and in another embodiment, it may be in the form of a protruded portion or a column portion being protruded from the upper surface of the base.

Referring to FIG. 9, the second lens part 400 may comprise a lens barrel 410 and a lens array 420 mounted on the lens barrel 410. The lens array 420 may comprise at least one lens. For example, the lens array 420 may be a solid lens and may be formed of glass or plastic, but is not limited thereto.

The lens barrel 400 may comprise: a first portion 411; a second portion 412 disposed on the first portion 411; and a third portion 413 connecting the first portion 411 and the second portion 412.

The first portion 411 may be expressed by replacing it with a "lower portion", the second portion 412 may be expressed by replacing it with an "upper portion", and the third portion 413 may be expressed by replacing it with a "middle portion" or a "connection portion".

The first portion 411 is a portion coupled to the bobbin 110 and may have a cylindrical or polyhedral structure, and a cut surface in a direction perpendicular to the optical axis may have a circular shape, an elliptical shape, or a polygonal shape, but is not limited thereto. For example, the first portion 411 may be formed with a screw thread or a screw groove for being coupled with the bobbin 110, and the bobbin 110 may be formed with a screw thread or a screw groove for being coupled to the first part 411. In another embodiment, the first portion of the lens barrel and/or each thread or thread groove of the bobbin may be omitted.

In addition, the first portion 411 may comprise a first opening exposing a portion (e.g., a lower surface or a lower surface) of the lens array 420. The diameter of the first portion 411 may be smaller than the diameter of the opening 13 of the bobbin 110.

The second part 412 is located on an upper side of the first portion 411, and may have a cylindrical or polyhedral structure, and a cutting plane in a direction perpendicular to the direction from the first portion 411 to the second part 412 may be a circular shape, an elliptical shape, or a polygonal shape. In addition, the second portion 412 may comprise a second opening exposing another portion (e.g., an upper end or an upper surface) of the lens array 420. For example, the diameter of the second portion 412 may be smaller than the diameter of the first portion 411.

For example, the third portion 413 may be positioned between the first portion 411 and the second portion 412, and the outer side surface of the third portion 413 may be a plane parallel to a direction perpendicular to the optical axis, but is not limited thereto. In another embodiment, the outer side surface of the third portion 413 may be an inclined surface inclined with respect to the lower surface of the first portion 411 or the upper surface of the second portion 412. For example, an interior angle formed by the outer side surface of the second portion 412 and the outer side surface of the third portion 413 may be an obtuse angle or a right angle.

For example, in another embodiment, the diameter of the third part may gradually decrease from the first portion to the second portion, and the diameter of the third portion may be within a range between the diameter of the first portion and the diameter of the second portion.

Referring to FIGS. 4a, 8a, 8b, and 10, the bobbin 110 may comprise a protruded portion 111 being protruded from the upper surface 15A toward the membrane 311 of the first lens part 310.

The protruded portion 111 may be expressed by replacing it with a "pressing portion" or a shaper.

The protruded portion 111 of the bobbin 110 may be in contact with the membranes 311B and 311 of the lens part 310, and it may be a pressing portion that presses the membranes 311B and 311 as the bobbin 110 moves in an optical axis direction. In addition, the protruded portion 111 may function as a shaper to make a shape of a liquid lens to have a desired curvature in order to adjust a focal length.

The protruded portion 111 may be protruded from the upper surface 15A of the bobbin 110 in an optical axis direction. The upper end or upper surface of the protruded portion 111 may be positioned higher than the upper end or upper surface of the first stopper 114.

In addition, the upper end or upper surface of the protruded portion 111 based on the upper surface of the bobbin 110 may be positioned higher than the upper end or upper surface of the first coupling portion 113 of the bobbin 110. In particular, when the first coupling portion 113 of the bobbin 110 has a protrusion shape, the upper end or upper surface of the protruded portion 111 may be positioned higher than the upper end or upper surface of the protrusion of the bobbin 110.

For example, the upper surface of the protruded portion 111 may be located closer to the first lens part 310 or the membranes 311B and 311 than the upper surface of the first stopper 114 and the upper surface of the first coupling portion 113.

The upper surface or upper end of the protruded portion 111 may be positioned higher than the upper surface or upper end of the second lens part 400 coupled to the bobbin 110.

For example, the upper surface or upper end of the protruded portion 111 of the bobbin 110 may be located closer to the membranes 311B and 311 of the first lens part 310 than the upper surface or upper end of the second lens part 400 coupled to the bobbin 110.

For example, the upper surface or upper end of the protruded portion 111 of the bobbin 110 may be positioned higher than the upper surface or upper end of the lens barrel 410 of the second lens part 400. For example, the upper surface or upper end of the protruded portion 111 of the bobbin 110 may be located closer to the membranes 311B and 311 of the first lens part 310 than the upper surface or upper end of the lens barrel 410.

For example, the upper surface of the protruded portion 111 may be positioned higher than the upper surface of the second portion 412 of the lens barrel 410. For example, the upper surface of the protruded portion 111 may be located closer to the membranes 311B and 311 of the first lens part 310 than the upper surface of the second portion 412 of the lens barrel 410.

In addition, for example, the upper surface of the protruded portion 111 may be positioned higher than the upper surface of the upper elastic member 150. For example, the upper surface of the protruded portion 111 may be located closer to the membranes 311B and 311 of the first lens part 310 than the upper surface of the upper elastic member 150.

The protruded portion 111 may be spaced apart from the second lens part 400 and may be located outside the second lens part 400. For example, the protruded portion 111 may be disposed to surround the second lens part 400.

For example, the protruded portion 111 may be positioned outside the lens barrel 410 of the second lens part 400. For example, the protruded portion 111 may be spaced apart from the lens barrel 410 and may be disposed to surround the lens barrel 410.

For example, the diameter of the protruded portion 111 may be greater than the diameter of the lens barrel 410. For example, the diameter of the protruded portion 111 may be greater than the diameter of the first portion 411 of the lens barrel 410. Here, the diameter of the protruded portion 111 may be a cross-sectional length of the protruded portion 111 in a direction perpendicular to the optical axis OA, and the diameter of the lens barrel 410 may be a cross-sectional length of the lens barrel 410 in a direction perpendicular to the optical axis OA.

For example, the diameter of the protruded portion 111 may be smaller than the diameter of the accommodating part of the receptor 312. Or, the diameter of the protruded portion 111 may be smaller than a cross-sectional length in a direction perpendicular to the optical axis of the liquid 313 located in the accommodating part of the receptor 312.

For example, the center 309 of the first lens part 310 and the center 308 of the second lens part 400 may be aligned or overlapped with each other, but is not limited thereto. For example, the center of the first lens part 310 may be the center of the liquid 313 located in the receptor 312, and may be aligned with or overlapped with the optical axis OA. In addition, for example, the center of the second lens part 400 may be the center of the lens barrel 410 or the center of the lens array 420.

In addition, referring to FIG. 10, the distance D11 between the optical axis OA and the protruded portion 111 in a direction perpendicular to the optical axis OA may be greater than the distance D12 between the optical axis OA and the outer side surface of the lens barrel 400 in a direction perpendicular to the optical axis OA (D11>D12).

For example, the protruded portion 111 may be formed in the same shape as the opening 13 of the bobbin 110 along the opening 13 of the bobbin 110. For example, when viewed from above, the shape of the protruded portion 111 may be the same shape as the opening 13 of the bobbin 110, for example, a circular shape, an elliptical shape, or a polygonal shape.

For example, the regions of the membranes 311B and 311 being in contact with the protruded portion 111 may have the same shape as the protruded portion 111.

For example, the inner side surface 11A of the protruded portion 111 may be parallel to the inner side surface 12A of the bobbin 110 and may be located on the same line, but is not limited thereto. In another embodiment, the inner side surface 11A of the protruded portion 111 may have a step in a direction perpendicular to the optical axis and the inner side surface 12A of the bobbin 110.

The distance between the protruded portion 111 and the side plate 302 of the cover member 300 in a direction perpendicular to the optical axis is smaller than the distance between the lens barrel 410 and the side plate 302 of the cover member 300 in a direction perpendicular to the optical axis.

For example, the distance between the protruded portion 111 and the side plate 302 of the cover member 300 in a direction perpendicular to the optical axis may be smaller than the distance between the first portion 411 of the lens barrel 410 and the side plate 302 of the cover member 300 in a direction perpendicular to the optical axis.

Referring to FIG. 8a, the distance D1 between the protruded portion 111 and the inner side surface of the housing 140 in a direction perpendicular to the optical axis OA may be less than the distance D2 between the outer side surface of the lens barrel 410 and the inner side surface of the housing 140 in a direction perpendicular to the optical axis OA (D1<D2).

For example, the distance between the protruded portion 111 and the inner side surface of the housing 140 in a direction perpendicular to the optical axis may be smaller than the distance between the outer side surface of the first part 411 of the lens barrel 410 and the inner side surface of the housing 140 in a direction perpendicular to the optical axis.

In addition, for example, the distance between the protruded portion 111 and the side plate 302 of the cover member 300 in a direction perpendicular to the optical axis may be larger than the distance between the coil 120 and the side plate 302 of the cover member 300 in a direction perpendicular to the optical axis, but in another embodiment, the former may be the same as or smaller than the latter.

A distance between the protruded portion 111 and the side plate 302 of the cover member 300 in a direction perpendicular to the optical axis may be larger than the distance between the sensing magnet 180 and the side plate 302 of the cover member 300 in a direction perpendicular to the optical axis, but in another embodiment, the former may be the same as or smaller than the latter.

For example, at the initial position of the bobbin 110, the protruded portion 111 may be in contact with the membranes 311B and 311. For example, the protruded portion 111 of the bobbin 110 may be coupled or attached to the membranes 311B and 311 by an adhesive. At this time, at the initial position of the bobbin, the protruded portion 111 does not press the membranes 311B and 311, and a driving force may not be delivered to the membranes 311B and 311. That is, at the initial position of the bobbin 110, the membranes 311B and 311 of the first lens part 310 may have a planar shape parallel to the direction perpendicular to the optical axis OA, and the first lens part 310 may have a planar lens shape.

In another embodiment, at the initial position of the bobbin 110, the protruded portion 111 of the bobbin 110 may not be in contact with the membranes 311B and 311, and may be located apart from the membranes 311B and 311. In this case, the protruded portion 111 of the bobbin 110 may come into contact with the membranes 311B and 311 when the bobbin 110 is being moved by a predetermined distance from the initial position toward the membranes 311B and 311.

For example, the separation distance between the protruded portion 111 of the bobbin 110 and the membranes 311B and 311 at the initial position of the bobbin 110 may be smaller than a stroke range of the bobbin 110 for AF driving.

When the upper surface of the protruded portion 111 is in contact with the membranes 311B and 311 to press the membranes 311B and 311, since the membranes 311B and 311 and the liquid 313 become convex toward the bobbin 110, the first lens part 310 may have a convex lens shape. The curvature of the convex lens of the first lens part 310 may be changed based on the pressure of the protruded portion 111 pressing the membranes 311B and 311, and the focal length of the first lens part 310 can be adjusted.

In another embodiment, the protruded portion 111 may comprise a plurality of portions spaced apart from each other, and the membranes 311B and 311 may be pressed by the plurality of portions.

For example, in another embodiment, the protruded portion, which is the pressing portion, may have a convex portion or a concave portion disposed or formed at a preset point (or location), and at this time, the portion that presses the liquid lens may be the uppermost end or upper surface of the convex portion. That is, in another embodiment, the pressing portion may comprise a plurality of intermittent and spaced apart convex portions or concave portions.

In general, in order to pressurize the membrane of a liquid lens, a pressing portion or actuator separate from a lens driving device equipped with a solid lens is required. However, in the embodiment, since the bobbin 110 of the lens driving device directly presses the first lens part 310 that is a liquid lens, there is no need for a separate pressing portion or actuator.

In addition, since the first lens part 310 is pressed by the bobbin 110 regardless of the shape of the lens barrel mounted on the bobbin 110, the embodiment may serve as a pressing portion without restrictions on the lens barrel.

In addition, since the protruded portion 111 located on the outside of the lens barrel presses the membranes 311B and 311 and the liquid 313, the size (e.g., diameter) of the convex lens of the first lens part 310 being formed may be increased.

In addition, the focal length of the second lens part 400 is adjusted by the lens driving device 100-1, and at the same time, the focal length of the first lens part 310 may be adjusted due to the pressing of the protruded portion 111 of the bobbin 110. In an embodiment, the focal length of the lens module 200-1 may be finely adjusted by the first lens part 310.

For example, for a close-up mode of the camera, the pressing portion may press the liquid lens of the first lens part 310. For example, the pressing portion may press the liquid lens of the first lens part 310 to adjust the focal length of the close-up mode of the camera. For example, the close-up mode may be the case in which the distance between the subject and the camera (or lens module) may be 10 cm or less, 5 cm or less, or 2 cm or less.

Or, for example, when the subject is spaced apart by exceeding the separation distance in the close-up mode, the pressing portion may be spaced apart from the liquid lens in order to focus the subject.

Or, in an embodiment in which the pressing portion and the liquid lens are bonded or coupled, when the subject is separated by exceeding the separation distance in close-up mode, the shape of the liquid lens may become concave as the bobbin 110 moves to the infinity position to focus on the subject.

For example, in the case of unidirectional driving, the initial position of the bobbin 110 may correspond to an infinity position, and at the initial position of the bobbin 110, the liquid lens is not pressed by the pressing portion, but the pressing portion may only be in contact with the liquid lens. At this time, the shape of the liquid lens may be a flat shape. As the bobbin 110 is moved from the initial position to the macro position, the pressing portion presses the liquid lens, and as a result, the liquid lens may have a convex lens shape toward the subject.

Or, for example, in the case of bidirectional driving, as the bobbin 110 moves from the initial position to the infinity position, the pressing portion may be spaced apart from the liquid lens. Or, in an embodiment in which the pressing portion is attached or coupled to the liquid lens, as the bobbin 110 moves from the initial position to the infinity position, the shape of the liquid lens may have a convex lens shape in a direction opposite to the direction directing from the camera (or lens module) toward the subject.

The macro position may be a position corresponding to the maximum stroke or maximum displacement of the bobbin in the direction of the subject, and the infinity position may be a position corresponding to the maximum stroke or maximum displacement of the bobbin 110 in a direction opposite to the direction directing toward the subject direction.

Figure 11:
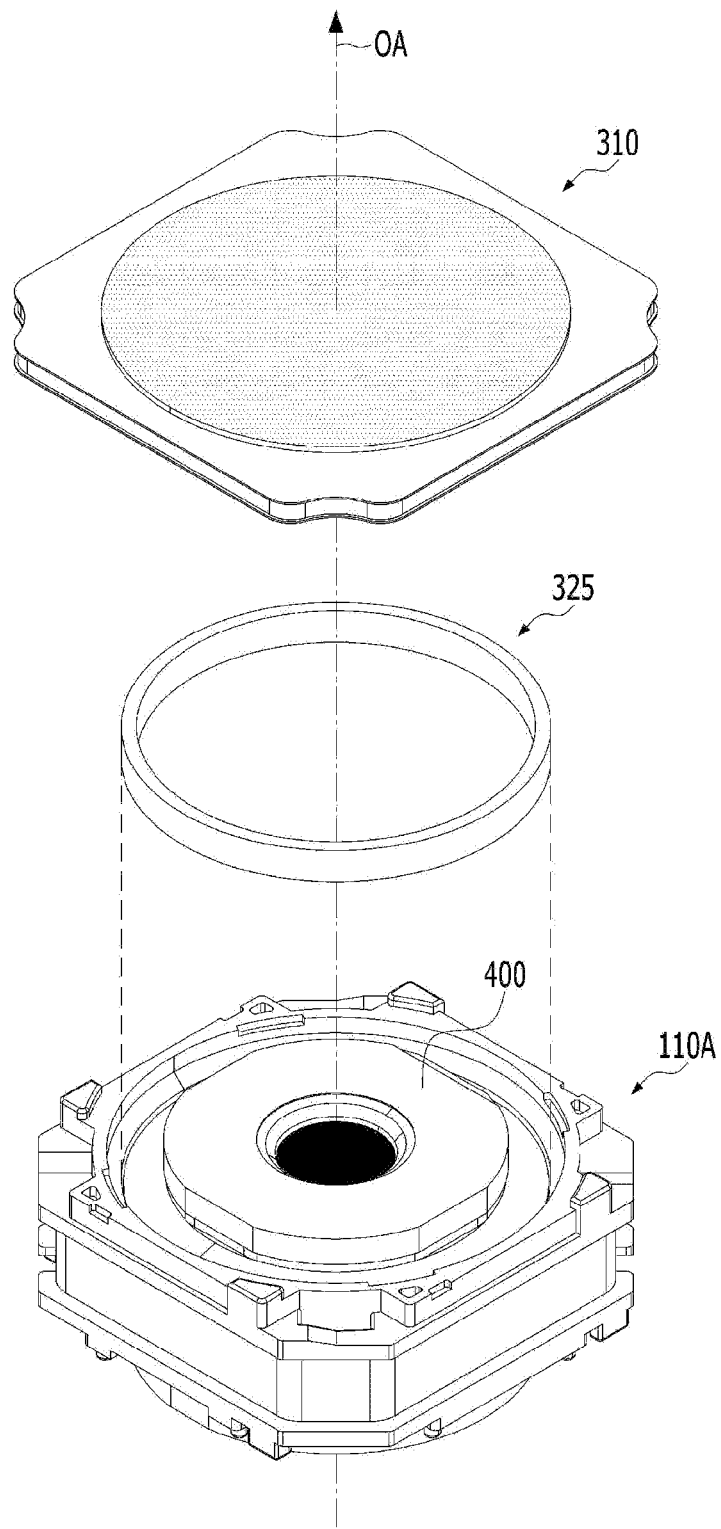
Figure 12:
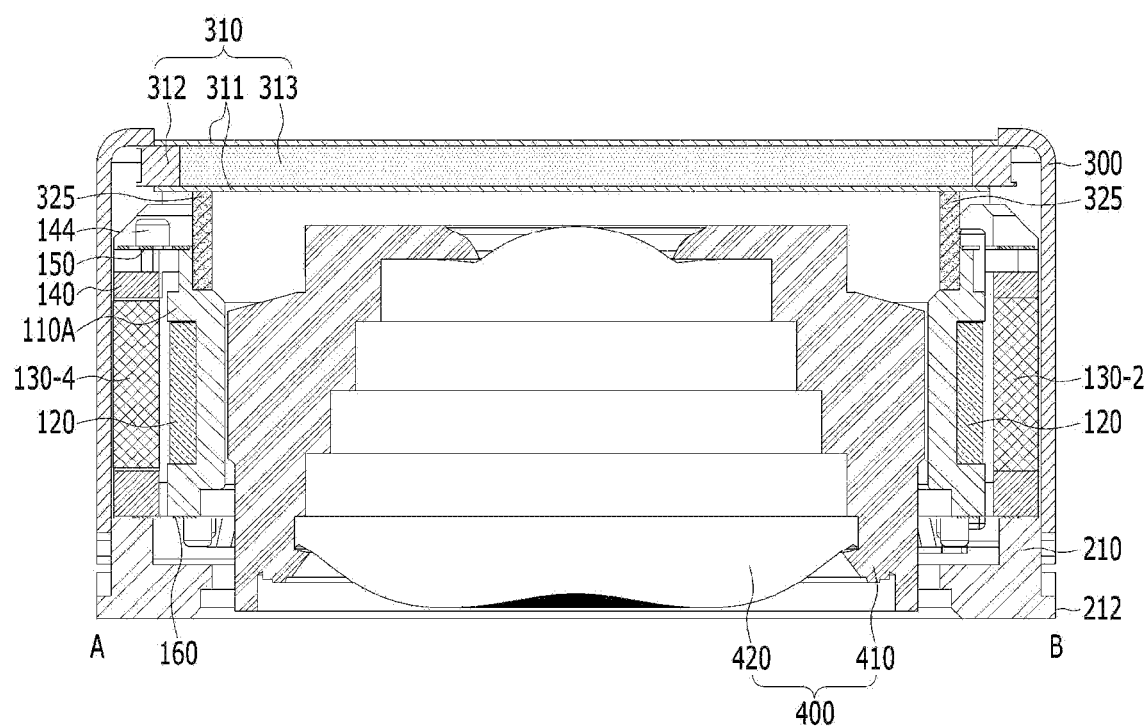
FIG. 12 is a cross-sectional view of a lens module according to a modified embodiment in FIG. 11.

FIG. 11 shows a modified embodiment of the bobbin 110 of FIG. 4a, and FIG. 12 shows a cross-sectional view of a lens module according to the modified embodiment of FIG. 11.

In FIG. 4a, the protruded portion 111 as a pressing portion is formed as a part of the bobbin 110 so that the protruded portion 111 and the bobbin 110 are integrally formed, however, in FIGS. 11 and 12, the bobbin 110A is not provided with a protruded portion 111, and the pressing frame 325 may be provided separately from the bobbin 110A. The pressing frame 325 may be express by replaced it with a "pressing portion" or a "frame".

The pressing frame 325 may be disposed between the upper surface of the bobbin 110A and the membranes 311B and 311 of the first lens part 310, and the membranes 311B and 311 and the liquid 313 may be pressurized by the movement of the bobbin 110A in an optical axis direction.

For example, the shape of the pressing frame 325 viewed from above may be a circular shape, an elliptical shape, or a polygonal shape, but is not limited thereto.

The pressing frame 325 may be located outside the lens barrel 410 of the second lens part 400. For example, a lower portion or a lower surface of the pressing frame 325 may be in contact with, coupled to, or attached to an upper surface of the bobbin 110.

In addition, for example, an upper portion or an upper surface of the pressing frame 325 may be in contact with, or coupled to, or attached to the membranes 311B and 311.

The distance between the pressing frame 325 and the side plate 302 of the cover member 300 in a direction perpendicular to the optical axis is smaller than the distance between the lens barrel 410 and the side plate 302 of the cover member 300 in a direction perpendicular to the optical axis.

For example, the distance between the pressing frame 325 and the side plate 302 of the cover member 300 in a direction perpendicular to the optical axis may be smaller than the distance between the first portion 411 of the lens barrel 410 and the side plate 302 of the cover member 300 in a direction perpendicular to the optical axis.

For example, the pressing frame 325 may be spaced apart from the lens barrel 410 in a direction perpendicular to the optical axis.

The description of the protruded portion 111 described in FIGS. 1 to 10 may be applied or analogously applied to the pressing frame 325 of FIGS. 11 and 12, and all may be applied or analogously applied to the pressing portion according to the embodiment to be described hereinafter.

In addition, since the first lens part 310 is pressed by the bobbin 110 and the pressing frame 325 regardless of the shape of the lens barrel mounted on the bobbin 110, the embodiment may serve as a pressing portion without restrictions on the lens barrel.

In addition, since the pressing frame 325 located on the outside of the lens barrel presses the membranes 311B and 311 and the liquid 313, the size (e.g., diameter) of the convex lens of the first lens part 310 being formed in the direction perpendicular to the optical axis of the convex may be increased.

Figure 13:
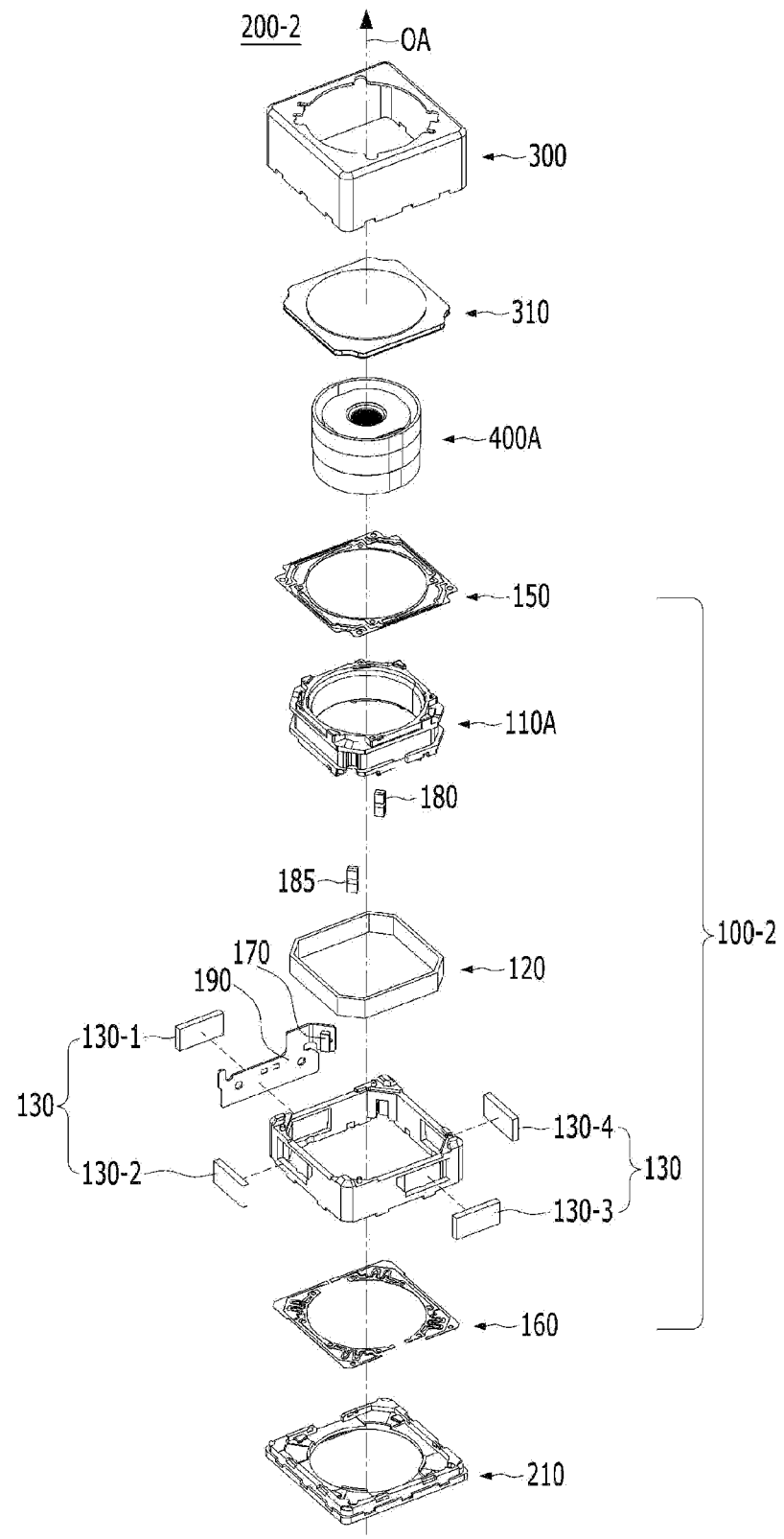
FIG. 13 is an exploded perspective view of a lens module according to another embodiment.
Figure 14:
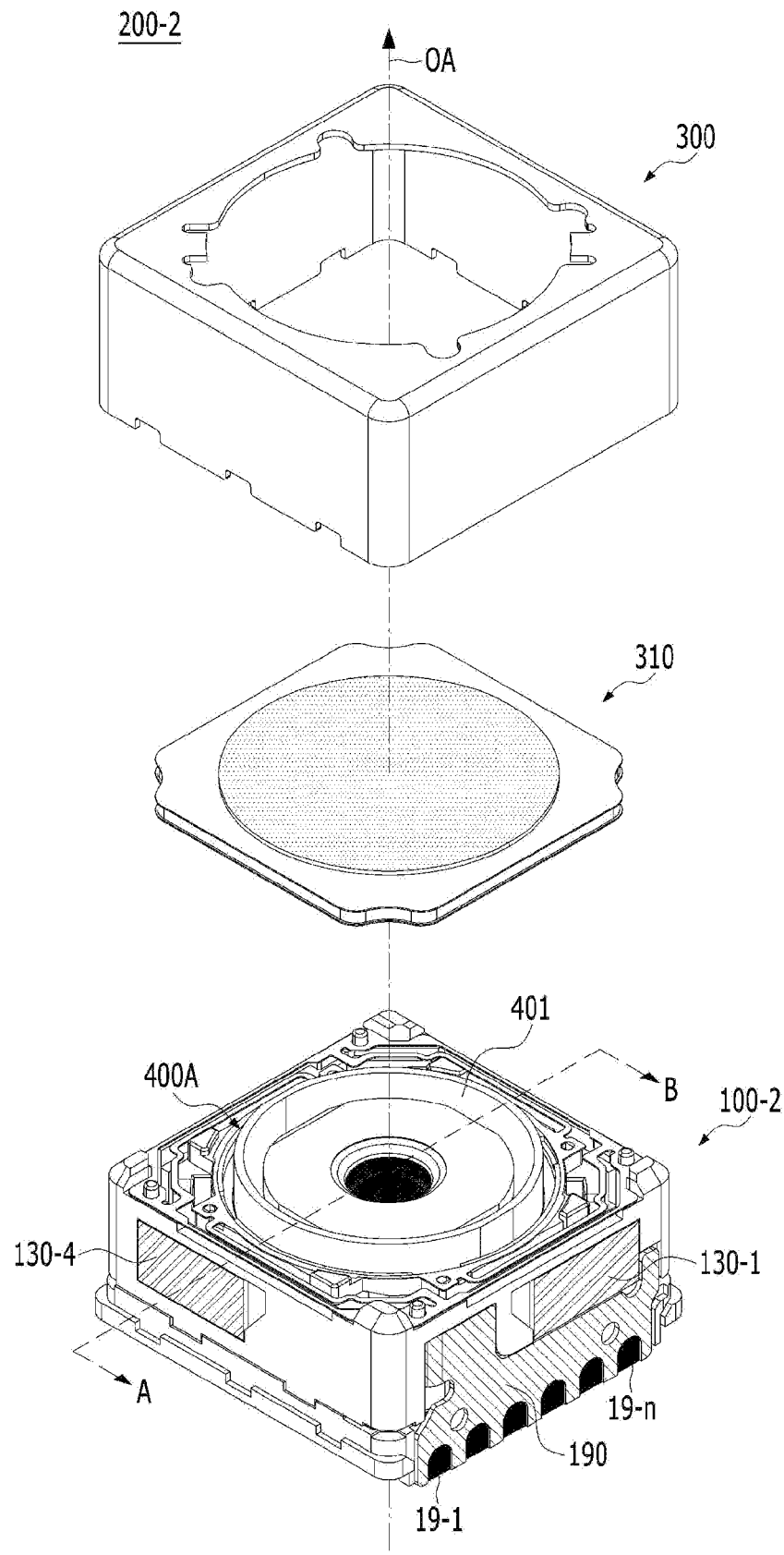
FIG. 14 is a perspective view in which a lens driving device and a second lens part are coupled in FIG. 13.
Figure 15:
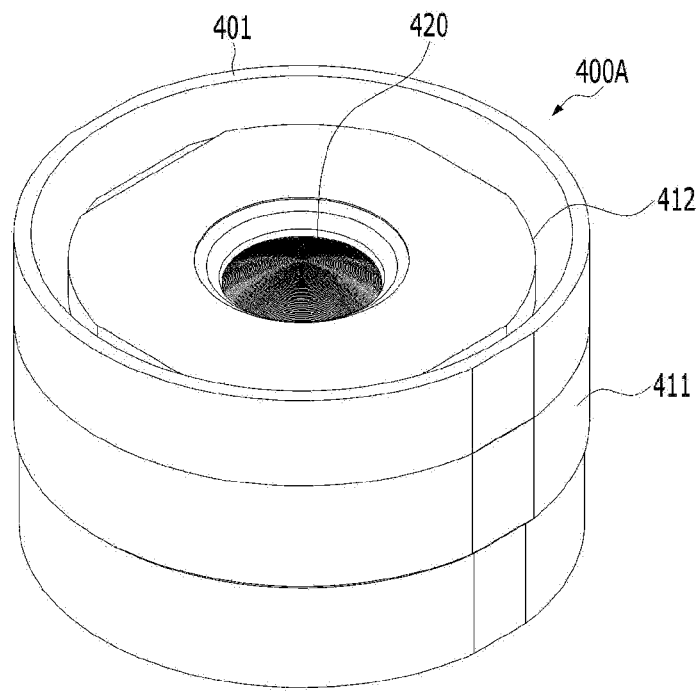
FIG. 15 is a perspective view of a second lens part in FIG. 13.
Figure 16:
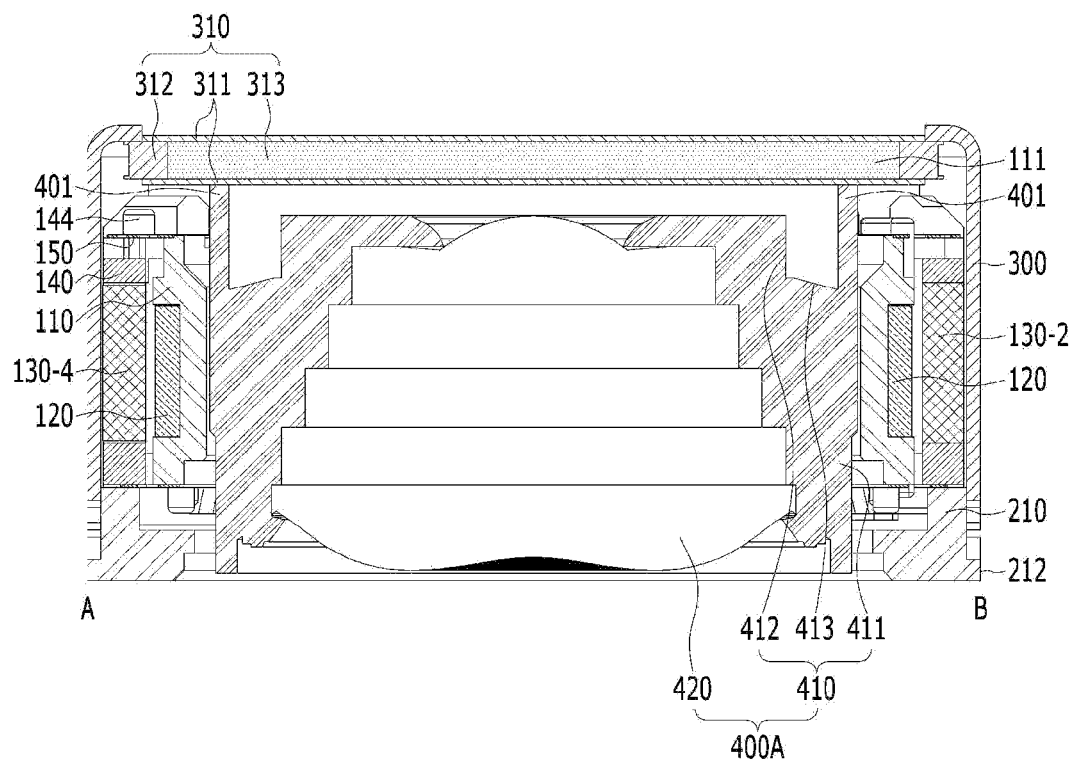
FIG. 16 is a cross-sectional view of a lens module in the AB direction in FIG. 14.

FIG. 13 is an exploded perspective view of a lens module 200-2 according to another embodiment; FIG. 14 is a perspective view in which a lens driving device 100-2 and a second lens part 400A are coupled in FIG. 13; and FIG. 15 is a perspective view of a second lens part 400A in FIG. 13;

and FIG. 16 is a cross-sectional view of a lens module 200-2 in the AB direction in FIG. 14. In FIGS. 13 to 16, the same reference numerals as those of FIGS. 1 to 12 denote the same components, and descriptions of the same components are simplified or omitted.

Referring to FIGS. 13 to 16, the lens module 200-2 may comprise a first lens part 310, a second lens part 400A, and a lens driving device 100-2.

In the lens module 200-2, the protruded portion 111 of the lens module 200-1 is formed in the lens barrel 410A.

That is, the protruded portion 111 of the bobbin 110 of the lens module 200-1 may be omitted, and the protruded portion 401 may be formed in the lens barrel 410A.

Referring to FIGS. 15 and 16, for example, a lens barrel 410A may comprise: a first portion 411 being coupled to the bobbin 110; a second portion 412 being disposed on the first portion 411; a third portion 413 connecting the first portion 411 and the second portion 412; and a protruded portion 401 being protruded from the third portion 413 in the direction toward the optical axis OA or the membranes 311A and 311.

The protruded portion 401 may be protruded or extended from the outer side surface of the third portion 413 of the lens barrel 410A toward the membranes 311A and 311. For example, the protruded portion 401 may be spaced apart from the second portion 412 of the lens barrel 410A. Or, for example, the protruded portion 401 may be in contact with or adjacent to the first portion 411 of the lens barrel 410A.

For example, the protruded portion 401 may be located closer to the first portion 411 than the second portion 412 of the lens barrel 410A. In another embodiment, the protruded portion 401 may be located closer to the second portion 412 than the first portion 411 of the lens barrel 410A or may be located at the same distance.

The protruded portion 401 of the lens barrel 410A may be in contact with the membranes 311B and 311 of the lens part 310, and it may be a pressing portion for pressing the membranes 311B and 311 as the lens barrel 410A is moved in the optical axis direction together with the bobbin 110. In addition, the protruded portion 401 may function as a shaper to shape a liquid lens to have a desired curvature in order to adjust a focal length.

For example, the upper surface or upper end of the protruded portion 401 of the lens barrel 410A may be positioned higher than the upper surface or upper end of the bobbin 110. For example, the upper surface or upper end of the protruded portion 401 may be located closer to the membranes 311B and 311 of the first lens part 310 than the upper surface or upper end of the bobbin 110.

The upper end or upper surface of the protruded portion 401 of the lens barrel 410A may be positioned higher than the upper end or upper surface of the first stopper 114 of the bobbin 110.

In addition, the upper end or upper surface of the protruded portion 401 of the lens barrel 410A may be positioned higher than the upper end or upper surface of the first coupling portion 113 of the bobbin 110. In particular, when the first coupling portion 113 of the bobbin 110 is in the form of a protrusion, the upper end or upper surface of the protruded portion 401 of the lens barrel 410A may be positioned higher than the upper end or upper surface of the protrusion of the bobbin 110.

For example, the upper surface of the protruded portion 401 of the lens barrel 410A may be located closer to the membranes 311B and 311 of the first lens part 310 than the upper surface of the first stopper 114 and the upper surface of the first coupling portion 113.

The upper surface or upper end of the protruded portion 401 of the lens barrel 410A may be positioned higher than the upper surface or upper end of the second portion 412 of the lens barrel 410A.

For example, the upper surface or upper end of the protruded portion 401 may be located closer to the membranes 311B and 311 of the first lens part 310 than the upper surface or upper end of the second part 412 of the lens barrel 410A.

In addition, for example, the upper surface of the protruded portion 401 may be positioned higher than the upper surface of the upper elastic member 150. For example, the upper surface of the protruded portion 401 may be located closer to the membranes 311B and 311 of the first lens part 310 than the upper surface of the upper elastic member 150.

The protruded portion 401 may be spaced apart from the bobbin 110.

In addition, for example, at least a portion of the protruded portion 401 may be protruded out of the opening of the bobbin 110. In addition, for example, at least another portion of the protruded portion 401 may be located inside the bobbin 110.

For example, the diameter of the protruded portion 401 may be smaller than the diameter of the opening of the bobbin 110.

For example, the diameter of the protruded portion 401 may be the same as or smaller than the diameter of the first portion 411 of the lens barrel 410A. Here, the diameter of the protruded portion 401 may be a cross-sectional length of the protruded portion 401 in a direction perpendicular to the optical axis OA.

For example, the diameter of the protruded portion 401 may be smaller than the diameter of the accommodating part of the receptor 312. Or, the diameter of the protruded portion 401 may be smaller than the cross-sectional length of the liquid 313 located inside the accommodating part 315 of the receptor 312 in a direction perpendicular to the optical axis.

For example, the protruded portion 401 may be formed in the same shape as the opening 13 of the bobbin 110 along the opening 13 of the bobbin 110. For example, when viewed from above, the shape of the protruded portion 401 may be the same shape as the opening 13 of the bobbin 110, for example, a circular shape, an elliptical shape, or a polygonal shape.

For example, regions of the membranes 311B and 311 being in contact with the protruded portion 401 may have the same shape as the protruded portion 111.

For example, the outer side surface of the protruded portion 401 may be parallel to and collinear with the outer side surface of the first portion 411 of the lens barrel 410A, but is not limited thereto. In another embodiment, the outer side surface of the protruded portion 401 may have a step in a direction perpendicular to the optical axis and the outer side surface of the lens barrel 410A.

For example, the distance between the protruded portion 401 and the side plate 302 of the cover member 300 in a direction perpendicular to the optical axis may be greater than the distance between the bobbin 110 and the side plate 302 of the cover member 300 in a direction perpendicular to the optical axis.

In addition, for example, the distance between the protruded portion 401 and the side plate 302 of the cover member 300 in a direction perpendicular to the optical axis may be larger than the distance between the coil 120 and the side plate 302 of the cover member 300 in a direction perpendicular to the optical axis.

The distance between the protruded portion 401 and the side plate 302 of the cover member 300 in a direction perpendicular to the optical axis may be larger than the distance between the sensing magnet 180 and the side plate 302 of the cover member 300 in a direction perpendicular to the optical axis.

Figure 17:
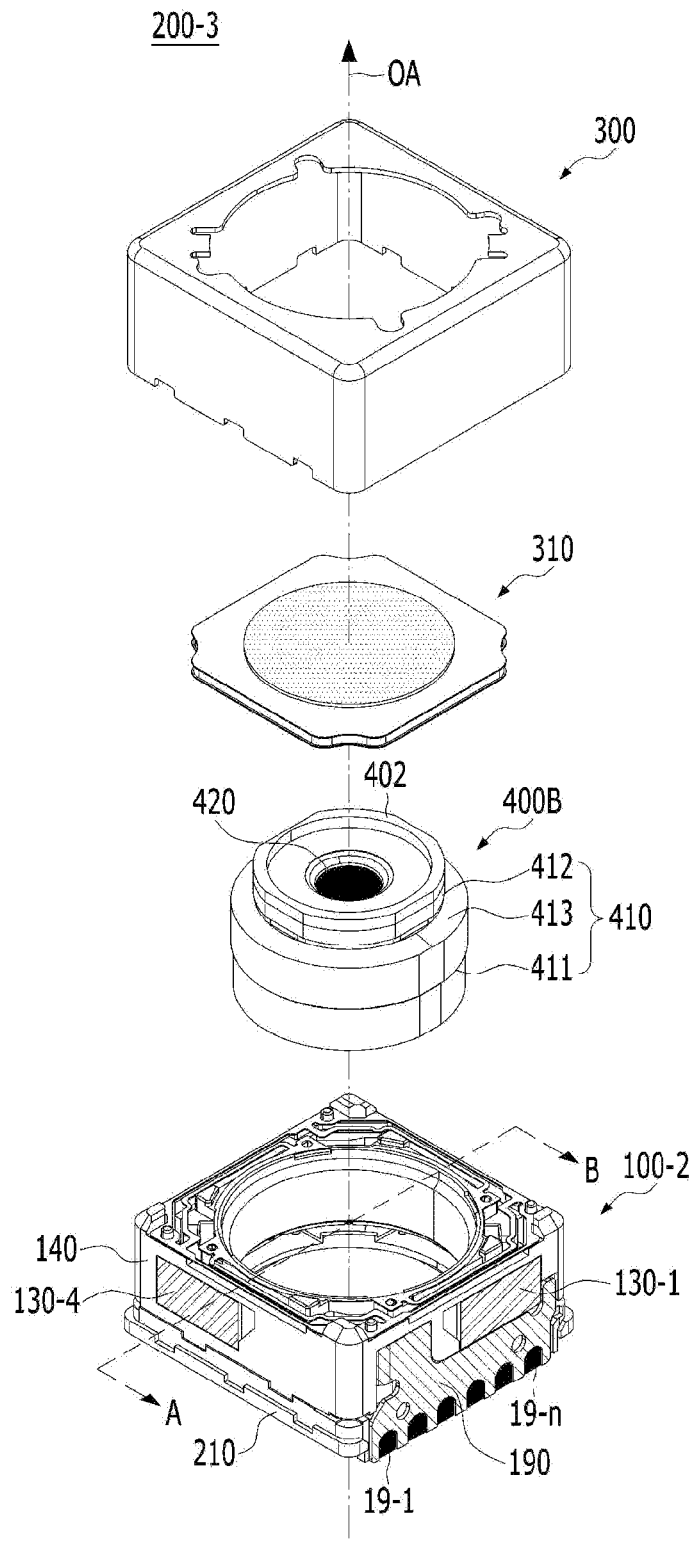
FIG. 17 is an exploded perspective view of a lens module according to another embodiment.
Figure 18:
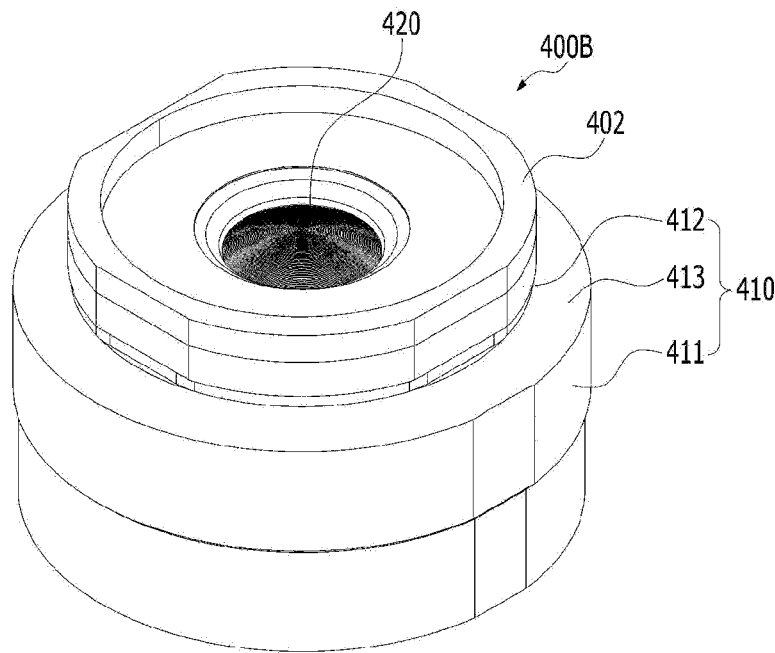
FIG. 18 is a perspective view of a second lens part in FIG. 17.

FIG. 17 is an exploded perspective view of a lens module 200-3 according to another embodiment; FIG. 18 is a perspective view of a second lens part 400B in FIG. 17; and FIG. 19 is a cross-sectional view of the lens module 200-3 in the AB direction in FIG. 17.

Figure 19:
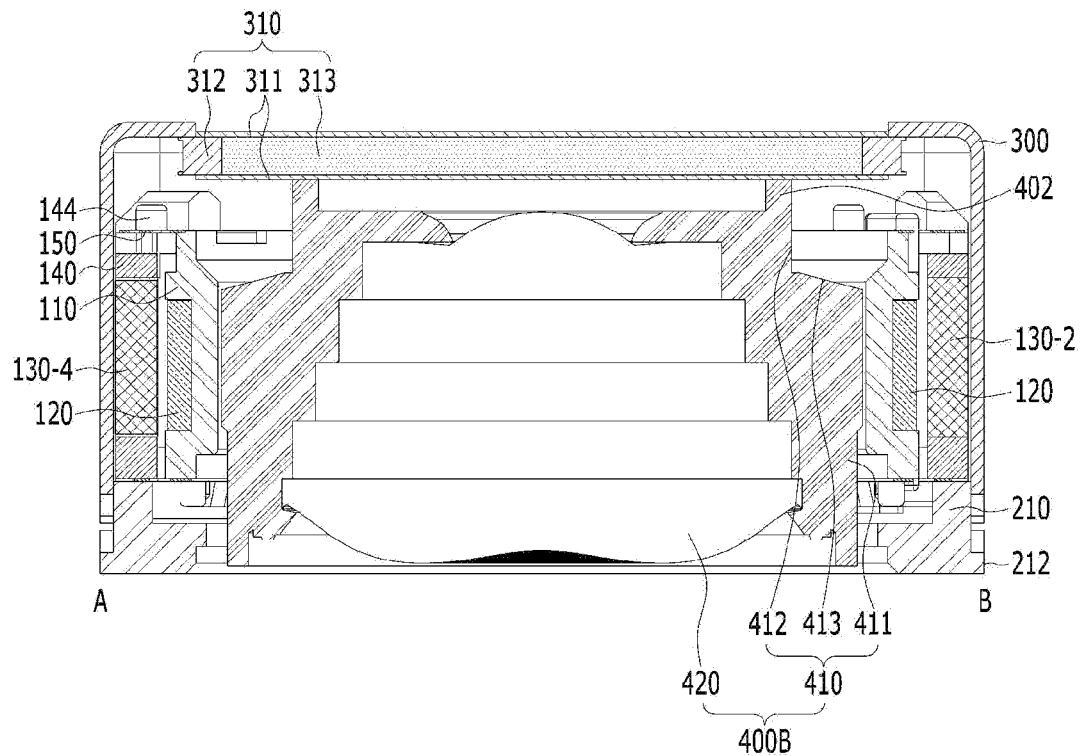
FIG. 19 is a cross-sectional view of a lens module in a direction AB in FIG. 17.

In FIGS. 17 to 19, the same reference numerals as those of FIGS. 1 to 16 denote the same components, and descriptions of the same components are simplified or omitted.

Referring to FIGS. 17 to 19, the lens module 200-3 may comprise a first lens part 310, a second lens part 400B, and a lens driving device 100-2.

Compared with the lens barrel 400A in FIG. 15, in the lens barrel 400B of the second lens part 400B, a protruded portion 402 may be disposed on an upper surface of the second portion 412 of the lens barrel 400B.

That is, the lens barrel 400B may comprise: a first portion 411 for coupling with the bobbin 110; a second portion 412 being disposed on the first portion 411; a third portion 413 connecting the first portion 411 and the second portion 412; and a protruded portion 402 being protruded from an upper surface of the second portion 412 in an optical axis direction or toward membranes 311A and 311 of the first lens part 310.

The protruded portion 402 may be spaced apart from the first portion 411. The point that the protruded portion 402 is formed on an upper surface of the second portion 412 of the lens barrel 400B is only different from the protruded portion 401 of the lens barrel 400A in FIG. 15, and the description of the protruded portion 401 may be applied or analogically applied to the protruded portion 402 in FIG. 18.

Figure 20:
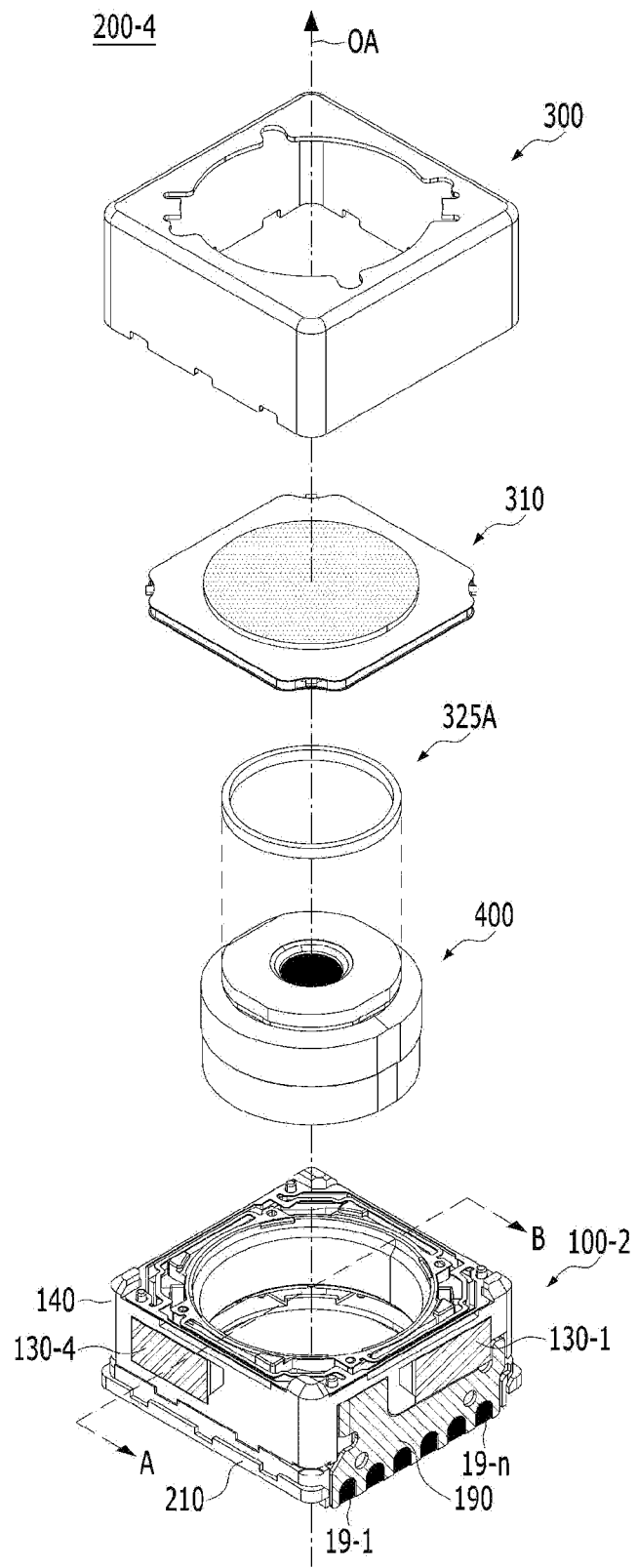
FIG. 20 is an exploded perspective view of a lens module according to another embodiment.
Figure 21:
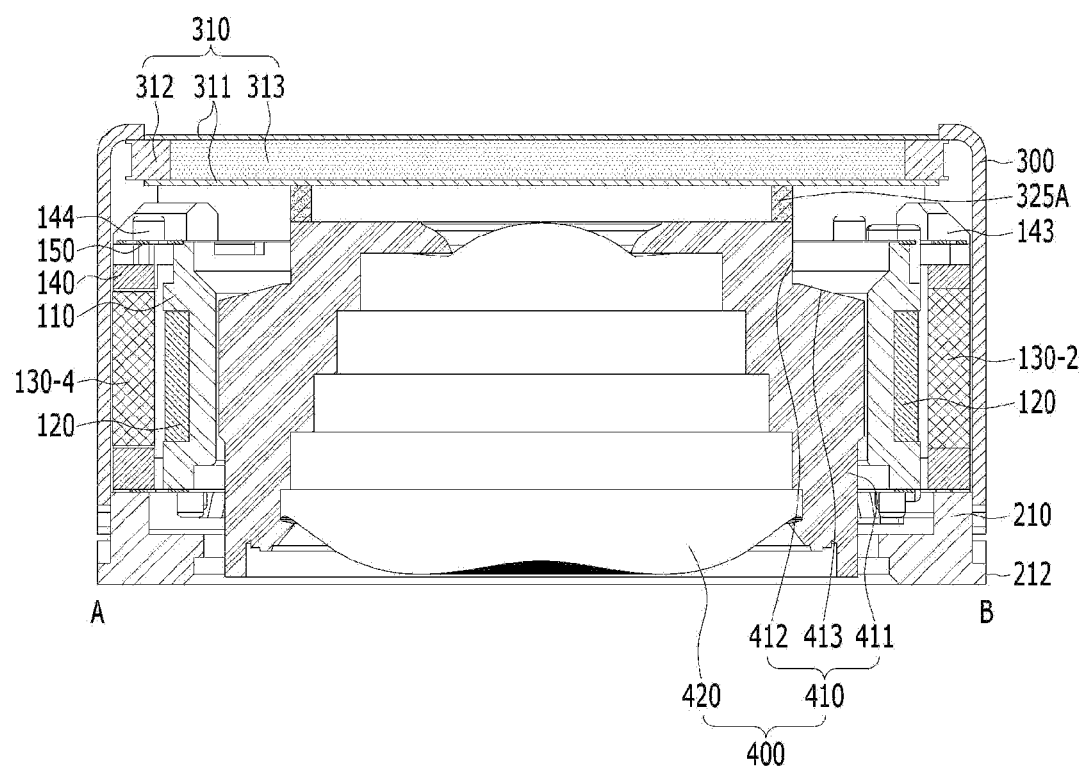
FIG. 21 is a cross-sectional view of a lens module in a direction AB in FIG. 20.

FIG. 20 is an exploded perspective view of a lens module 200-4 according to another embodiment; and FIG. 21 is a cross-sectional view of a lens module 200-4 in a direction AB in FIG. 20.

Referring to FIGS. 20 and 21, FIG. 20 is a modified embodiment of the embodiment illustrated in FIGS. 17 to 19.

In FIGS. 17 to 19, the protruded portion 402, which is a pressing portion, is formed as a part of the lens barrel 400B so that the protruded portion 402 and the lens barrel 400B are integrally formed, but in FIGS. 20 and 21, the protruded portion 402 is not provided in the lens barrel 400, and the pressing frame 325A may be provided separately from the lens barrel 400. The pressurizing frame 325A may be expressed by replacing it with a "pressing portion" or a "frame".

The pressing frame 325A may be disposed between the upper surface of the lens barrel 400 and the membranes 311B and 311 of the first lens part 310, and the membranes 311B and 311 and liquid 313 can be pressurized by moving the lens barrel 400 together with the bobbin 110A in an optical axis direction.

For example, the shape of the pressing frame 325A viewed from above may be a circular shape, an elliptical shape, or a polygonal shape, but is not limited thereto.

The pressing frame 325A may be disposed between the upper surface of the second part 412 of the lens barrel 410 and the membranes 311B and 311.

For example, the lower or lower surface of the pressing frame 325A may be in contact with, coupled to, or attached to an upper surface of the second portion 412 of the lens barrel 410.

In addition, for example, the upper or upper surface of the pressing frame 325A may be in contact with, or coupled to, or attached to the membranes 311B and 311.

The description of the protruded portion 402 of FIGS. 17 to 19 may be applied to the pressing frame 325A or analogously applied.

In another embodiment, the pressing frame may be an example in which the protruded portion 401 of the lens barrel 400A illustrated in FIGS. 13 to 16 is modified. In this example, the protruded portion 401 of the lens barrel 400A may be omitted to have the same shape as the lens barrel 400, a lens barrel 400 and a separate pressing frame may be provided, and the pressing frame may be disposed between the third portion 413 of the lens barrel 400 and the membranes 311A and 311. At this time, the description of the protruded portion 401 may be applied to the pressing frame or analogously applied.

Figure 22:
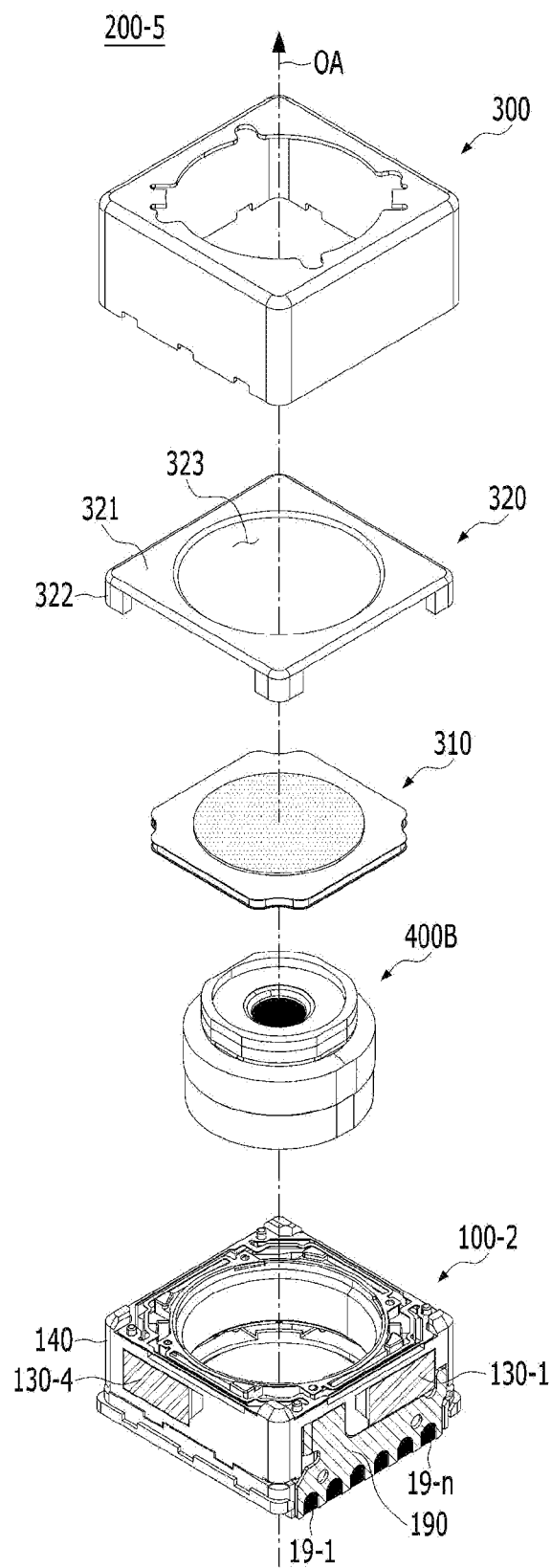
FIG. 22 is an exploded perspective view of a lens module according to another embodiment.
Figure 23:
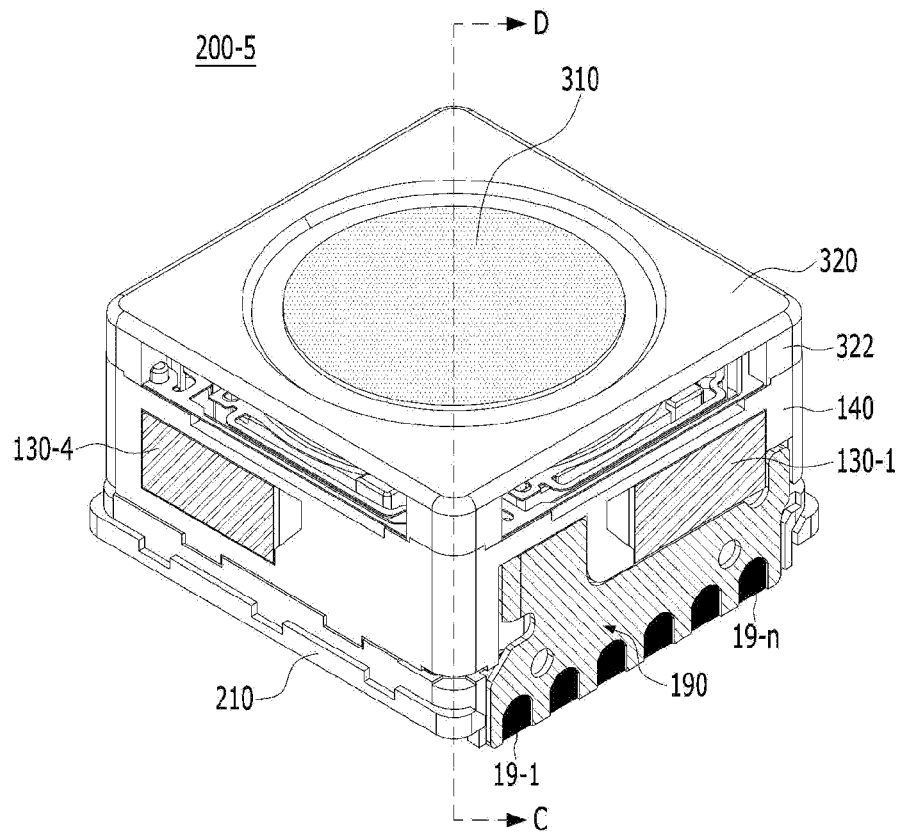
FIG. 23 is a combined perspective view of a lens module in FIG. 22 in which the cover member is omitted.
Figure 24:
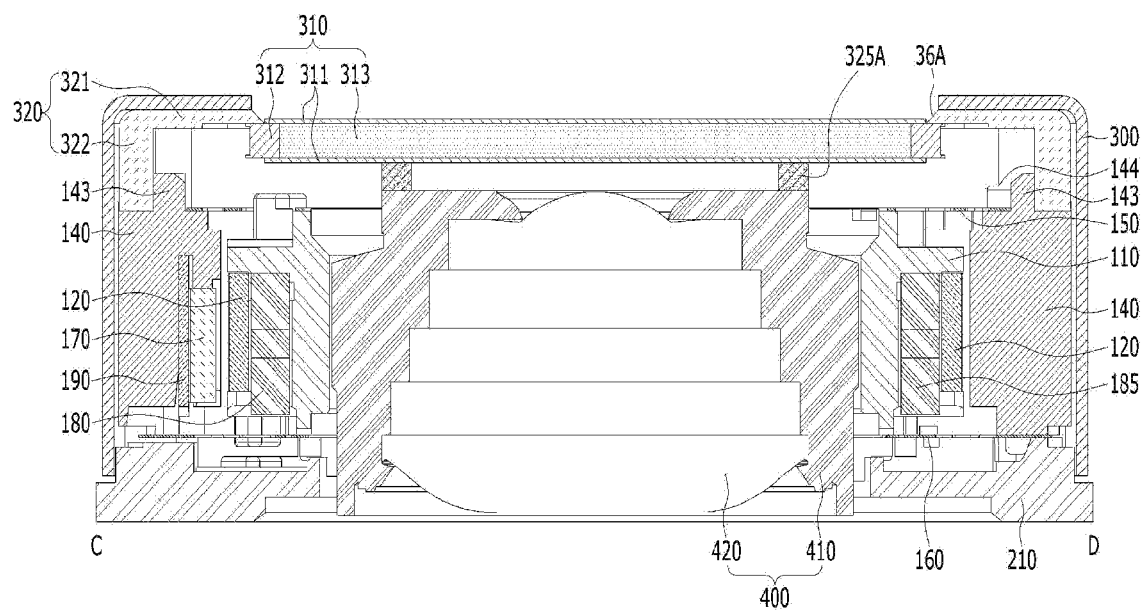
FIG. 24 is a cross-sectional view of a lens module in the CD direction in FIG. 23.
Figure 25:
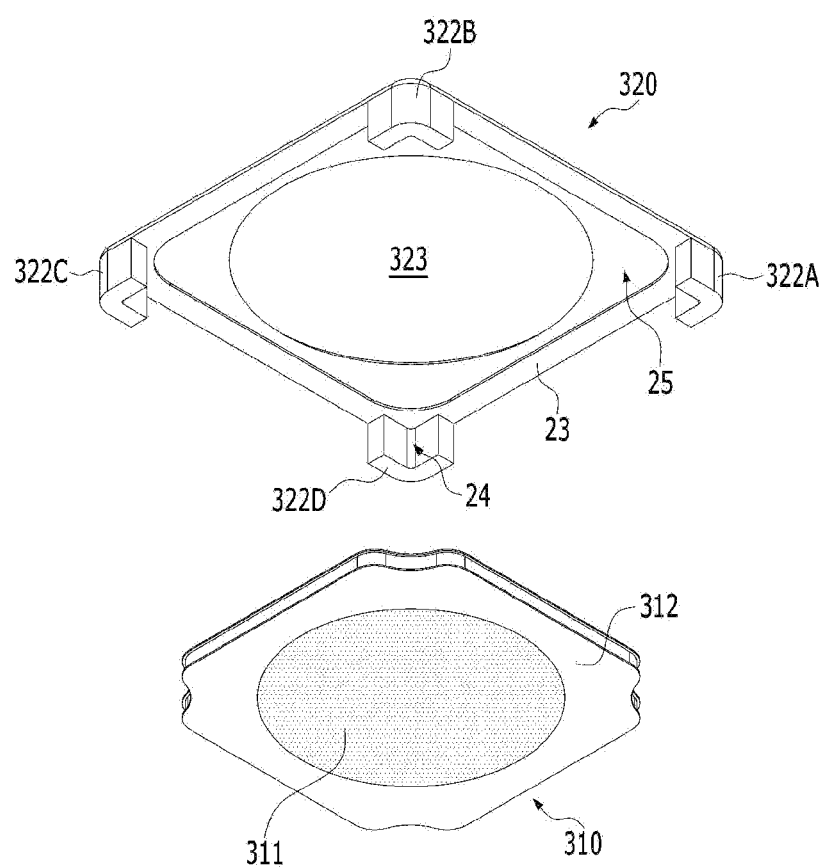
FIG. 25 is an exploded perspective view of a holder and a first lens part.

FIG. 22 is an exploded perspective view of a lens module 200-5 according to another embodiment; FIG. 23 is a combined perspective view of a lens module 200-5 in FIG. 22 in which the cover member is omitted; FIG. 24 is a cross-sectional view of a lens module 200-5 in the CD direction in FIG. 23; and FIG. 25 is an exploded perspective view of a holder 320 and a first lens part 310.

Referring to FIGS. 22 to 25, the lens module 200-5 may comprise a first lens part 310, a second lens part 400B, a lens driving device 100-2, and a holder 320.

Compared with the lens module 200-3 shown in FIG. 17, the lens module 200-5 may further comprise a holder 320 for accommodating or supporting the first lens part 310.

The holder 320 is disposed between the first lens part 310 and the cover member 300, and may accommodate, support, or fix the first lens part 310. The holder 320 may be expressed by replacing it with a "fixed frame", a "case", or a "housing".

For example, the holder 320 may be disposed on the housing 140.

The holder 320 may comprise an upper plate 321 and a column portion 322 being extended from the upper plate 321 in an optical axis direction. The column portion 322 may be expressed by replacing it with a "supporting part" or a "protruded portion".

When viewed from above, the upper plate 321 of the holder 320 may have a polygonal (e.g., quadrangular) shape, but is not limited thereto, and may be implemented in various shapes such as a circular shape or an elliptical shape in another embodiment.

In the upper plate 321 of the holder 320, an opening 323 corresponding to the first lens part 310 may be formed. For example, the opening 323 of the holder 320 may expose the first lens part 310. For example, the opening 323 of the holder 320 may expose at least a portion of the membrane 311 of the first lens part 310. For example, the opening 323 may be in the form of a through hole or a hollow penetrating the upper plate 321.

An inner circumferential surface of the holder 320 formed by the opening 323 may be an inclined surface. For example, the inner angle between the inner circumferential surface of the holder 320 and the upper surface of the holder 320 may be an obtuse angle or a right angle.

For example, in the lower surface 23 of the upper plate 321 of the holder 320, a groove 25 for placing or accommodating the first lens part 310 may be formed. For example, the groove 25 may comprise a bottom surface and a side surface. The bottom surface of the groove 25 may have a step difference with the lower surface 23 of the upper plate 321 of the holder 320 in an optical axis direction. For example, the groove 25 may be a shape being recessed from the lower surface 23 of the upper plate 321 of the holder 320. The side surface of the groove 25 may connect the bottom surface of the groove 25 and the lower surface 23 of the upper plate 321 of the holder 320.

The first lens part 310 may be disposed in the groove 25. For example, the opening 323 may be formed on the bottom surface of the groove 25.

The column portion 322 may be extended from a lower surface 23A of the upper plate 321 toward an upper surface of the housing 140 of the lens driving device 100-2.

For example, the column portion 322 may be disposed at a corner of the lower surface 23A of the upper plate 321. For example, the column portion 322 may comprise four column portions 322A to 322D being disposed at four corners of the lower surface of the upper plate 321.

For example, the column portion 322 may comprise an escape portion 24 for avoiding spatial interference with the stopper of the housing 140. The escape portion 24 may be formed on an inner side surface of the column portion 322, but is not limited thereto. For example, the escape portion 24 may comprise at least one bent or curved surface, but is not limited thereto. In another embodiment, the escape portion may be in the form of a groove or hole being recessed from an inner side surface or a lower surface of the column portion 322.

For example, an upper surface of the receptor 312 may be coupled to, attached to, or fixed to a lower surface of the holder 320 by an adhesive. For example, an upper surface of the receptor 312 may be coupled, attached, or fixed to a bottom surface of the groove 25 of the holder 320 by an adhesive.

In another embodiment, at least a portion of the upper surface and/or membrane 311 of the receptor 212 may be coupled to, attached to, or fixed to a lower surface of the holder 320 (or the bottom surface of the groove 25).

The column portion 322 of the holder 320 may be coupled to the housing 140. For example, a lower surface of the column portion 322 of the holder 320 and/or an inner side surface of the column portion 322 of the holder 320 may be coupled, attached, or fixed to the upper surface of the housing 140 by an adhesive. For example, an inner side surface of the column portion 322 may be coupled to the stopper 143 of the housing 140 by an adhesive.

For example, the cover member 300 may be formed by press molding or compression molding, and the flatness of the product formed by the press molding is not good compared to the flatness of the product formed by the injection molding. The holder 320 is an injection molding product, and is better than the cover member 300 in terms of flatness. Therefore, compared to the first lens part 310 mounted on the cover member 300, the flatness of the first lens part 310 mounted on the holder 320 can be enhanced in a direction perpendicular to the optical axis.

The holder 320 of FIGS. 22 to 25 is illustrated as being applied to the first lens part 400B and the lens driving device 100-2, but is not limited thereto. The holder 320 may be applied to all the lens modules according to the embodiments described with reference to FIGS. 1 to 21, and FIGS. 22 to 25 may be applied mutatis mutandis.

Figure 26:
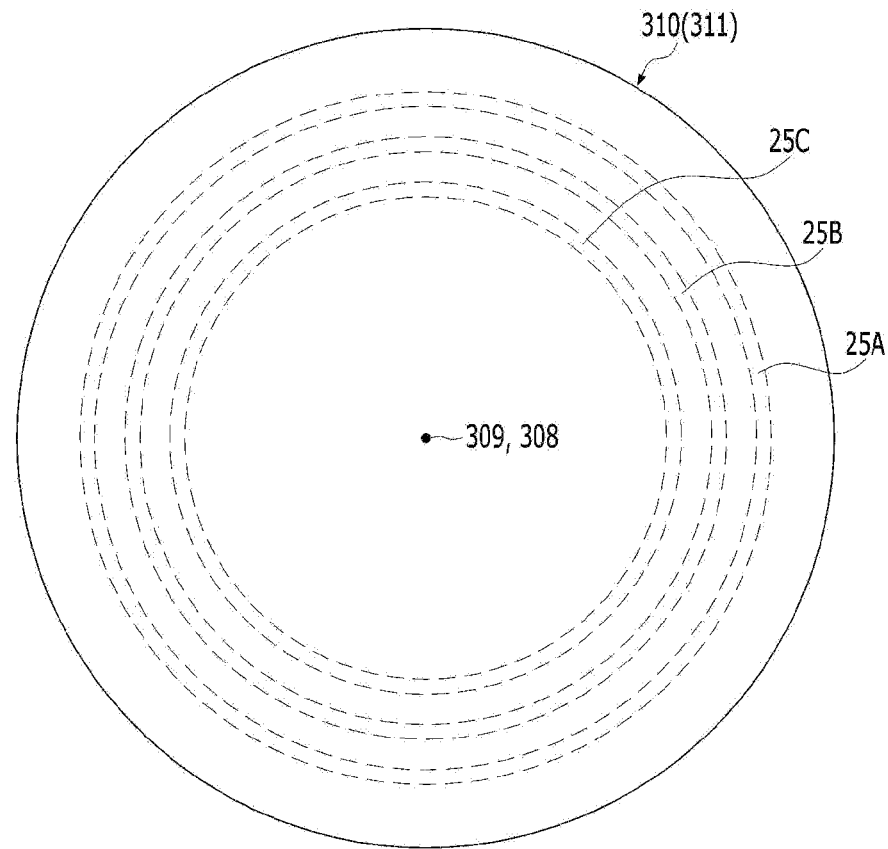
FIG. 26 shows a pressing area of a first lens part pressed by a pressing portion according to a first embodiment of the present invention.

FIG. 26 shows a pressing area of a first lens part 310 pressed by a pressing portion according to a first embodiment of the present invention.

Referring to FIG. 26, the pressurizing region may be a region in which the liquid 313 and/or the membrane 311 are directly pressurized by the pressing portion. For example, the pressing region may be a region in which the pressing portion and the membrane 311 are in direct contact.

When no pressure is applied to the liquid 313 because a driving force is not applied to the liquid 313 by the pressing portion, the membrane 311 may maintain a horizontal plane perpendicular to the optical axis.

When a driving force is applied to the liquid 313 by the pressing portion, and pressure is applied to the liquid 313 and/or the membrane 311, the shape of the membrane 311 or/and the liquid 313 may be deformed into a curved or curved shape. For example, depending on the degree of the pressure applied by the pressing portion, the curvature of the shape of the membrane 311 or liquid 313 can be changed, and due to this, the focal length of the first lens part 310 can be adjusted.

The first pressing region 25A may be a region being pressed by the protruded portion 111 (hereinafter referred to as a "first pressing region") of the bobbin 110 illustrated in FIGS. 8a and 8b. In addition, the region being pressed by the pressing frame 325 illustrated in FIGS. 11 and 12 may be the same as the first pressing region 25A.

The second pressing region 25B may be a region being pressed by the protruded portion 401 (hereinafter referred to as a "second pressing region") of the lens barrel 400A illustrated in FIG. 15. In an embodiment in which a pressing frame is provided separately instead of the protruded portion 401, the pressing region may be the same as the second pressing region 25B.

The third pressing region 25C may be a region being pressed by the protruded portion 402 (hereinafter referred to as a "third pressing region") of the lens barrel 400B illustrated in FIGS. 18 and 19. The region being pressed by the pressing frame 325A illustrated in FIGS. 20 and 21 may be the same as the third pressing region 25C.

The diameter of the first pressing region 25A may be larger than the second pressing region 25B, and the diameter of the second pressing region 25B may be larger than the diameter of the third pressing region 25C. Therefore, the lens size (e.g., the diameter of the lens) of the first lens part 310 being formed by the first pressing region 25A may be larger than the lens size (e.g., the diameter of a lens) of the first lens part 310 being formed by the second and third pressing regions 25B and 25C.

The embodiment may adjust the lens size of the first lens part 310 according to the disposement position of the pressing portion, and in particular, it may be suitable for realizing a large-diameter lens size.

In addition, while the focal length of the second lens part 400, 400A, and 400B is adjusted by the lens driving device 100-1 and 100-2, and at the same time, since the focal length of the first lens part 310 can be adjusted by the pressing portion, the embodiment may finely adjust the focal lengths of the lens modules 200-1 to 200-5 by the first lens part 310.

Meanwhile, the lens driving device according to the above-described embodiment may be used in various fields, for example, a camera module or an optical device.

Figure 27A:
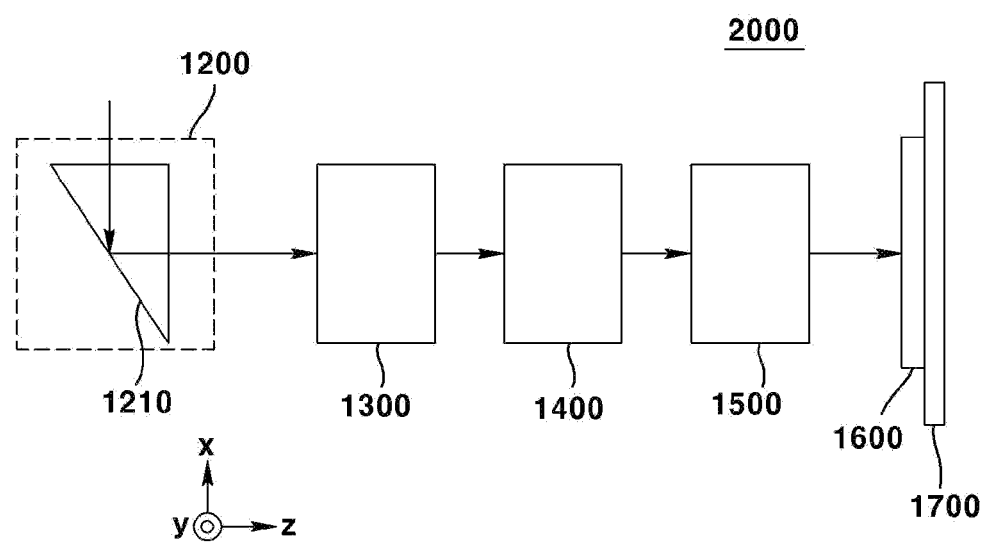
FIG. 27a is a conceptual diagram of a camera module according to a first embodiment of the present invention.

FIG. 27a is a conceptual diagram of a camera module 2000 according to a first embodiment of the present invention.

Referring to FIG. 27a, the camera module 2000 may comprise an optical path conversion unit 1200, a lens part, an image sensor 1600, and a circuit board 1700.

The optical path conversion unit 1200 converts the path of the light being incident in the −x-axis direction into the optical axis direction (or in a direction parallel to the optical axis) (e.g., the z-axis direction) so that it may be emitted toward at least one among the lens units 1300 to 1500.

As the optical path conversion unit 1200 is disposed, a light entry path through which light travels up to the image sensor 1600 is extended so that a zoom-in/zoom-out function may be performed. To this end, the optical path conversion unit 1200 may comprise a prism 1210 for converting the path of the light incident in the −x-axis direction to the z-axis direction, but the embodiment is not limited thereto. In some cases, the optical path conversion unit 1200 may be omitted.

The lens part may comprise any one among the lens modules 200-1 to 200-5 according to the above-described embodiment.

The lens part may comprise at least one among the lens units 1300 to 1500. For example, the lens part may comprise a plurality of lens units 1300 to 1500.

The plurality of lens units 1300 to 1500 may be aligned in the optical axis OA direction (or in a direction parallel to the optical axis OA).

According to an embodiment, any one of the plurality of lens units 1300 to 1500 may comprise any one of the above-described lens modules 200-1 to 200-5, and each of the remaining lens units may comprise a fixed lens part. The fixed lens part at this time may be a lens that does not move in the direction of the optical axis.

When the camera module 2000 comprises a plurality of lens units, any one of the above-described lens modules 200-1 to 200-5 is disposed or disposed immediately after the optical path conversion unit 1200, or an image sensor 1600 may be disposed or disposed immediately before, but is not limited thereto. In another embodiment, any one of the above-described lens modules 200-1 to 200-5 may be disposed between fixed lens parts.

In an embodiment of the lens part comprising the fixed lens part, a separate 'cover can' (not shown) may be comprised. In addition, a lens unit comprising any one of the lens modules 200-1 to 200-5 may perform an AF function, and any one of the remaining lens units may perform an OIS function.

The image sensor 1600 is disposed on the circuit board 1700. The image sensor 1600 may perform a function of converting light passing through the lens units 1300 to 1500 into image data. More specifically, the image sensor 1600 converts light into an analog signal through a pixel array comprising a plurality of pixels, and image data may be generated by synthesizing digital signals corresponding to analog signals.

The circuit board 1700 may be electrically connected to the image sensor 1600. In addition, the circuit board 1700 may be electrically connected to the circuit board 190 of the above-described lens module.

In addition, the camera module 2000 may further comprise a filter being disposed between the lens part and the image sensor.

The filter may serve to block light of a specific frequency band in light passing through the lens units 1300 to 1500 from being incident on the image sensor 1600. For example, the filter may be an infrared cut filter, but is not limited thereto. At this time, the filter can be placed parallel to the x-y plane. The camera module 2000 may comprise a separate holder for mounting or disposing the filter.

Figure 27B:
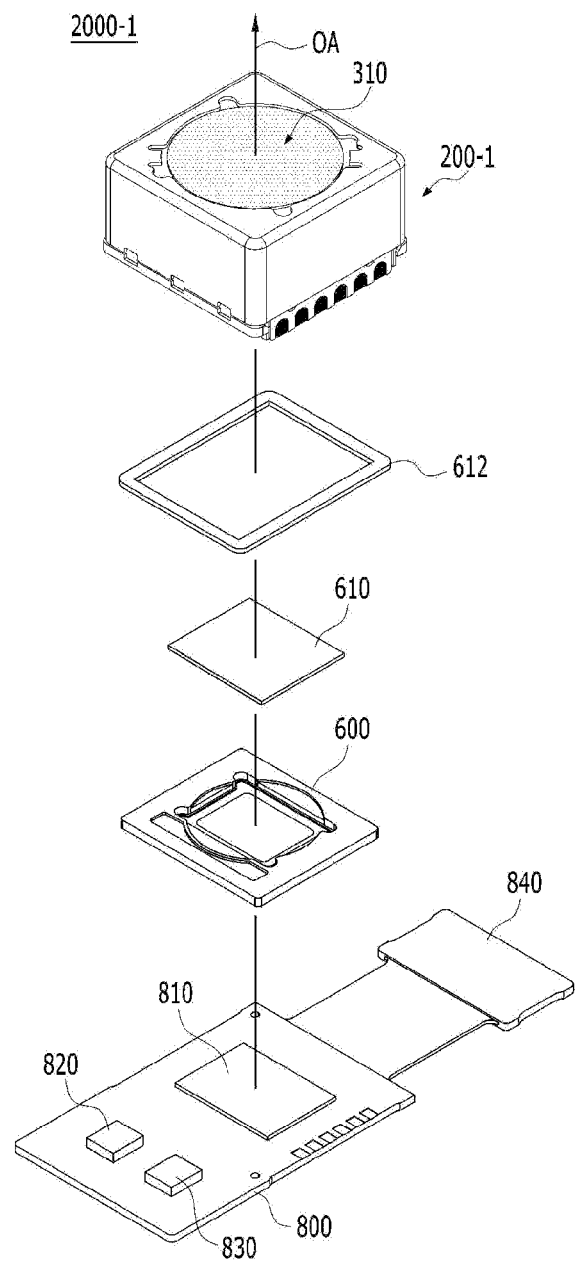
FIG. 27b is an exploded perspective view of a camera module according to another embodiment.

FIG. 27*b* is an exploded perspective view of a camera module 2000-1 according to another embodiment.

Referring to FIG. 27*b*, a camera module may comprise: a lens module 200-1; an adhesive member 612; a filter 610; a holder 600; a circuit board 800; and an image sensor 810.

The camera module 2000-1 may comprise at least one among a motion sensor 820, a control unit 830, and a connector 840.

FIG. 27*b* illustrates the lens module 200-1, but is not limited thereto, and in another embodiment, the camera module 2000-1 may comprise any one among the other embodiments 200-2 to 200-5 being described above.

The holder 600 may be disposed below the base 210 of the lens driving device 100-1. The filter 610 may be mounted on the holder 600, and the holder 600 may comprise a seating part 500 on which the filter 610 is seated. The seating part 500 may be in the form of a protruded portion being protruded from an upper surface of the holder 600 or in the form of a groove being recessed from an upper surface of the holder 600.

The adhesive member 612 may couple or attach the base 210 of the lens driving device 100-1 to the holder 600. The adhesive member 710 may serve to inhibit foreign substances from being introduced into the lens driving device 100 in addition to the above-described bonding role. For example, the adhesive member 612 may be an epoxy, a thermosetting adhesive, or an ultraviolet curable adhesive.

The filter 610 may serve to block light of a specific frequency band in light passing through the lens barrel 400 from being incident on the image sensor 810. For example, the filter 610 may be an infrared cut filter, but is not limited thereto. At this time, the filter 610 may be disposed parallel to the x-y plane.

An opening may be formed in the periphery of the holder 600 on which the filter 610 is mounted so that light passing through the filter 610 may be incident on the image sensor 810.

The circuit board 800 is disposed below the holder 600, and the image sensor 810 may be mounted on the circuit board 800. The image sensor 810 is a portion on which the light passing through the filter 610 is incident to form an image comprised in the light.

The circuit board 800 may be provided with various circuits, elements, control units, and the like to convert an image formed on the image sensor 810 into an electrical signal and transmit it to an external device.

A circuit board 800 may be formed with an image sensor, device, and/or a circuit pattern being electrically connected to the control unit, and can be implemented with a circuit board in which various elements are being coupled. The holder 600 may be expressed by replacing it with a "sensor base".

The image sensor 810 receives an image comprised in the light incident through the lens driving device 100, and the received image may be converted into an electrical signal. The filter 610 and the image sensor 810 may be disposed by being spaced apart to face each other in a first direction.

The motion sensor 820 may be mounted on the circuit board 800, and may be electrically connected to the control unit 830 through a circuit pattern provided on the circuit board 800. The motion sensor 820 outputs rotational angular velocity information due to the movement of the camera module 200. The motion sensor 820 may be implemented with a 2-axis or 3-axis gyro sensor or an angular velocity sensor. In another embodiment, the motion sensor 820 may be omitted.

The control unit 830 may be disposed or mounted on the circuit board 800, and may be electrically connected to the position sensor 170 and the coil 120 of the lens driving device 100-1. For example, the circuit board 800 may be electrically connected to the circuit board 190 of the lens driving device 100.

For example, the control unit 830 may supply a driving signal or power to the coil 120 and/or the position sensor 170. Or, for example, the control unit 830 may transmit and receive a clock signal and a data signal for data communication (e.g., I2C communication) with the position sensor 170.

The connector 840 is electrically connected with the circuit board 800 and may comprise a port for electrically being connected with an external device.

In addition, the lens modules 200-1 to 200-5 according to the embodiment may be comprised in an optical instrument for the purpose of: forming an image of an object in space by using the characteristics of light such as reflection, refraction, absorption, interference, and diffraction; enhancing the visual acuity of the eyes; recording and reproducing an image by the lens; and optical measurement, image propagation and transmission, or the like. For example, the optical device according to the embodiment may be cell phones, mobile phones, smart phones, portable smart devices, digital cameras, laptop computers, digital broadcasting terminals, personal digital assistants (PDAs), portable multimedia players (PMPs), navigations, and the like, but is not limited thereto, and any device for photographing images or photos is possible.

Figure 28:
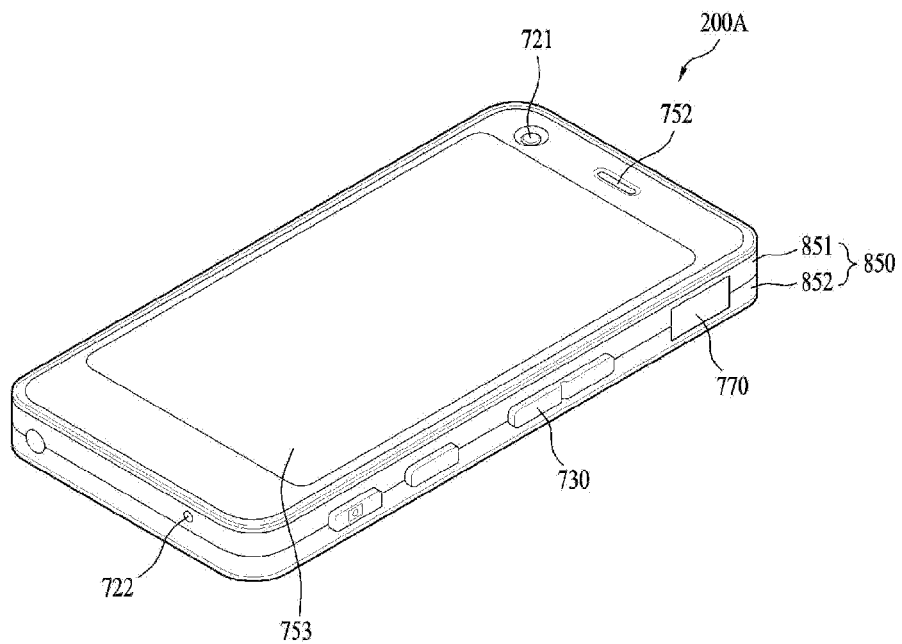
FIG. 28 is a perspective view of a portable terminal according to a first embodiment of the present invention.
Figure 29:
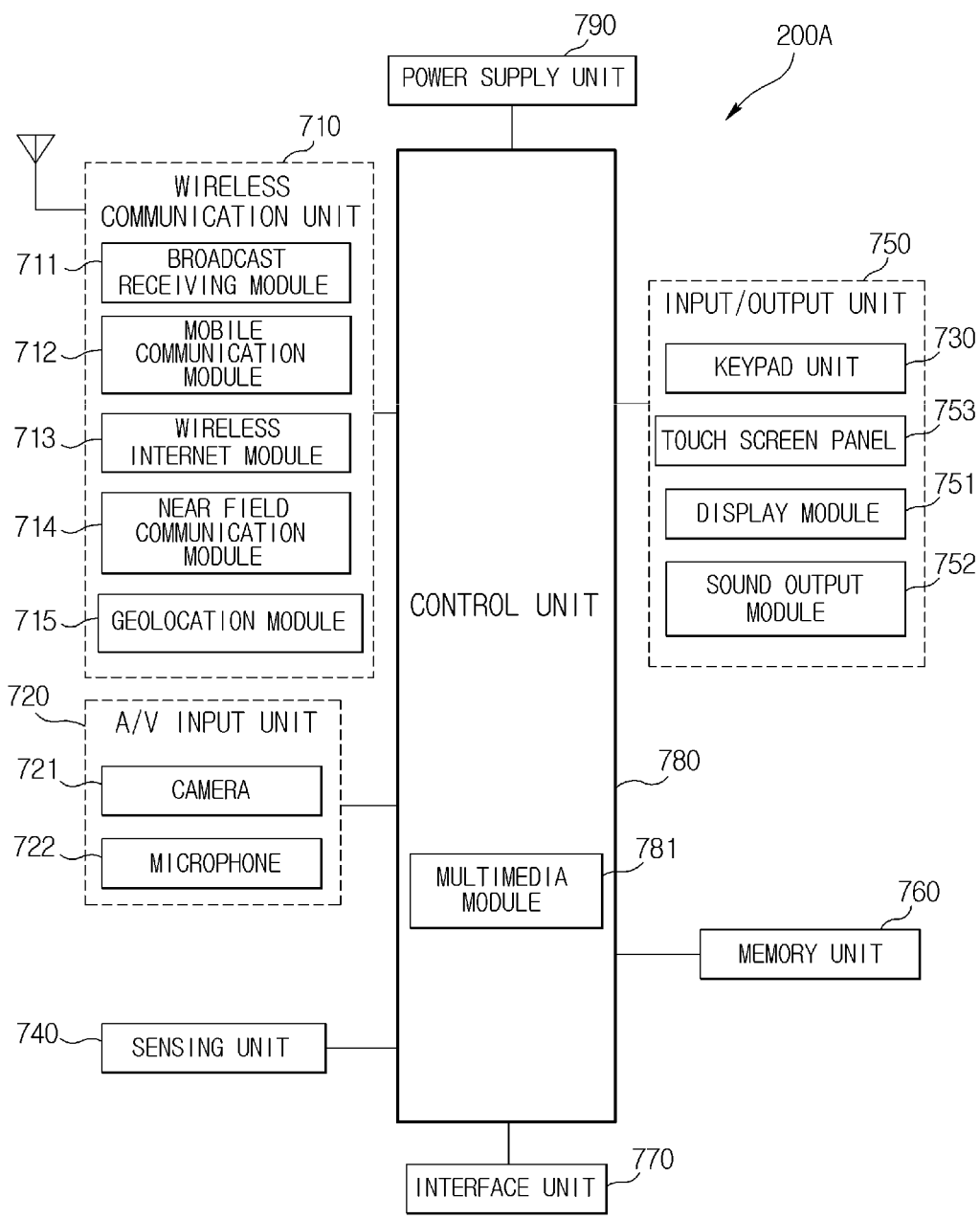
FIG. 29 is a block diagram of the portable terminal illustrated in FIG. 28.

FIG. 28 is a perspective view of a portable terminal 200A according to a first embodiment of the present invention; and FIG. 29 is a block diagram of the portable terminal 200A illustrated in FIG. 28.

Referring to FIGS. 28 and 29, the portable terminal 200A (hereinafter referred to as "terminal") may comprise a body 850, a wireless communication unit 710, an A/V input unit 720, a sensing unit 740, and input/output unit 750, a memory unit 760, an interface unit 770, a control unit 780, and a power supply unit 790.

The body 850 illustrated in FIG. 28 is in the form of a bar, but is not limited thereto, and may have various structures such as a slide type, a folder type, a swing type, a swirl type, and the like, in which two or more sub-bodies are combined so that they can move relative to each other.

The body 850 may comprise a case (casing, housing, and cover) forming an outer appearance. For example, the body 850 may comprise a front case 851 and a rear case 852. Various electronic components of the terminal may be embedded in a space formed between the front case 851 and the rear case 852.

The wireless communication unit 710 may comprise one or more modules that enable wireless communication between the terminal 200A and the wireless communication system or between the terminal 200A and the network in which the terminal 200A is located. For example, the wireless communication unit 710 may comprise any one or more among a broadcast receiving module 711, a mobile communication module 712, a wireless Internet module 713, a near field communication module 714, and a location information module 715.

The A/V (Audio/Video) input unit 720 is for inputting an audio signal or a video signal, and may comprise a camera 721 and a microphone 722 and the like.

The camera 721 may comprise the lens modules 200-1 to 200-5 or the camera module 2000 according to an embodiment.

The sensing unit 740 may generate a sensing signal for controlling the operation of the terminal 200A by detecting the current state of the optical device such as open/close state of the terminal 200A, location of the terminal 200A, user contact, orientation of the terminal 200A, and acceleration and deceleration of the terminal 200A. For example, when the terminal 200A is in the form of a slide phone, it is possible to detect whether the slide phone is opened or closed. In addition, it may be responsible for sensing functions related to whether the power supply unit 790 is supplied with power, whether the interface unit 770 is coupled to an external device, and the like.

The input/output unit 750 may be configured to generate an input or output related to visual, auditory, or tactile sense. The input/output unit 750 may generate input data for controlling the operation of the terminal 200A, and may output information processed by the terminal 200A.

The input/output unit 750 may comprise a keypad unit 730, a display module 751, a sound output module 752, and a touch screen panel 753. The keypad unit 730 may generate input data in response to a keypad input.

The display module 751 may comprise a plurality of pixels whose color changes according to an electrical signal. For example, the display module 751 may comprise at least one among a liquid crystal display, a thin film transistor-liquid crystal display, an organic light-emitting diode, a flexible display, and a 3D display.

The sound output module 752 outputs audio data being received from the wireless communication unit 710 in a call signal reception, a call mode, a recording mode, a voice recognition mode, or a broadcast receiving mode, or audio data stored in the memory unit 760, and the like.

The touch screen panel 753 may convert a change in capacitance generated due to a user's touch on a specific area of the touch screen into an electrical input signal.

The memory unit 760 may store a program for processing and control of the control unit 780, and input/output data (e.g., phone book, message, audio, still image, photo, video, and the like) can be temporarily stored. For example, the memory unit 760 may store an image photographed by the camera 721, for example, a photo or a video.

The interface unit 770 serves as a path for connecting to an external device connected to the terminal 200A. The interface unit 770 may receive data from an external device, receive power and transmit it to each component inside the terminal 200A, or transmit data inside the terminal 200A to an external device. For example, the interface unit 770 may comprise: a wired/wireless headset port; an external charger port, a wired/wireless data port; a memory card port; a port for connecting a device equipped with an identification module; an audio input/output (I/O) port; a video input/output (I/O) port; an earphone port, and the like.

The control unit 780 may control the overall operation of the terminal 200A. For example, the control unit 780 may perform related control and processing for voice call, data communication, video call, and the like.

The control unit 780 may comprise a multimedia module 781 for playing multimedia. The multimedia module 781 may be implemented inside the control unit 180 or may be implemented separately from the control unit 780.

The control unit 780 may perform a pattern recognition process capable of recognizing a handwriting input or a drawing input performed on the touch screen as characters and images, respectively.

The power supply unit 790 may receive external power or internal power by the control of the control unit 780 to supply power required for operation of each component.

An optical device according to a second embodiment of the present invention will be described.

The optical device may comprise any one among a cell phone, a mobile phone, a smart phone, a portable smart device, a digital camera, a laptop computer, a digital broadcasting terminal, a personal digital assistant (PDA), a portable multimedia player (PMP), navigation. However, the type of optical device is not limited thereto, and any device for taking an image or picture may be comprised in the optical device.

The optical device may comprise a main body. The main body may be in the form of a bar. Or, the main body may have various structures such as a slide type, a folder type, a swing type, and a swivel type, in which two or more sub-bodies are coupled to be movable relative to each other. The main body may comprise a case (casing, housing, and cover) forming an outer appearance. For example, the main body may comprise a front case and a rear case. Various electronic components of the optical device may be embedded in a space formed between the front case and the rear case.

The optical device may comprise a display. The display may be disposed on one surface of the main body of the optical device. The display may output an image. The display may output an image photographed by the camera.

The optical device may comprise a camera. The camera may comprise a time of flight (ToF) camera device. The ToF camera device may be disposed in front of the main body of the optical device. In this case, the ToF camera device can be used for various types of biometric recognition, such as a users face recognition and iris recognition for security authentication of the optical device.

The ToF camera device may comprise a light emitting module and a light receiving module.

The ToF camera device may comprise a light emitting module. The light emitting module may be a light emitting part, a light emitting unit, a light emitting assembly, or a light emitting device. The light emitting module may generate an output light signal and then irradiate it to the subject. At this time, the light emitting module can generate and output an output light signal in the form of a pulse wave or a continuous wave. The continuous wave may be in the form of a sinusoidal wave or a square wave. By generating the output light signal in the form of a pulse wave or a continuous wave, the ToF camera device can detect the phase difference between the output light signal outputted from the light emitting module and the input light signal inputted to the light receiving module of the ToF camera device after being reflected from the subject. In the present specification, the output light refers to the light outputted from the light emitting module and incident on the subject; and the input light refers to the light that is outputted from the light emitting module, reaches the subject, is reflected from the subject, and then is inputted to the camera device. From the viewpoint of the subject, the output light may be incident light, and the input light may be reflected light.

The light emitting module irradiates the generated output light signal to the subject for a predetermined exposure period (integration time). Here, the exposure period means one frame period. In the case of generating a plurality of frames, the preset exposure cycle is repeated. For example, when the ToF camera device photographs a subject at 20 FPS, the exposure period is ½0 sec. And when 100 frames are generated, the exposure period may be repeated 100 times.

The light emitting module may generate a plurality of output light signals having different frequencies. The light emitting module may sequentially and repeatedly generate a plurality of output light signals having different frequencies. Or, the light emitting module may simultaneously generate a plurality of output light signals having different frequencies.

The light emitting module may comprise a light source. A light source may generate light. The light source may output light. The light source may irradiate light. The light generated by the light source may be infrared rays having a wavelength of 770 to 3000 nm. Or, the light generated by the light source may be visible light having a wavelength of 380 to 770 nm. The light source may comprise a light emitting diode (LED). The light source may comprise a plurality of light emitting diodes disposed according to a predetermined pattern. In addition, the light source may comprise an organic light emitting diode (OLED) or a laser diode (LD).

The light emitting module may comprise a light modulation unit for modulating light. The light source may generate an output light signal in the form of a pulse wave or a continuous wave by repeating on/off at regular time intervals. The predetermined time interval may be the frequency of the output light signal. The on/off of the light source may be controlled by the light modulation unit. The light modulation unit may control the on/off of the light source so that the light source generates an output light signal in the form of a continuous wave or a pulse wave. The light modulation unit may control the light source to generate an output light signal in the form of a continuous wave or a pulse wave through frequency modulation, pulse modulation, or the like.

The light emitting module may comprise a diffuser. The diffuser may be a diffuser lens. The diffuser may be disposed in front of the light source. The light emitted from the light source may pass through the diffuser and be incident on the subject. The diffuser may change the path of light emitted from the light source. The diffuser may condense the light emitted from the light source.

The ToF camera device may comprise a light receiving module. The light receiving module may be a light receiving part, a light receiving unit, a light receiving assembly, or a light receiving device. The light receiving module may detect light emitted from the light emitting module and reflected from the subject. The light receiving module may generate an input light signal corresponding to an output light signal outputted from the light emitting module. The light receiving module may be disposed side by side with the light emitting module. The light receiving module may be disposed next to the light emitting module. The light receiving module may be disposed in the same direction as the light emitting module.

The light receiving module may comprise the camera device according to the second embodiment of the present invention.

Hereinafter, a configuration of a camera device according to a second embodiment of the present invention will be described with reference to the drawings.

Figure 30:
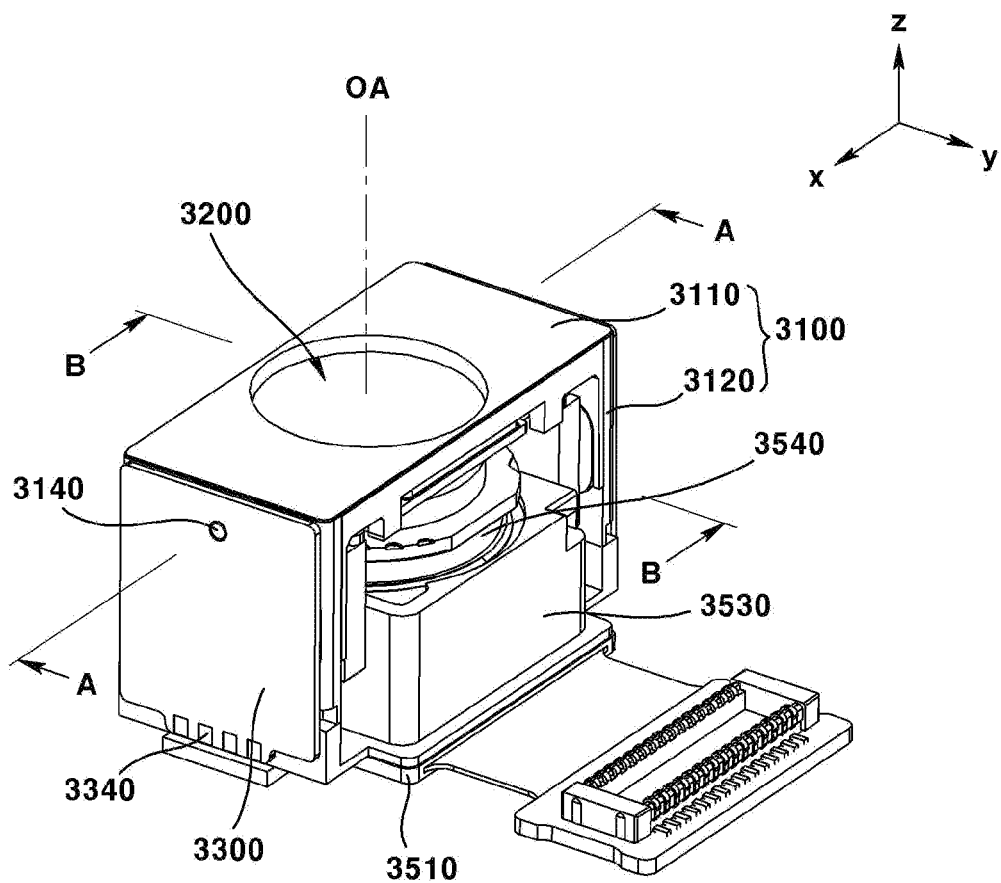
FIG. 30 is a perspective view of a camera device according to a second embodiment of the present invention.
Figure 31:
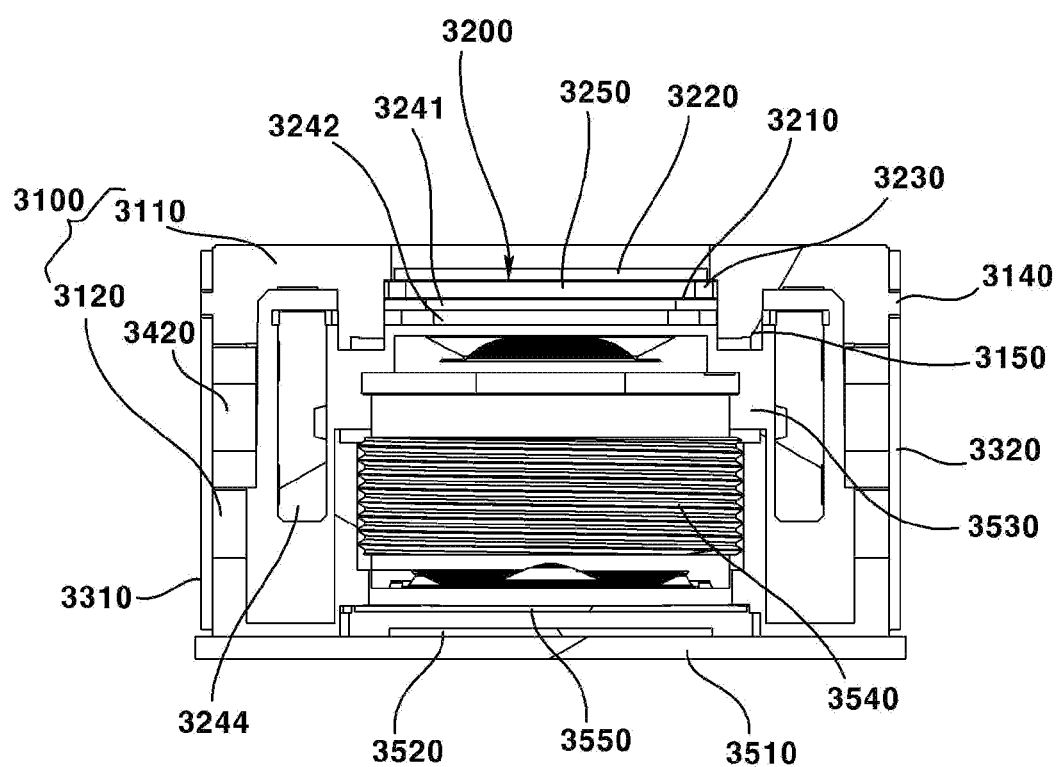
FIG. 31 is a cross-sectional view taken along line A-A in FIG. 30.
Figure 32:
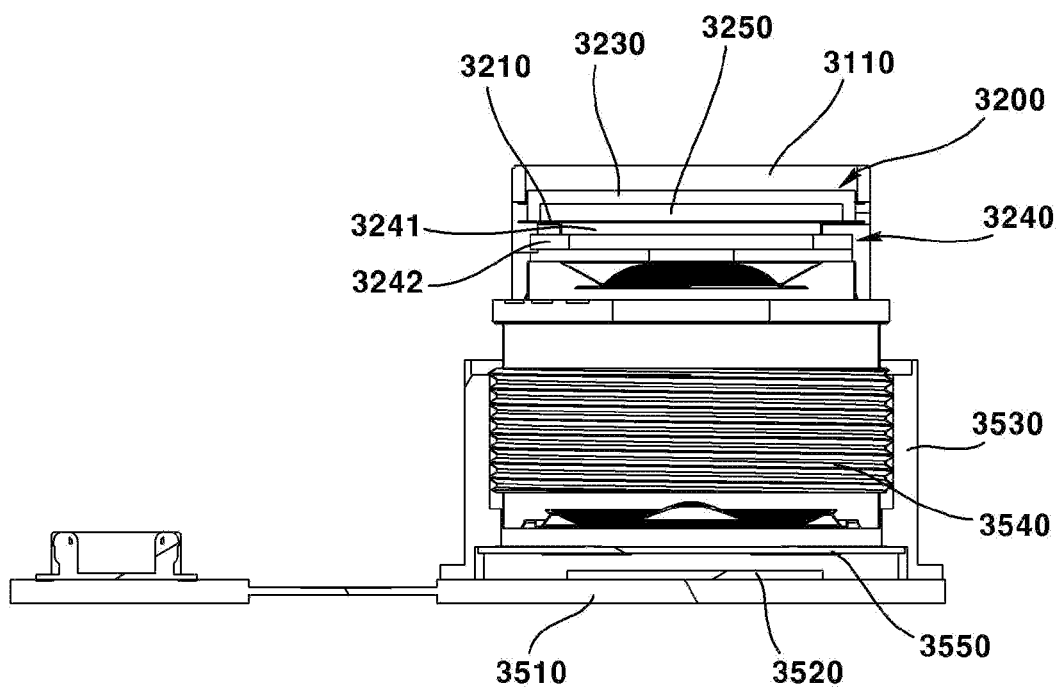
FIG. 32 is a cross-sectional view taken along line B-B in FIG. 30.
Figure 33:
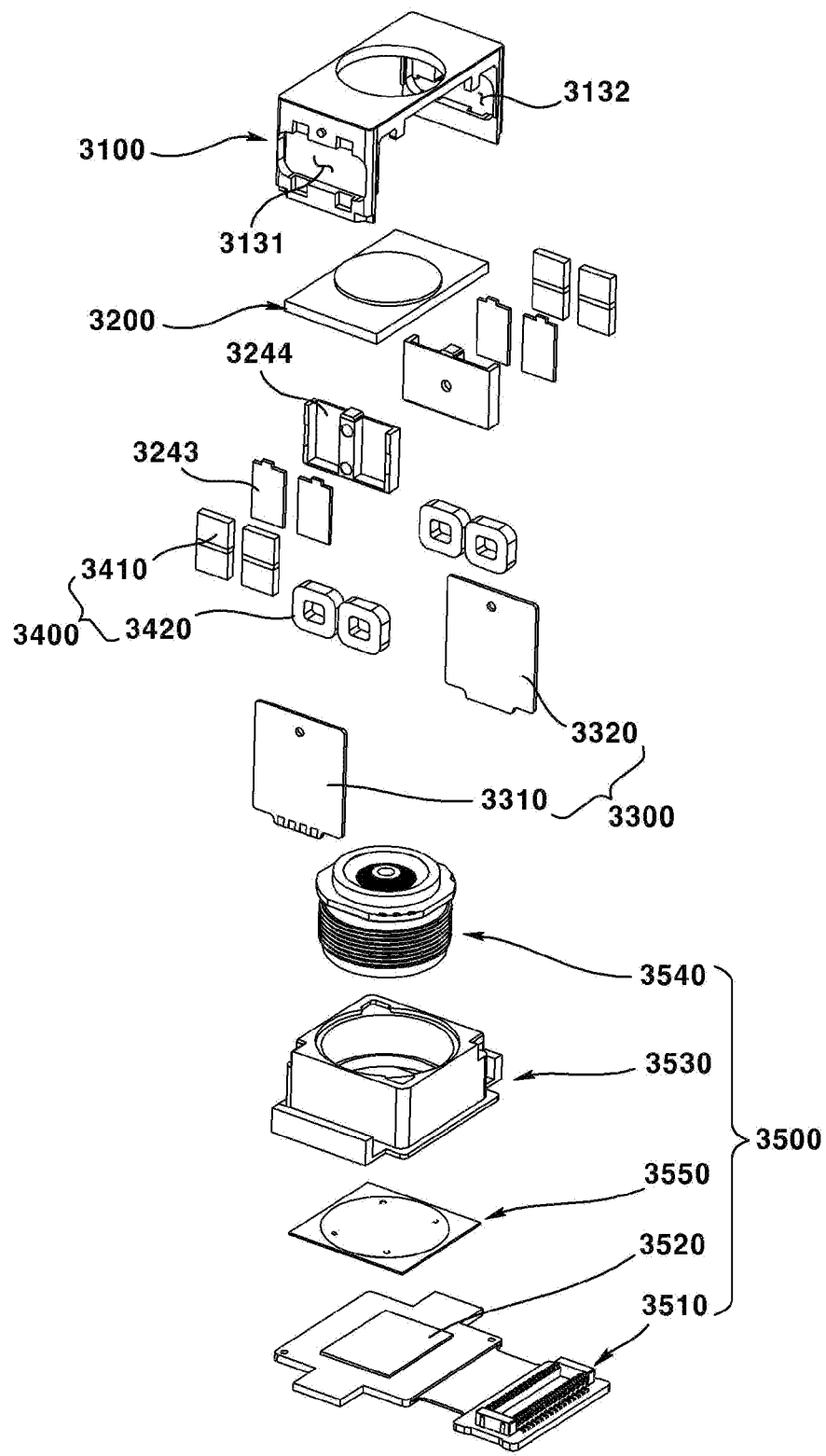
FIG. 33 is an exploded perspective view of a camera device according to a second embodiment of the present invention.
Figure 34:
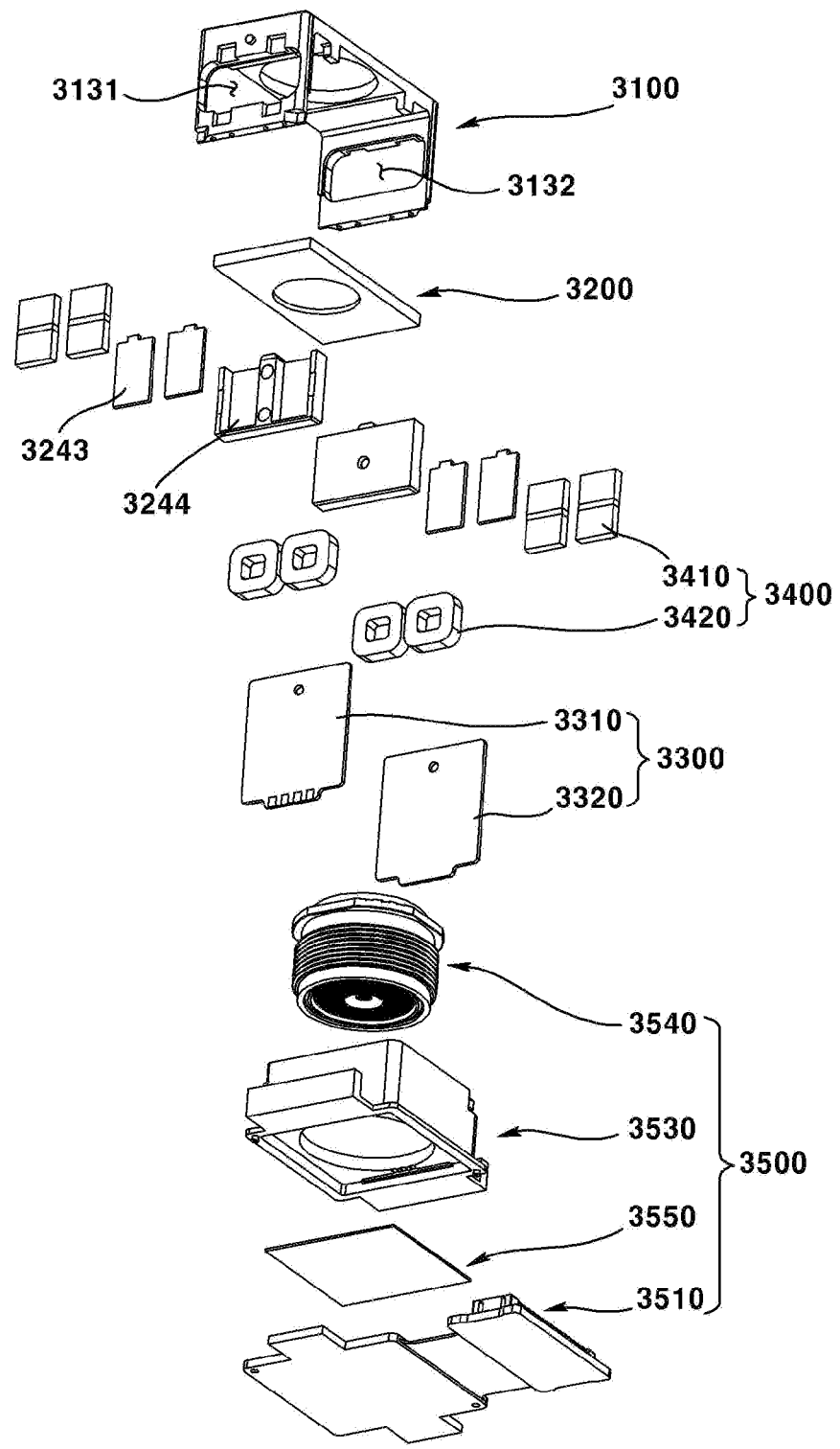
FIG. 34 is an exploded perspective view of a camera device according to a second embodiment of the present invention, as viewed from a different direction from FIG. 33.
Figure 35:
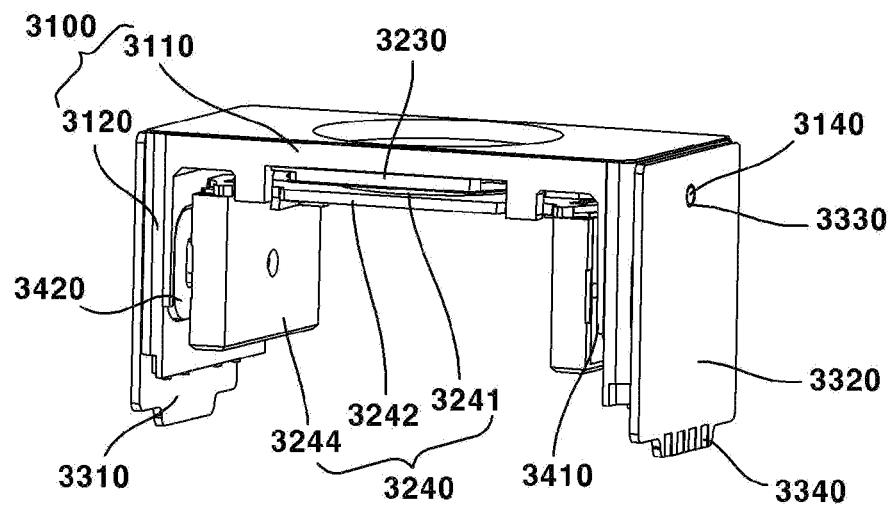
FIG. 35 is a perspective view of a partial configuration of a camera device according to a second embodiment of the present invention.
Figure 36:
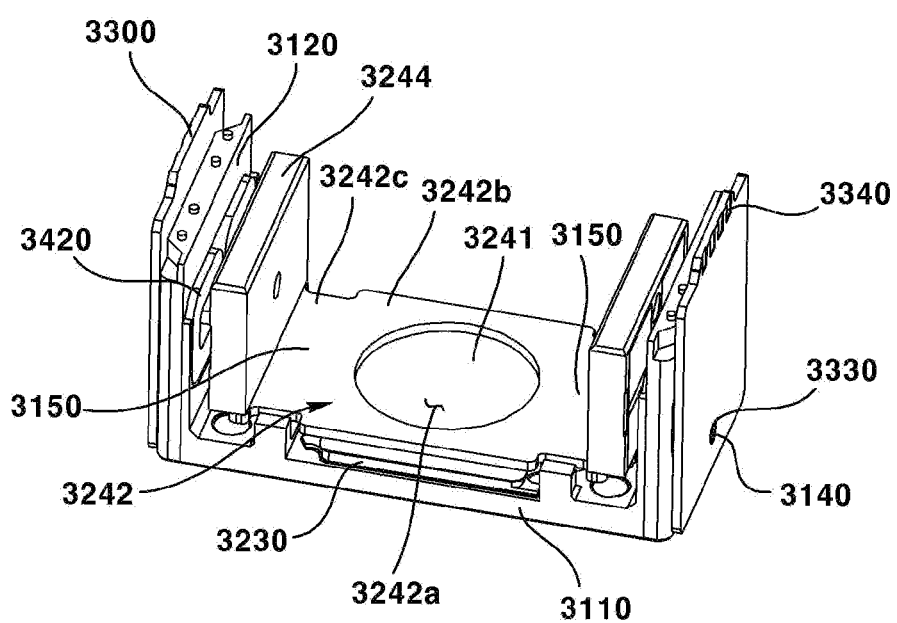
FIG. 36 is a perspective view of a part of a camera device in FIG. 35 viewed from another direction.
Figure 37:
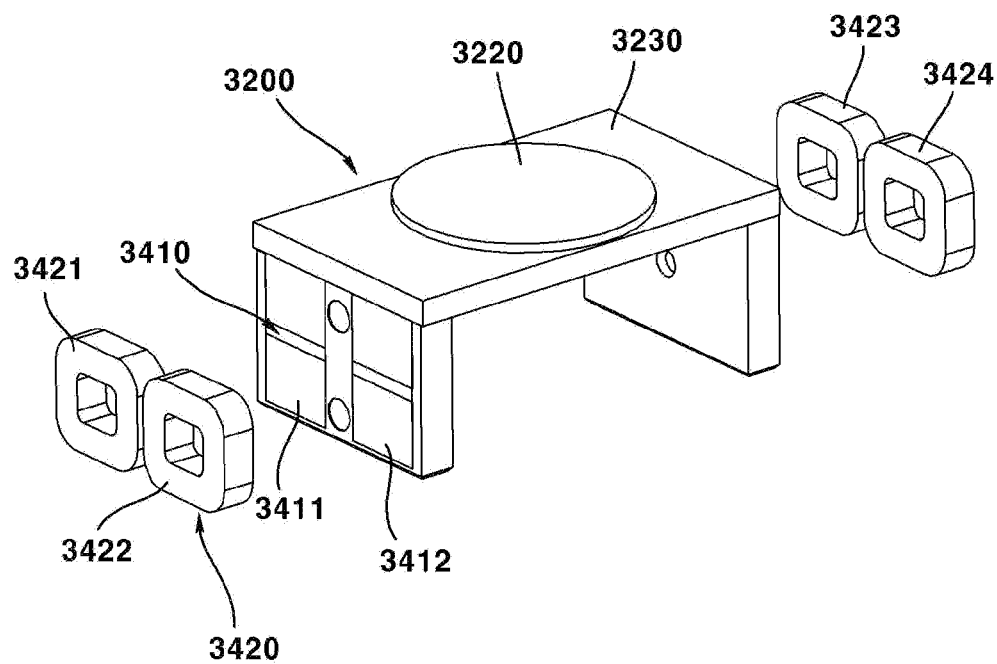
FIG. 37 is a perspective view illustrating a liquid lens and a driving unit according to a second embodiment of the present invention.
Figure 38:
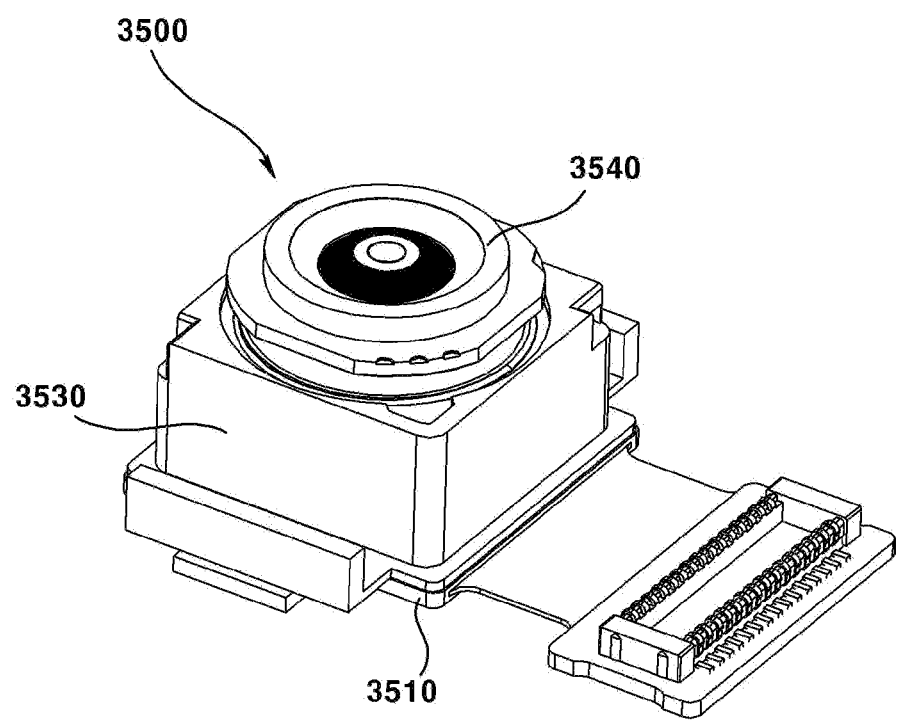
FIG. 38 is a perspective view of a camera module according to a second embodiment of the present invention.
Figure 40:
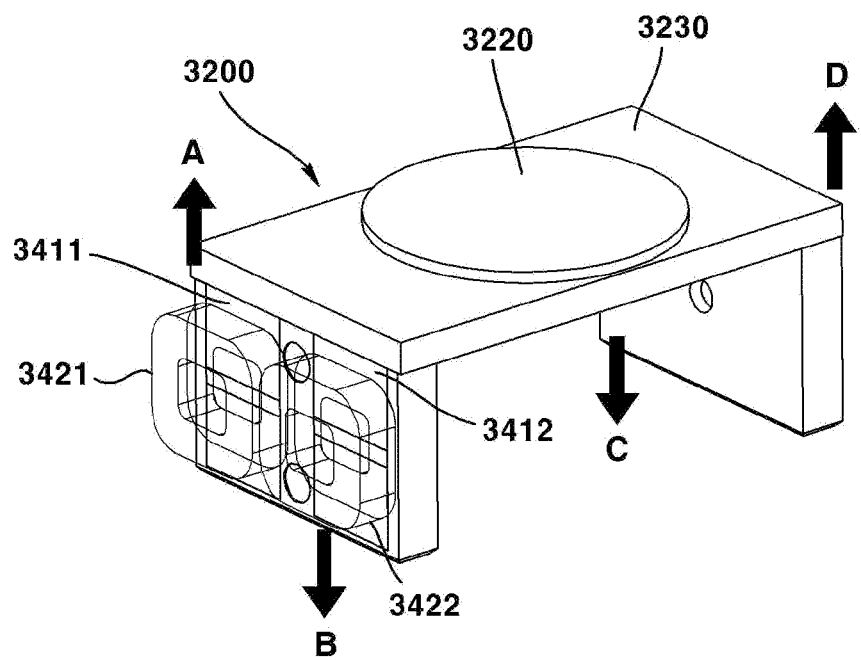
FIG. 40 is a view for explaining a method of driving a liquid lens according to a second embodiment of the present invention.

FIG. 30 is a perspective view of a camera device according to a second embodiment of the present invention; FIG. 31 is a cross-sectional view taken along line A-A in FIG. 30; FIG. 32 is a cross-sectional view taken along line B-B in FIG. 30. FIG. 33 is an exploded perspective view of a camera device according to a second embodiment of the present invention; FIG. 34 is an exploded perspective view of a camera device according to a second embodiment of the present invention, as viewed from a different direction from FIG. 33; FIG. 35 is a perspective view of a partial configuration of a camera device according to a second embodiment of the present invention; FIG. 36 is a perspective view of a part of a camera device in FIG. 35 viewed from another direction; FIG. 37 is a perspective view illustrating a liquid lens and a driving unit according to a second embodiment of the present invention; FIG. 38 is a perspective view of a camera module according to a second embodiment of the present invention; FIG. 39 is a conceptual diagram for explaining the concept of driving a liquid lens according to a second embodiment of the present invention; and FIG. 40 is a view for explaining a method of driving a liquid lens according to a second embodiment of the present invention.

The camera device may comprise a holder 3100. The holder 3100 may be disposed on the printed circuit board 3510. The holder 3100 may be fixed on the printed circuit board 3510. The holder 3100 may be disposed on the base 3530. The holder 3100 may cover at least a portion of the camera module 3500. A liquid lens 3200 may be disposed inside the holder 3100. A coil 3420 may be disposed in the holder 3100. The holder 3100 may be formed of an insulating material.

The holder 3100 may comprise an upper plate 3110. A printed circuit board 3510 may be disposed in parallel in the upper plate 3110. A liquid lens 3200 may be coupled to the upper plate 3110. The upper plate 3110 may comprise a hole through which light passes.

The holder 3100 may comprise a side plate 3120. The side plate 3120 may be extended from the upper plate 3110. The side plate 3120 may be extended downward from an edge of the upper plate 3110. The side plate 3120 may be vertically disposed on the upper plate 3110. The side plate 3120 may be integrally formed with the upper plate 3110. A coil 3420 may be disposed on the side plate 3120.

The side plate 3120 of the holder 3100 may comprise a plurality of side plates. The side plate 3120 may comprise two side plates. The side plate 3120 of the holder 3100 may comprise a first side plate and a second side plate being disposed opposite to the first side plate.

The holder 3100 may comprise a hole being formed in the side plate 3120. A coil 3420 may be accommodated in the hole. The hole of the holder 3100 may comprise a first hole 3131 being formed in the first side plate and a second hole 3132 formed in the second side plate.

The holder 3100 may comprise a protrusion 3140. The protrusion 3140 may be protruded from an outer surface of the side plate 3120 of the holder 3100. The protrusion 3140 may be inserted into the hole 3330 of the substrate 3300. The protrusion 3140 may be coupled to the substrate 3300. The substrate 3300 may be coupled in place by the protrusion 3140. In other words, the protrusion 3140 functions as an assembly guide for the substrate 3300 and can enhance the fixing force of the substrate 3300 to the holder 3100 after the substrate 3300 is assembled.

The camera device may comprise a cover. The cover may cover the holder 3100. The cover may cover the holder 3100 to form an outer appearance of the camera device. The cover may comprise an upper plate and a side plate. The cover may be formed of metal.

The camera device may comprise a variable focus lens. The variable focus lens may comprise a liquid lens 3200. The liquid lens 3200 may be disposed on the upper plate 3110 of the holder 3100. The liquid lens 3200 may be disposed at a position corresponding to the lens 3540. The liquid lens 3200 may comprise a lens surface whose curvature is changed by the driving unit 3400. At least a part of the liquid lens 3200 may be changed by the driving unit 3400. In addition, the driving unit 3400 may be understood as one component of the liquid lens 3200. That is, the liquid lens 3200 may be described as comprising a magnet 3410 and a coil 3420.

The liquid lens 3200 may comprise a membrane 3210. The membrane 3210 may comprise a film. The membrane 3210 may have flexibility. The membrane 3210 may be deformed to have curvature. The membrane 3210 may be transparent. The membrane 3210 may have elasticity. When the membrane 3210 is pressed by the lens forming member 3240, the shape changes and may be restored when the pressing of the lens forming member 3240 is completed. The membrane 3210 may be elastically extended. The membrane 3210 serves to confine the liquid 3250 together with the optical member 3220 in the cavity. The upper surface of the membrane 3210 may be in contact with a lower surface of the liquid 3250. The membrane 3210 may be disposed on a path through which light passes. The membrane 3210 may have light transmittance. The membrane 3210 may have a circular bottom shape. In a modified embodiment, the membrane 3210 may have an elliptical shape or a polygonal shape bottom surface.

The membrane 3210 may be a transparent elastic optical membrane. Specifically, the membrane 3210 may have high elastic properties and may be chemically stable. For example, the membrane 3210 may be a polydimethyl siloxane (PDMS) elastomer, a poly methyl phenyl siloxane (PMPS) elastomer, a fluorosilicone elastomer, or a poly ether elastomer, or propylene oxide elastomer, polyester elastomer, and the like.

When the membrane 3210 does not have elasticity or has elasticity but does not have enough elasticity to restore the tilted lens surface to the original horizontal surface, the liquid lens 3200 may further comprise an upper side elastic member (not shown). The upper side elastic member may be disposed between the membrane 3210 and the lens forming member 3240. In this case, after the lens surface is tilted by the first or second tilting surface, the tilted lens surface may be restored to the horizontal surface by the upper side elastic member.

The liquid lens 3200 may comprise an optical member 3220. The optical member 3220 may face the membrane 3210. The optical member 3220 may accommodate the liquid 3250. The optical member 3220 may be positioned on a path through which light passes. The optical member 3220 may be formed of a material having light transmittance. The optical member 3220 may comprise a cavity in which the liquid 3250 may be accommodated. The cavity may have a circular bottom shape. As a modified embodiment, the cavity may have an elliptical shape or a polygonal bottom shape. The optical member 3220 may be formed of a non-flexible member.

The liquid lens 3200 may comprise a wall body 3230. The wall body 3230 may form a cavity therein by connecting the membrane 3210 and the optical member 3220. The wall body 3230 may be formed of a non-transmittance material. The wall body 3230 may accommodate the liquid 3250 therein. The wall body 3230 may be disposed between the optical member 3220 and the membrane 3210. The wall body 3230 may be formed of a non-flexible member.

In a second embodiment of the present invention, the optical member 3220 and the wall body 3230 may be integrally formed. At this time, the optical member 3220 and the wall body 3230 may be referred to as a body. The body may form a cavity with the membrane 3210 therebetween. A liquid 3250 may be disposed in the cavity. That is, the liquid 3250 may be disposed between the membrane 3210 and the body.

The liquid lens 3200 may comprise a lens forming member 3240. The lens forming member 3240 may be in contact with the membrane 3210. The lens forming member 3240 may adjust the curvature of the region of the membrane 3210 facing the optical member 3220. The lens forming member

3240 may deliver the driving force being applied from the driving unit 3400 to the membrane 3210.

When no driving force is applied to the liquid 3250 and no pressure is applied to the liquid 3250, the lens surface of the membrane 3210 is positioned on a horizontal plane. However, when the driving force of the driving unit 3400 is applied to the membrane 3210 by the lens forming member 3240 and pressure is applied to the pressing region of the liquid 3250, the liquid 3250 flows and the lens of the membrane 3210 is applied. The face can be tilted to either side. In a second embodiment of the present invention, the shape of the lens surface of the membrane 3210, that is, the curvature of the lens surface may be changed or the lens surface may be tilted by the pressure from the liquid 3250.

According to a second embodiment of the present invention, the optical path can be changed by tilting the lens surface of the liquid lens 3200 through the voice coil motor (VCM) structure of the magnet and the coil. In a second embodiment of the present invention, when a force for pressing one side of the lens forming member 3240 (refer to A in FIG. 39) is generated, the corresponding portion of the membrane 3210 may be pressed. In addition, when a force (B in FIG. 39) that pulls the other side of the lens forming member 3240 is generated, the corresponding portion of the membrane 3210 may be protruded.

For example, an upward force (refer to A in FIG. 40) is generated on the first magnet 3411 by the first coil 3421 and the first magnet 3411, a downward force (refer to B in FIG. 40) is generated on the second magnet 3412 by the second coil 3422 and the second magnet 3412, a downward force (refer to C in FIG. 40) is generated on the third magnet 3413 by the third coil 3423 and the third magnet 3413, and an upward force (refer to D in FIG. 40) may be generated in the fourth magnet 3414 by the fourth coil 3424 and the fourth magnet 3414.

The lens forming member 3240 may comprise a window 3241. The window 3241 may pressurize the membrane 3210. The window 3241 may be in contact with a lower surface of the membrane 3210. The window 3241 may be fixed to the membrane 3210 and move integrally with the membrane 3210 as illustrated in FIG. 39. The window 3241 may be formed of a transparent material.

The lens forming member 3240 may comprise a frame 3242. The frame 3242 may be coupled to window 3241. The frame 3242 may deliver the driving force of the driving unit 3400 to the window 3241. A magnet 3410 may be coupled to the frame 3242.

The lens forming member 3240 may comprise a yoke 3243. The yoke 3243 may be disposed on one surface of the magnet 3410. In more detail, the yoke 3243 may be disposed on an opposite surface of the side surface of the magnet 3410 facing the coil 3420. The yoke 3243 may be disposed between the magnet 3410 and the housing 3244. As a modified embodiment, the yoke 3243 may be provided in a configuration separate from the lens forming member 3240.

The lens forming member 3240 may comprise a housing 3244. The housing 3244 may accommodate a magnet 3410. The housing 3244 may be formed in a shape corresponding to the magnet 3410. The housing 3244 may be coupled to the frame 3242.

The liquid lens 3200 may comprise a liquid 3250. The liquid 3250 may be disposed in the cavity. The liquid 3250 may be a liquid. The liquid 3250 may be transparent. The liquid 3250 may be non-volatile. The liquid 3250 may have chemical stability. For example, the liquid 3250 may be silicone oil or a silicone liquid. In addition, the liquid 3250 may comprise any one or more among a transparent hydrocarbon-based oil, an ester oil, an ether-based oil, and a perfluorinated polyether oil.

The liquid 3250 may have a low viscosity and thus may have excellent mobility. The viscosity of liquid 3250 may affect the flow rate of liquid 3250. If the flow rate is slow, the liquid 3250 may have a slow reaction rate to the driving force applied from the driving unit 3400 and it may be difficult to precisely control the flow. Specifically, even when a driving force is applied to the liquid 3250, as the viscosity of the liquid 3250 increases, the time required for the liquid 3250 to deform the lens surface of the membrane 3210, that is, the response time may increase. Here, the lens surface may be a lower surface or an upper surface of the membrane 3210. If the viscosity of the liquid 3250 is high, an overshooting phenomenon that deforms more than the actual applied pressure may occur.

The pressing region of the liquid 3250 may be located at the edge of the liquid 3250. The pressing region may comprise first to fourth pressing regions. Based on the optical axis OA, the first to fourth pressing regions may be spaced apart from each other at equal intervals or may be spaced apart from each other at different intervals.

At least one of: the angle formed by a first line segment connecting an optical axis OA and any one point (e.g., the center) of the first pressing region, and a second line segment connecting an optical axis OA and any one point (e.g., the center) of a second pressing region (hereinafter referred to as a 'first angle'); the angle formed by a third line segment and a second line segment connecting an optical axis OA and any one point (e.g., the center) of the third pressing region (hereinafter referred to as a 'second angle'); the angle formed by a fourth line segment and a third line segment connecting an optical axis OA and any one point (e.g., the center) of a fourth pressing region (hereinafter referred to as a 'third angle'); or the angle formed by the fourth line segment and the first line segment (hereinafter referred to as a 'fourth angle') may be different. Or, the first to fourth angles may be all the same as 90°.

When the driving force is applied to the third pressing region, the lens surface of the membrane 3210 may be inclined from the horizontal plane in the form of a first tilting surface, and when the driving force is applied to the fourth pressing region, the lens surface of the membrane 3210 may be inclined from the horizontal plane in the form of a second tilting surface. In this way, the OIS function may be performed as the lens surface of the membrane 3210 is inclined in the form of the first or second tilting surface. The OIS function performed by the small camera module of a mobile device such as a smartphone or tablet PC may refer to a function being performed to inhibit the outline of the photographed image from not being clearly formed due to the vibration caused by the user's hand-shake when photographing a still image.

In a second embodiment of the present invention, the curvature of the membrane 3210 may be adjusted by the interaction between the coil 3420 and the magnet 3410. Through this, the liquid lens 3200 acquires an image moved by a distance of 0.25 times the pixel size in a first direction, acquires an image moved by a distance of 0.25 times the pixel size in the second direction perpendicular to a first direction, acquires an image moved by a distance of 0.25 times the pixel size in a third direction opposite to the first direction, and may acquire an image moved by a distance of 0.25 times the pixel size in a fourth direction opposite to the second direction. At this time, the first to fourth directions may be diagonal directions of the pixel.

As a modified embodiment, the liquid lens 3200 acquires an image moved by a distance of 0.5 times the pixel size in a first direction, acquires an image moved by a distance of 0.5 times the pixel size in a second direction perpendicular to the first direction, acquires an image moved by a distance of 0.5 times the pixel size in a third direction opposite to the first direction, and may acquire an image moved by a distance of 0.5 times the pixel size in a fourth direction opposite to the second direction. At this time, the first to fourth directions may be directions toward four lateral sides of the pixel. That is, each of the first to fourth directions may be perpendicular to the side of the pixel.

The camera device may comprise a substrate 3300. The substrate 3300 may be disposed on a side plate 3120 of the holder 3100. The substrate 3300 may comprise a flexible printed circuit board (FPCB). The substrate 3300 may electrically connect the coil 3420 and the printed circuit board 3510. The substrate 3300 may be formed in a shape corresponding to the side plate 3120 of the holder 3100.

The substrate 3300 may comprise a plurality of substrates. The substrate 3300 may comprise two substrates. The substrate 3300 may comprise a first substrate 3310 disposed on a first side plate of the holder 3100 and a second substrate 3320 disposed on a second side plate of the holder 3100.

The substrate 3300 may comprise a hole 3330. The hole 3330 may comprise a hole 3330 into which the protrusion 3140 of the holder 3100 is inserted. The hole 3330 may be formed in a size corresponding to a position corresponding to the protrusion 3140 of the holder 3100.

The substrate 3300 may comprise a terminal 3340. The terminal 3340 may be disposed at a lower end of the substrate 3300. The terminal 3340 of the substrate 3300 may be coupled to the printed circuit board 3510. The terminals 3340 of the substrate 3300 may be coupled to the printed circuit board 3510 by solder balls or conductive epoxy. The terminal 3340 may comprise a plurality of terminals. The number of terminals 3340 may correspond to the number of conductive lines required for the coil 3420.

The camera device may comprise a driving unit 3400. The driving unit 3400 may change the curvature of the lens surface of the liquid lens 3200. The driving unit 3400 may comprise a magnet 3410 and a coil 3420. The driving unit 3400 may generate a driving force through electromagnetic force. Hereinafter, an embodiment in which the magnet 3410 is fixed to the liquid lens 3200 and the coil 3420 is fixed to the holder 3100 will be described, but in a modified embodiment, the magnet 3410 is fixed to the holder 3100 and the coil 3420 may be fixed to the liquid lens 3200.

The driving unit 3400 may comprise a magnet 3410. The magnet 3410 may be coupled to the liquid lens 3200. The magnet 3410 may be disposed on the liquid lens 3200. The magnet 3410 may be disposed on the frame 3242. The magnet 3410 may be disposed on the yoke 3243. The magnet 3410 may be disposed between the yoke 3243 and the coil 3420. The magnet 3410 may be disposed between the leg portion 3242c of the frame 3242 and the housing 3244.

The magnet 3410 may comprise a plurality of magnets. The magnet 3410 may comprise four magnets. The magnet 3410 may comprise: a first magnet 3411 being disposed on the lens forming member 3240 and facing the first coil 3421; a second magnet 3412 being disposed on the lens forming member 3240 and facing the second coil 3422; a third magnet 3413 being disposed on the lens forming member 3240 and facing the third coil 3423; and a fourth magnet 3414 being disposed on the lens forming member 3240 and facing the fourth coil 3424.

An angle formed by the virtual line connecting the first magnet 3411 and the fourth magnet 3414 and the virtual line connecting the second magnet 3412 and the third magnet 3413 may not be a right angle.

The first and second magnets 3411 and 412 may be disposed on one side of the lens forming member 3240, and the third and fourth magnets 3413 and 414 may be disposed on the other side of the lens forming member 3240. The outer side surface of the first magnet 3411 and the outer side surface of the second magnet 3412 face the same direction, and the outer side surface of the third magnet 3413 and the outer side surface of the fourth magnet 3414 may face the same direction. The outer side surface of the first magnet 3411 and the outer side surface of the second magnet 3412 are disposed on the same plane, and the outer side surface of the third magnet 3413 and the outer side surface of the fourth magnet 3414 may be disposed on the same plane.

The magnet 3410 may be disposed on the lens forming member 3240 side. The magnet 3410 may be directly coupled to the lens forming member 3240. Or, the magnet 3410 may be indirectly coupled to the lens forming member 3240 in a state being coupled to another member.

The upper portion of the first magnet 3411 has an N-pole polarity, the lower portion of the first magnet 3411 has an S-pole polarity, the upper portion of the second magnet 3412 has an S-pole polarity, and the lower portion of the second magnet 3412 may have an N-pole polarity. The upper portion of the third magnet 3413 has an N-pole polarity, the lower part of the third magnet 3413 has an S-pole polarity, the upper portion of the fourth magnet 3414 has an S-pole polarity, and the lower portion of the fourth magnet 3414 may have an N-pole polarity. As a modified embodiment, the upper portion of the third magnet 3413 has an S-pole polarity, the lower portion of the third magnet 3413 has an N-pole polarity, the upper portion of the fourth magnet 3414 has an N-pole polarity, and the lower portion of the fourth magnet 3414 may have an S-pole polarity.

The driving unit 3400 may comprise a coil 3420. The coil 3420 may be coupled to the substrate 3300. The coil 3420 may face the magnet 3410. The coil 3420 may be disposed to face the magnet 3410. The coil 3420 may electromagnetically interact with the magnet 3410. In this case, when a current is supplied to the coil 3420 and an electromagnetic field is formed around the coil 3420, the magnet 3410 can move against the coil 3420 by electromagnetic interaction between the coil 3420 and the magnet 3410. The coil 3420 may be coupled to an inner surface of the substrate 3300. The coil 3420 may be disposed in a hole of the side plate 3120 of the holder 3100. The coil 3420 and the magnet 3410 may be disposed at positions opposite to each other.

The coil 3420 may comprise a pair of ends (lead wires) for supplying power. At this time, the first end of the coil 3420 may be drawn out upward direction of the coil 3420 and the second end of the coil 3420 may be drawn out downward direction of the coil 3420. The coil 3420 may comprise a first end and a second end being coupled to the substrate 3300. The coil 3420 may be coupled to the substrate 3300 through a solder. The coil 3420 may be mounted on the substrate 3300 using SMT.

A current generating a Lorentz force may flow in one direction in the coil 3420. A current may flow in the forward direction in the coil 3420. Meanwhile, current may flow in the coil 3420 in the other direction opposite to the one direction. That is, current may flow in the reverse direction in the coil 3420.

The coil 3420 may comprise a plurality of coils. The coil 3420 may comprise four coils. The coil 3420 may comprise first to fourth coils 3421, 422, 423, and 424. Currents may be independently applied to the first to fourth coils 3421, 422, 423, and 424. Currents may be individually applied to the first to fourth coils 3421, 422, 423, and 424, respectively. The first to fourth coils 3421, 422, 423, and 424 may be electrically separated. The coil 3420 may comprise a first coil 3421 facing the first magnet 3411, a second coil 3422 facing the second magnet 3412, and a third coil 3423 facing the third magnet 3413, and a fourth coil 3424 facing the fourth magnet 3414. The first to fourth coils 3421, 422, 423, and 424 may be coupled to the holder 3100.

The coil 3420 may comprise a first coil 3421 and a second coil 3422 being disposed on the first substrate 3310, and a third coil 3423 and a fourth coil 3424 being disposed on the second substrate 3320. The first coil 3421 and the second coil 3422 may be disposed in the first hole 3131 of the holder 3100. The third coil 3423 and the fourth coil 3424 may be disposed in the second hole 3132 of the holder 3100.

In the second embodiment of the present invention, four coils can be controlled by two channels. The first coil 3421 and the second coil 3422 may be electrically connected. However, the direction of the Lorentz force generated between the first coil 3421 and the first magnet 3411 and the direction of the Lorentz force generated between the second coil 3422 and the second magnet 3412 may be opposite. For example, the first coil 3421 and the second coil 3422 may be disposed such that currents in opposite directions flow. Or, the first coil 3421 and the second coil 3422 may be wound in opposite directions. Or, the first coil 3421 and the second coil 3422 are wound in the same direction, and the polarity disposement of the first magnet 3411 and the polarity disposement of the second magnet 3412 may be disposed in different directions. Meanwhile, the first coil 3421 and the second coil 3422 are electrically separated and may be integrally controlled by the control unit.

The third coil 3423 and the fourth coil 3424 may be electrically connected. However, the direction of the Lorentz force generated between the third coil 3423 and the third magnet 3413 and the direction of the Lorentz force generated between the fourth coil 3424 and the fourth magnet 3414 may be opposite. The third coil 3423 and the fourth coil 3424 may be disposed so that currents flow in directions opposite to each other. For example, the third coil 3423 and the fourth coil 3424 may be disposed by being wound in opposite directions. Or, the third coil 3423 and the fourth coil 3424 may be wound in the same direction, and the polarity disposement of the third magnet 3413 and the polarity disposement of the fourth magnet 3414 may be disposed in different directions. Meanwhile, the third coil 3423 and the fourth coil 3424 may be electrically separated and may be integrally controlled by the control unit.

In a second embodiment of the present invention, the first coil 3421 may be disposed at the opposite side of the fourth coil 3424. The second coil 3422 may be disposed at the opposite side of the third coil 3423. At this time, the virtual straight line connecting the first coil 3421 and the fourth coil 3424 may form an acute angle with the virtual straight line connecting the second coil 3422 and the third coil 3423.

The camera device may comprise a camera module 3500. The camera module 3500 may comprise a lens driving device. The camera module 3500 may comprise a voice coil motor (VCM). The camera module 3500 may comprise a lens driving motor. The camera module 3500 may comprise a lens driving actuator. The camera module 3500 may comprise a fixed focus (FF) module.

The second embodiment of the present invention has the advantage that SR ToF can be implemented only by applying some configurations of the second embodiment of the present invention illustrated in FIG. 35 to a fixed focus camera module.

The camera module 3500 may comprise a printed circuit board (PCB) 3510. A light emitting module and a light receiving module may be disposed on the printed circuit board 3510. The printed circuit board 3510 may be electrically connected to the light emitting module and the light receiving module.

The camera module 3500 may comprise a sensor 3520. The sensor 3520 may be disposed on the printed circuit board 3510. The sensor 3520 may detect light. The sensor 3520 may detect light and output it as an electrical signal. The sensor 3520 may detect light having a wavelength corresponding to the wavelength of light outputted from the light source. The sensor 3520 may detect infrared rays. Or, the sensor 3520 may detect visible light.

The sensor 3520 may comprise: a pixel array that receives the light passing through the lens 3540 and converts it into an electrical signal corresponding to the light; and a driving circuit for driving a plurality of pixels comprised in the pixel array and a readout circuit for reading an analog pixel signal of each pixel. The readout circuit may generate a digital pixel signal (or an image signal) through analog-to-digital conversion by comparing the analog pixel signal with a reference signal. Here, the digital pixel signal of each pixel comprised in the pixel array constitutes an image signal, and as the image signal is transmitted in units of frames, it may be defined as an image frame. That is, the image sensor may output a plurality of image frames.

The camera module 3500 may comprise an image synthesizing unit. The image synthesizing unit may comprise an image processor that receives an image signal from the sensor 3520 and processes the image signal (e.g., interpolation, frame synthesis, and the like). In particular, the image synthesizing unit may synthesize image signals (low resolution) of a plurality of frames into one image signal (high resolution) of one frame. That is, the image synthesizing unit may synthesize a plurality of image frames comprised in the image signal received from the sensor 3520, and generate the synthesized result as a composite image. The composite image generated by the image synthesizing unit may have a higher resolution than the plurality of image frames being outputted from the sensor 3520. That is, the image synthesizing unit may generate a high-resolution image through a super resolution (SR) technique. The plurality of image frames may comprise image frames generated by changing different optical paths by driving the liquid lens 3200.

The camera module 3500 may comprise a base 3530. The base 3530 may be disposed on the printed circuit board 3510. The base 3530 may be directly coupled to an upper surface of the printed circuit board 3510. The base 3530 may be integrally formed. Through this, the space between the sensor 3520 and the filter 3550 may be sealed by the base 3530.

The camera module 3500 may comprise a lens 3540. The lens 3540 may be coupled to the base 3530. The lens 3540 may be screw-coupled to the base 3530. The lens 3540 may be fixed to the base 3530. At least a portion of the lens 3540 may be disposed inside the base 3530. Light reflected from the subject may pass through the lens 3540. The optical axis of the lens 3540 and the optical axis of the sensor 3520 may be aligned.

The camera module 3500 may comprise a filter 3550. The filter 3550 may be disposed on the base 3530. The filter 3550 may be disposed between the lens 3540 and the sensor 3520. The filter 3550 may be disposed on an optical path between the subject and the sensor 3520. The filter 3550 may filter light having a predetermined wavelength range. The filter 3550 may pass light of a specific wavelength. That is, the filter 3550 may block light other than a specific wavelength by reflecting or absorbing it. The filter 3550 may pass infrared rays and block light of wavelengths other than infrared rays. Or, the filter 3550 may pass visible light and block light of a wavelength other than visible light.

Hereinafter, a method for obtaining a high-resolution image through a super-resolution (SR) technique in a camera device according to a second embodiment of the present invention will be described with reference to the drawings.

Figure 42:
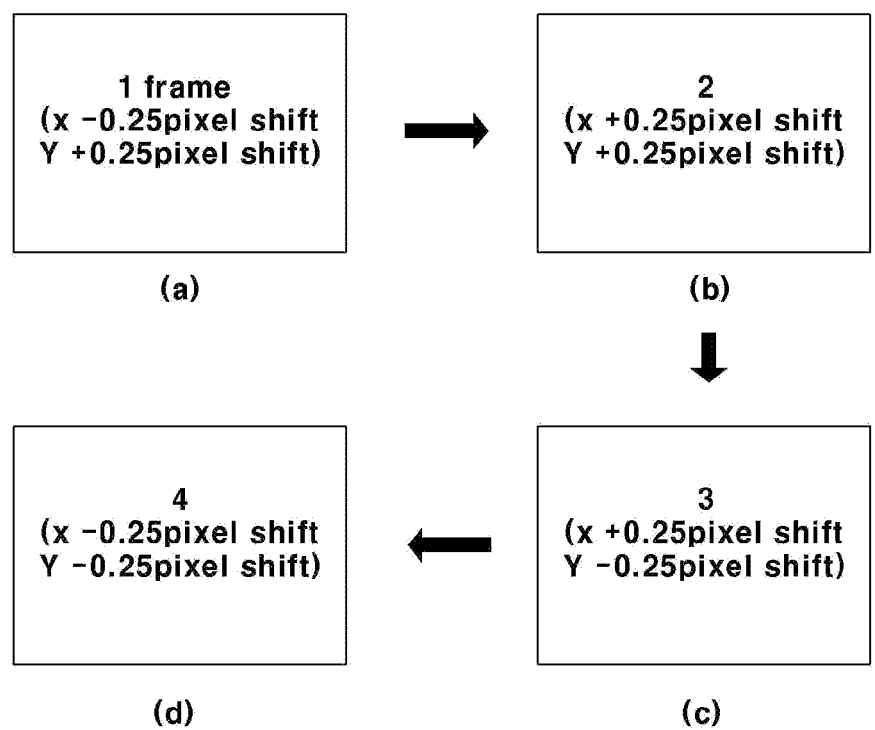
FIG. 42 is a diagram sequentially illustrating images of first to fourth frames acquired for the SR technique in a camera device according to a second embodiment of the present invention.

FIG. 41 is a conceptual diagram conceptually sequentially illustrating a plurality of images acquired for a super resolution (SR) technique in a camera device according to a second embodiment of the present invention; and FIG. 42 is a diagram sequentially illustrating images of first to fourth frames acquired for the SR technique in a camera device according to a second embodiment of the present invention.

The super resolution (SR) technique in a second embodiment of the present invention is a principle of increasing resolution by acquiring an additional image through driving of the liquid lens 3200. In FIG. 41(*a*), the dotted point may be an image location being photographed when the liquid lens 3200 is not driven. In a second embodiment of the present invention, the resolution can be increased by 4 times by acquiring 1 frame in each direction and by additionally acquiring a total of 4 frames through 4-direction diagonal tilting of the lens forming member 3240 with respect to the membrane 3210 of the liquid lens 3200. At this time, the four-direction diagonal tilting of the lens forming member 3240 may be in the order of upper left, upper right, lower right, and lower left. In a second embodiment of the present invention, the driving unit 3400 can be designed so that the lens forming member 3240 can be tilted diagonally for the above-described control. In more detail, as in FIG. 41(*b*), the image of the first frame shifted by −0.25 pixels in the x-direction and +0.25 pixels in the y-direction can be obtained in the sensor 3520 by controlling the upper left part of the lens forming member 3240 so as to be tilted upward (refer to FIG. 42(*a*)). At this time, the lower right portion of the lens forming member 3240 may be tilted downward. After that, as shown in FIG. 41(*c*), the image of the second frame shifted by +0.25 pixels in the x-direction and +0.25 pixels in the y-direction by the sensor 3520 can be obtained by controlling the upper right part of the lens forming member 3240 so as to be tilted upward (refer to FIG. 42(*b*)).

At this time, the lower left portion of the lens forming member 3240 may be tilted downward. Thereafter, as shown in FIG. 41(*d*), by controlling the lower right portion of the lens forming member 3240 to be tilted upward, an image of the third frame being shifted +0.25 pixels in the x-direction and −0.25 pixels shifted in the y-direction on the sensor 3520 can be obtained (refer to FIG. 42(*c*)). At this time, the upper left portion of the lens forming member 3240 may be tilted downward. Thereafter, as shown in FIG. 41(*e*), by controlling the lower left portion of the lens forming member 3240 to be tilted upward, an image of the fourth frame being shifted −0.25 pixels in the x-direction and −0.25 pixels shifted in the y direction on the sensor 3520 can be obtained (refer to FIG. 42(*d*)). At this time, the upper right portion of the lens forming member 3240 may be tilted downward.

Although the first embodiment and the second embodiment of the present invention have been separately described above, a modified embodiment of the present invention may comprise some configurations of the first embodiment and some configurations of the second embodiment together. That is, in the modified embodiment of the present invention, some configurations of the first embodiment may be replaced with corresponding configurations of the second embodiment, or some configurations of the second embodiment may be replaced with corresponding configurations of the first embodiment. Furthermore, in the modified embodiment of the present invention, some configurations of the second embodiment may be added to the first embodiment, or some configurations of the first embodiment may be added to the second embodiment.

As an example, the liquid lens 3200 of the second embodiment and related components may be disposed in place of the first lens part 310 of the first embodiment. Conversely, instead of the liquid lens 3200 of the second embodiment, the first lens part 310 of the first embodiment and related components may be disposed.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera device comprising:
   a holder comprising an upper plate and a side plate extending from the upper plate;
   a liquid lens disposed on the upper plate of the holder;
   a magnet coupled to the liquid lens;
   a substrate disposed on the side plate of the holder; and
   a coil coupled to the substrate and facing the magnet,
   wherein the liquid lens comprises:
   a transparent and elastically extendable membrane;
   a body forming a cavity with the membrane therebetween;
   a liquid disposed in the cavity; and
   a lens forming member in direct contact with the membrane and configured to adjust a curvature of the membrane,
   wherein the side plate of the holder comprises a first side plate and a second side plate disposed opposite to the first side plate,
   wherein the substrate comprises a first substrate disposed on the first side plate of the holder and a second substrate disposed on the second side plate of the holder, and
   wherein the coil comprises a first coil and a second coil both disposed on the first substrate, and a third coil and a fourth coil both disposed on the second substrate,
   wherein the magnet comprises a first magnet disposed on the lens forming member and facing the first coil, a second magnet disposed on the lens forming member and facing the second coil, a third magnet disposed on the lens forming member and facing the third coil, and a fourth magnet disposed on the lens forming member and facing the fourth coil,
   wherein an upper portion of the first magnet has an N-pole polarity, and a lower portion of the first magnet has an S-pole polarity, and
   wherein an upper portion of the second magnet has an S-pole polarity, and a lower portion of the second magnet has an N-pole polarity.

2. The camera device of claim 1,
   wherein the first and second magnets are disposed at one side of the lens forming member, and
   wherein the third and fourth magnets are disposed at another side of the lens forming member.

3. The camera device of claim 1, wherein an outer side surface of the first magnet and an outer side surface of the second magnet face a same direction, and
wherein an outer side surface of the third magnet and an outer side surface of the fourth magnet face a same direction.

4. The camera device of claim 1, wherein an outer side surface of the first magnet and an outer side surface of the second magnet are disposed on a same plane, and
wherein an outer side surface of the third magnet and an outer side surface of the fourth magnet are disposed on a same plane.

5. The camera device of claim 1, wherein the holder comprises a first hole formed on the first side plate and a second hole formed on the second side plate,
wherein the first coil and the second coil are disposed in the first hole of the holder, and
wherein the third coil and the fourth coil are disposed in the second hole of the holder.

6. The camera device of claim 1, wherein an upper portion of the third magnet has an N-pole polarity, and a lower portion of the third magnet has an S-pole polarity, and
wherein an upper portion of the fourth magnet has an S-pole polarity, and a lower portion of the fourth magnet has an N-pole polarity.

7. The camera device of claim 1, wherein the lens forming member comprises a yoke, and
wherein the magnet is disposed on the yoke and disposed between the yoke and the coil.

8. The camera device of claim 1, wherein the lens forming member comprises a window configured to press the membrane, and a frame coupled to the window, and
wherein the magnet is disposed on the frame.

9. The camera device of claim 8, wherein the frame comprises a body portion comprising a hole and coupled to the window and a leg portion outwardly extending from the body portion, and
wherein the leg portion comprises a first leg portion and a second leg portion both extending from one side surface of the body portion in a first direction and spaced apart from each other, and a third leg portion and a fourth leg portion both extending from another side surface of the body portion in a second direction opposite to the first direction and spaced apart from each other.

10. The camera device of claim 9, wherein each of the first to fourth leg portions comprises a hole formed at a position corresponding to that of a portion of the magnet.

11. The camera device of claim 1, wherein the holder comprises a protrusion protruding from an outer surface of the side plate of the holder, and
wherein the substrate comprises a hole into which the protrusion of the holder is inserted.

12. The camera device of claim 1, comprising:
a printed circuit board;
a sensor disposed on the printed circuit board;
a base disposed on the printed circuit board;
a lens coupled to the base; and
a filter disposed on the base and disposed between the lens and the sensor,
wherein the liquid lens is disposed at a position corresponding to that of the lens.

13. The camera device of claim 12, wherein the base is directly coupled to an upper surface of the printed circuit board, and
wherein the base is integrally formed so that a space between the sensor and the filter is sealed by the base.

14. The camera device of claim 1, wherein the curvature of the membrane is configured to be controlled by an interaction between the coil and the magnet so that the liquid lens acquires an image moved by a distance of 0.25 times a pixel size in a first direction, acquires an image moved by a distance of 0.25 times the pixel size in a second direction perpendicular to the first direction, acquires an image moved by a distance of 0.25 times the pixel size in a third direction opposite to the first direction, and acquires an image moved by a distance of 0.25 times the pixel size in a fourth direction opposite to the second direction.

15. An optical device comprising:
a light emitting module; and
the camera device of claim 1,
wherein the camera device receives a light irradiated from the light emitting module.

16. A camera device comprising:
a holder comprising an upper plate and a side plate extending from the upper plate;
a liquid lens disposed on the upper plate of the holder;
a magnet coupled to the liquid lens;
a substrate disposed on the side plate of the holder; and
a coil coupled to the substrate and facing the magnet,
wherein the liquid lens comprises:
a transparent and elastically extendable membrane;
a body forming a cavity with the membrane therebetween;
a liquid disposed in the cavity; and
a lens forming member in direct contact with the membrane and configured to adjust a curvature of the membrane,
wherein the side plate of the holder comprises a first side plate and a second side plate disposed opposite to the first side plate,
wherein the coil comprises a first coil and a second coil both disposed on the first side plate of the holder, and a third coil and a fourth coil both disposed on the second side plate of the holder,
wherein the magnet comprises a first magnet disposed on the lens forming member and facing the first coil, a second magnet disposed on the lens forming member and facing the second coil, a third magnet disposed on the lens forming member and facing the third coil, and a fourth magnet disposed on the lens forming member and facing the fourth coil,
wherein an upper portion of the first magnet has an N-pole polarity, and a lower portion of the first magnet has an S-pole polarity, and
wherein an upper portion of the second magnet has an S-pole polarity, and a lower portion of the second magnet has an N-pole polarity.

17. A camera device comprising:
a holder comprising an upper plate and a side plate extending from the upper plate;
a liquid lens disposed on the upper plate of the holder;
a magnet coupled to the liquid lens; and
a coil facing the magnet,
wherein the liquid lens comprises:
a transparent and elastically extensible membrane;
a body forming a cavity with the membrane therebetween;
a liquid disposed in the cavity; and
a lens forming member in direct contact with the membrane to control a curvature of the membrane,
wherein the curvature of the membrane is configured to be controlled by an interaction between the coil and the magnet so that the liquid lens acquires an image moved by a distance of 0.25 times a pixel size in a first direction, acquires an image moved by a distance of 0.25 times the pixel size in a second direction perpendicular to the first direction, acquires an image moved by a distance of 0.25 times the pixel size in a third direction opposite to the first direction, and acquires an image moved by a distance of 0.25 times the pixel size in a fourth direction opposite to the second direction, wherein the side plate of the holder comprises a first side plate and a second side plate disposed opposite to the first side plate, and wherein the coil comprises a first coil and a second coil both disposed on the first side plate of the holder, and a third coil and a fourth coil both disposed on the second side plate of the holder, wherein the magnet comprises a first magnet disposed on the lens forming member and facing the first coil, a second magnet disposed on the lens forming member and facing the second coil, a third magnet disposed on the lens forming member and facing the third coil, and a fourth magnet disposed on the lens forming member and facing the fourth coil, wherein an upper portion of the first magnet has an N-pole polarity, and a lower portion of the first magnet has an S-pole polarity, and wherein an upper portion of the second magnet has an S-pole polarity, and a lower portion of the second magnet has an N-pole polarity.

18. The camera device of claim 17, wherein the first to fourth directions are diagonal directions of a pixel.

19. The camera device of claim 17, wherein an outer side surface of the first magnet and an outer side surface of the second magnet face a same direction, and wherein an outer side surface of the third magnet and an outer side surface of the fourth magnet face a same direction.

20. The camera device of claim 17, wherein an upper portion of the third magnet has an N-pole polarity, and a lower portion of the third magnet has an S-pole polarity, and wherein an upper portion of the fourth magnet has an S-pole polarity, and a lower portion of the fourth magnet has an N-pole polarity.

* * * * *